US007254315B2

(12) United States Patent
Ando et al.

(10) Patent No.: US 7,254,315 B2
(45) Date of Patent: *Aug. 7, 2007

(54) INFORMATION STORAGE SYSTEM CAPABLE OF RECORDING AND PLAYING BACK A PLURALITY OF STILL PICTURES

(75) Inventors: Hideo Ando, Tokyo (JP); Shinichi Kikuchi, Yokohama (JP); Kazuhiko Taira, Yokohama (JP); Yuji Ito, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/342,863

(22) Filed: Jan. 31, 2006

(65) Prior Publication Data

US 2006/0133778 A1    Jun. 22, 2006

Related U.S. Application Data

(62) Division of application No. 10/800,766, filed on Mar. 16, 2004, now Pat. No. 7,106,952, which is a division of application No. 10/076,284, filed on Feb. 19, 2002, now Pat. No. 6,907,186, which is a division of application No. 09/630,430, filed on Aug. 1, 2000, now Pat. No. 6,360,056, which is a division of application No. 09/348,267, filed on Jul. 7, 1999, now Pat. No. 6,353,702.

(30) Foreign Application Priority Data

Jul. 7, 1998    (JP)    ................... 10-192063

(51) Int. Cl.
    H04N 5/91    (2006.01)
(52) U.S. Cl. ........................... 386/95; 386/96; 386/125

(58) Field of Classification Search ................ 386/46, 386/95, 96, 104, 112, 120, 121, 125, 126
See application file for complete search history.

(56) References Cited

U.S. PATENT DOCUMENTS

| 5,384,674 | A |   | 1/1995  | Nishida et al. ............ 360/72.2 |
| 5,555,098 | A | * | 9/1996  | Parulski ...................... 386/104 |
| 5,687,160 | A |   | 11/1997 | Aotake et al. |
| 5,712,947 | A |   | 1/1998  | Oguro et al. |
| 5,731,852 | A |   | 3/1998  | Lee |
| 5,745,643 | A |   | 4/1998  | Mishina ...................... 386/106 |
| 6,067,400 | A |   | 5/2000  | Saeki et al. |
| 6,148,138 | A |   | 11/2000 | Sawabe et al. |

(Continued)

FOREIGN PATENT DOCUMENTS

EP    0797 200 A2    9/1997

(Continued)

*Primary Examiner*—Huy Nguyen
(74) *Attorney, Agent, or Firm*—Oblon, Spivak, McClelland, Maier & Neustadt, P.C.

(57) ABSTRACT

An information storage medium capable of recording and playing back still picture information is provided with a first information unit having one still picture information, and a first group unit which is composed of a set of first information units, and has a plurality of pieces of still picture information having different contents. Information is recorded in the first group unit.

2 Claims, 32 Drawing Sheets

U.S. PATENT DOCUMENTS

| | | |
|---|---|---|
| 6,185,365 B1 | 2/2001 | Murase et al. |
| 6,253,026 B1 | 6/2001 | Saeki et al. |
| 6,353,702 B1 | 3/2002 | Ando et al. |
| 6,385,389 B1 | 5/2002 | Maruyama et al. |
| 6,389,222 B1 | 5/2002 | Ando et al. |
| 6,421,499 B1 * | 7/2002 | Kim et al. .................... 386/95 |
| 6,526,226 B2 | 2/2003 | Kashiwagi et al. |
| 6,560,405 B2 | 5/2003 | Ando et al. .................... 386/95 |
| 6,594,442 B1 | 7/2003 | Kageyama et al. ........... 386/96 |
| 6,721,493 B1 | 4/2004 | Moon et al. ................. 386/121 |
| 2002/0054049 A1 | 5/2002 | Toyoda et al. ............... 345/700 |

FOREIGN PATENT DOCUMENTS

| | | |
|---|---|---|
| EP | 0942 609 A1 | 9/1999 |
| EP | 1 065 665 A1 | 1/2001 |
| JP | 5-81787 | 4/1993 |
| JP | 5-158778 | 6/1993 |
| JP | 5-165935 | 7/1993 |
| JP | 7-143429 | 6/1995 |
| JP | 8-106721 | 4/1996 |
| JP | 8-205014 | 8/1996 |
| JP | 9-182013 | 7/1997 |
| JP | 9-259539 | 10/1997 |
| JP | 11-136613 | 5/1999 |
| JP | 11-215471 | 8/1999 |
| JP | 11-238362 | 8/1999 |
| JP | 2000-4421 | 1/2000 |

* cited by examiner

| AV FILE 1401 | | |
|---|---|---|
| VOB #3 (3) 1465 | EXTENT #ε 1475 | LSNg |
| | | ⋮ |
| | | LSNf+1 |
| UNRECORDED AREA 1460 | EXTENT #ζ 1470 | LSNf |
| | | ⋮ |
| | | LSNe+1 |
| VOB #2 1462 | EXTENT #β 1472 | LSNe |
| | | ⋮ |
| | | LSNd+1 |
| VOB #3 (2) 1464 | EXTENT #δ 1474 | LSNd |
| | | ⋮ |
| | | LSNc+1 |
| VOB #1 1461 | EXTENT #α 1471 | LSNc |
| | | ⋮ |
| | | LSNb+2 |
| | | LSNb+1 |
| VOB #3 (1) 1463 | EXTENT #γ 1473 | LSNb |
| | | ⋮ |
| | | LSNa+2 |
| | | LSNa+1 |

← SMALLER LOGICAL SECTOR NUMBER (LSN)
← INNER SIDE OF OPTICAL DISC 1001

LARGER LOGICAL SECTOR NUMBER (LSN) →
OUTER SIDE OF OPTICAL DISC 1001 →

FIG. 4

| CONTENTS OF ALLOCATION MAP TABLE 1105 | | |
|---|---|---|
| DISTRIBUTION INFORMATION OF POSITIONS OF UNRECORDED AREA 1621 | NUMBER OF EXTENTS IN UNRECORDED AREA 1601 | 1 |
| | 1ST ADR. (LSN) OF 1ST EXTENT IN UNRECORDED AREA 1606 | e-a |
| | SIZE (SECTORS) OF 1ST EXTENT IN UNRECORDED AREA 1614 | f-e |
| DISTRIBUTION INFORMATION OF POSITIONS OF RECORDED DATA AS TO VOB #1 1622 | NUMBER OF EXTENTS IN VOB #1 1602 | 1 |
| | 1ST ADR. (LSN) OF 1ST EXTENT IN VOB #1 1607 | b-a |
| | SIZE (SECTORS) OF 1ST EXTENT IN VOB #1 1615 | c-b |
| DISTRIBUTION INFORMATION OF POSITIONS OF RECORDED DATA AS TO VOB #2 1623 | NUMBER OF EXTENTS IN VOB #2 1603 | 1 |
| | 1ST ADR. (LSN) OF 1ST EXTENT IN VOB #2 1608 | d-a |
| | SIZE (SECTORS) OF 1ST EXTENT IN VOB #2 1616 | e-d |
| DISTRIBUTION INFORMATION OF POSITIONS OF RECORDED DATA AS TO VOB #3 1624 | NUMBER OF EXTENTS IN VOB #3 1604 | 3 |
| | 1ST ADR. (LSN) OF 1ST EXTENT IN VOB #3 1609 | 1 |
| | SIZE (SECTORS) OF 1ST EXTENT IN VOB #3 1617 | b-a |
| | 1ST ADR. (LSN) OF 2ND EXTENT IN VOB #3 1610 | c-a |
| | SIZE (SECTORS) OF 2ND EXTENT IN VOB #3 1618 | d-c |
| | 1ST ADR. (LSN) OF 3RD EXTENT IN VOB #3 1611 | f-a |
| | SIZE (SECTORS) OF 3RD EXTENT IN VOB #3 1619 | g-f |

FIG. 5

*1> PGC INFORMATION (OR UD_PGCI) CAN DEFINE A GROUP OF ONE OR MORE PROGRAMS;
*2> EACH PROGRAM CAN BE FORMED OF ONE OR MORE CELLS;
*3> EACH CELL CAN BE SPECIFIED BY CELL ID (OR CI_SRP);
*4> EACH CELL ID (OR CI_SRP) CAN INDICATE POSITION (OR START ADDRESS) OF CELL INFORMATION (OR CI);
*5> EACH CELL INFORMATION (OR CI) CAN DETERMINE START TIME AND END TIME OF PRESENTATION OF CELL

PGC INFORMATION (PGCI)

| PGC#1 1081 | | PGC#2 1082 | | PGC#3 1083 | |
|---|---|---|---|---|---|
| NUMBER OF CELLS=3 | | NUMBER OF CELLS=3 | | NUMBER OF CELLS=5 | |
| #1 | CELL A | #1 | CELL D | #1 | CELL E |
| #2 | CELL B | #2 | CELL E | #2 | CELL A |
| #3 | CELL C | #3 | CELL F | #3 | CELL D |
| — | — | — | — | #4 | CELL B |
| — | — | — | — | #5 | CELL E |
| CELL ID | CELL INFO. | CELL ID | CELL INFO. | CELL ID | CELL INFO. |
| CI_SRP #m=3 | CI #n=3 | CI_SRP #m=3 | CI #n=3 | CI_SRP #m=5 | CI #n=4 |

FIG. 10A  VOB FOR PICTURE OBJECTS (OR STILL PICTURE VOB GROUP RELATING TO S_VOGI#) 1631

FIG. 10B  VOBU (FOR ONE STILL PICTURE) 1641

FIG. 10C

| V_PCK 1661 | V_PCK 1662 | V_PCK 1663 | ... | SP_PCK 1681 | A_PCK 1691 | A_PCK 1692 |
|---|---|---|---|---|---|---|
| I-PICTURE 1706 | | DUMMY DATA | | SP_STREAM | A_STREAM | |
| ←————————— VIDEO PART —————————→ | | | | | ←— AUDIO PART —→ | |

FIG. 10D  VOB FOR PICTURE OBJECTS (OR STILL PICTURE VOB GROUP RELATING TO S_VOGI#) 1632

FIG. 10E  | VOBU(ONE STILL PICT.) 1642 | VOBU 1643 | VOBU 1644 |

FIG. 10F

| V_PCK 1664 | ... | SP_PCK 1682 | A_PCK 1693 | V_PCK 1665 | ... | A_PCK 1694 | V_PCK 1666 | ... | V_PCK 1667 | ... | A_PCK 1695 |

FIG. 10G  VOB FOR PICTURE OBJECTS (OR STILL PICTURE VOB GROUP RELATING TO S_VOGI#) 1633

FIG. 10H  VOBU (ONE STILL PICTURE) 1645 | VOBU 1646 | VOBU 1647

FIG. 10I  
- I-PICTURE 1707 | DUMMY 1704 | SP_STREAM
- V_PCK 1668 | V_PCK 1669 | V_PCK 1670 | SP_PCK 1683 | V_PCK 1671 | V_PCK 1672 | V_PCK 1673 | DUMMY 1705 | ...... | V_PCK 1674 | ...... | I-PICTURE 1708 | I-PICTURE 1709
- VIDEO PART

FIG. 10J  VOB FOR PICTURE OBJECTS (OR STILL PICTURE VOB GROUP RELATING TO S_VOGI#) 1634

FIG. 10K  VOBU (ONE STILL PICTURE) 1648 | VOBU 1649 | VOBU 1650

FIG. 10L  
- SP_PCK 1684 | A_PCK 1696 | A_PCK 1697 | A_PCK 1698 | A_PCK 1699 | A_PCK 1700 | A_PCK 1701 | ...... | A_PCK 1702
- AUDIO PART

FIG. 12  #i=ANY ONE OF #1 TO #k

FIG. 14A

| VOB #A 1821 |

FIG. 14B

| VOBU 1825 | VOBU 1826 | ...... | VOBU 1827 |
|---|---|---|---|
| STILL PICT. NO. 1 | STILL PICT. NO. 2 | | STILL PICT. NO. h |

FIG. 14C

| STLPCT 1831 | AUDIO 1841 | STLPCT 1832 | AUDIO 1842 | STLPCT 1833 | ...... | STLPCT 1834 | AUDIO 1843 |
|---|---|---|---|---|---|---|---|
| V_PCK 1851 | A_PCK 1861 | V_PCK 1852 | SP_PK 1848 | V_PCK 1853 | ...... | V_PCK 1854 | A_PCK 1863 |

CONTENTS SPECIFIED BY CELL →

1ST STILL PICT. IN CELL ↑         LAST STILL PICT. IN CELL ↑

FIG. 14D

| A_PCK 1864 | V_PCK 1852 | V_PCK 1855 | SP_PK 1848 | A_PCK 1865 | V_PCK 1856 | ...... | V_PCK 1853 | V_PCK 1857 | A_PCK 1866 | V_PCK 1854 | V_PCK 1858 |
|---|---|---|---|---|---|---|---|---|---|---|---|
| AUDIO 1844 | STLPCT 1835 | | | AUDIO 1845 | STLPCT 1836 | | | STLPCT 1837 | AUDIO 1846 | | STLPCT 1838 |

FIG. 14E

| STILL PICTURE NO. j | ...... | STILL PICTURE NO. h+j−2 |
|---|---|---|
| VOBU 1828 | | VOBU 1829 |

| VOB #B 1822 |

| CONTENTS (S_CI) OF CELL PLAYBACK INFO. (CI) FOR PICTURE OBJECTS 1870 | EXAMPLE 1871 WITH RESPECT TO FIG. 14 | EXAMPLE 1872 WITH RESPECT TO FIG. 14 |
|---|---|---|
| CELL ID (CI_SRP) 1873 | — | — |
| TYPE INFORMATION OF CELL (C_TY) 1880 | — | — |
| ID INFORMATION OF VOB WITH V_PCK 1874 | VOB #A | 1821 |
| STILL PICT. NUMBER 1875 IN VOB INCLUDING V_PCK OF 1ST STILL PICTURE IN CELL (S_S_VOB_ENTN) | 2 | 1826 |
| STILL PICT. NUMBER 1876 IN VOB INCLUDING V_PCK OF LAST STILL PICTURE IN CELL (E_S_VOB_ENTN) | h | 1827 |
| ID INFORMATION OF VOB WITH A_PCK 1877 | VOB #B | 1822 |
| STILL PICT. NUMBER 1878 IN VOB INCLUDING A_PCK OF 1ST STILL PICTURE IN CELL | j | 1828 |
| PRESENTATION TIME 1879 OF EACH STILL PICTURE HAVING NO CORRESPONDING A_PCK | 2 SECONDS (ONE LINE) | — |

FIG. 15

| CONTENTS OF CELL PLAYBACK INFO. (CI) FOR PTT |
|---|
| CELL ID (CI_SRP) 1883 |
| TYPE INFO. OF CELL (C_TY) 1882 |
| ID INFO. OF PTT WITH V_PCK 1884 |
| STILL PICTURE NUMBER 1885 IN PTT OF VOB INCLUDING V_PCK OF 1ST STILL PICTURE IN CELL |
| STILL PICTURE NUMBER 1886 IN PTT OF VOB INCLUDING V_PCK OF LAST STILL PICTURE IN CELL |
| ID INFO. OF PTT WITH A_PCK 1887 |
| STILL PICTURE NUMBER 1888 IN PTT OF VOB INCLUDING A_PCK OF 1ST STILL PICTURE IN CELL |
| PRESENTATION TIME 1889 OF EACH STILL PICT. HAVING NO CORRESPONDING A_PCK |

VOB MAP FOR PICT. OBJECTS 1899

- NUMBER OF STILL PICT. (OR NUMBER OF VOBs) IN CORRESPONDING PTT 1901 (OR S_VOB_Ns)
- INFO. OF 1ST STILL PICT. IN CORRESPONDING PTT 1902
- INFO. OF 2ND STILL PICT. IN CORRESPONDING PTT 1903
- ............

Expanded detail:

- DATA SIZE OF STILL PICTURE (OR VOB) INDICATED BY USED SECTORS 1906
- DISPLAY TIME OF ONE STILL PICTURE 1907 REPRESENTED BY PLAYBACK TIME OF AUDIO PART (IF VOB CONTAINS A_PCK) OR REPRESENTED BY DISPLAY TIME OF VIDEO PART (IF VOB CONTAINS NO A_PCK)
- ADDRESS OF 1ST V_PCK IN VOB 1908 (OR S_VOG_SA)
- SIZE OF I-PICTURE IN VOB (INDICATED BY TOTAL BYTES) 1909
- PRESENTATION START TIME S_PTM OF STILL PICTURE (V_PCK/SP_PCK) 1910
- 1ST SYSTEM CLOCK REFERENCE F_SCR OF STILL. PICTURE (V_PCK/SP_PCK) 1911
- ADDRESS OF 1ST A_PCK IN VOB 1912
- AUDIO S_PTM (PRESENTATION START TIME OF A_PCK) 1913
- AUDIO E_PTM (PRESENTATION END TIME OF A_PCK) 1914
- AUDIO F_SCR (SYSTEM CK REF. OF 1ST A_PCK IN VOB) 1915
- AUDIO L_SCR (SYSTEM CK REF. OF LAST A_PCK IN VOB) 1916

CONTENTS OF S_C_GI

| FIELD NAME | CONTENTS |
|---|---|
| RESERVED | RESERVED |
| C_TY | CELL TYPE |
| S_VOGI_SRPN | S_VOGI SEARCH POINTER NUMBER |
| C_EPI_Ns | NUMBER OF CELL ENTRY POINT INFO. |
| S_S_VOB_ENTN | START S_VOB_ENT NUMBER |
| E_S_VOB_ENTN | END S_VOB_ENT NUMBER |

CONTENTS OF S_C_EPI

| FIELD NAME | CONTENTS |
|---|---|
| EP_TY | ENTRY POINT TYPE |
| S_VOB_ENTN | S_VOB_ENT NUMBER |
| PRM_TXTI | PRIMARY TEXT INFORMATION |

CONTENTS OF S_AAG_GI

| FIELD NAME | CONTENTS |
|---|---|
| AA_ENT_Ns | NUMBER OF AA_ENT |
| S_AA_STIN | STILL PICTURE ADDITIONAL AUDIO STREAM INFORMATION NUMBER |
| S_AAG_SA | START ADDRESS OF THIS AAG IN STILL PICTURE ADDITIONAL AUDIO FILE |

CONTENTS OF AA_ENT

| FIELD NAME | CONTENTS |
|---|---|
| AA_TY | ADDITIONAL AUDIO TYPE |
| AA_SZ | SIZE OF ADDITIONAL AUDIO STREAM |
| AA_PB_TM | PLAYBACK TIME OF ADDITIONAL AUDIO STREAM (MEASURED BY VIDEO FIELDS) |

FIG. 29

CONTENTS OF S_VOG_GI

| FIELD NAME | CONTENTS |
|---|---|
| S_VOB_Ns | NUMBER OF S_VOBs |
| S_VOB_STIN | STILL PICTURE VOB STREAM INFORMATION NUMBER |
| FIRST_VOB_REC_TM | TIME WHEN THE FIRST VOB IN THIS VOB GROUP WAS RECORDED |
| LAST_VOB_REC_TM | TIME WHEN THE LAST VOB IN THIS VOB GROUP WAS RECORDED |
| S_VOG_SA | START ADDRESS OF THIS VOB GROUP IN STILL PICTURE AV FILE |

FIG. 30

CONTENTS OF S_VOB_ENT (TYPE 1)

| FIELD NAME | CONTENTS |
|---|---|
| S_VOB_ENT_TY | STILL PICTURE VOB ENTRY TYPE |
| V_PART_SZ | SIZE OF VIDEO PART |

FIG. 31

CONTENTS OF S_VOB_ENT (TYPE 2)

| FIELD NAME | CONTENTS |
|---|---|
| S_VOB_ENT_TY | STILL PICTURE VOB ENTRY TYPE |
| V_PART_SZ | SIZE OF VIDEO PART |
| A_PART_SZ | SIZE OF ORIGINAL AUDIO PART |
| A_PB_TM | PLAYBACK TIME OF AUDIO PART (DESCRIBED IN VIDEO FIELDS) |

FIG. 32

CONTENTS OF S_VOB_ENT (TYPE 3)

| FIELD NAME | CONTENTS |
|---|---|
| S_VOB_ENT_TY | STILL PICTURE VOB ENTRY TYPE |
| V_PART_SZ | SIZE OF VIDEO PART |
| S_AAGN | ADDITIONAL AUDIO GROUP NUMBER |
| AA_ENTN | AA_ENT NUMBER |

FIG. 33

CONTENTS OF S_VOB_ENT (TYPE 4)

| FIELD NAME | CONTENTS |
|---|---|
| S_VOB_ENT_TY | STILL PICTURE VOB ENTRY TYPE |
| V_PART_SZ | SIZE OF VIDEO PART |
| A_PART_SZ | SIZE OF ORIGINAL AUDIO PART |
| A_PB_TM | PLAYBACK TIME OF AUDIO PART |
| S_AAGN | ADDITIONAL AUDIO GROUP NUMBER |
| AA_ENTN | AA_ENT NUMBER |

FIG. 34

INFORMATION STORAGE SYSTEM CAPABLE OF RECORDING AND PLAYING BACK A PLURALITY OF STILL PICTURES

CROSS REFERENCE TO RELATED APPLICATIONS

This application is a divisional of U.S. application Ser. No. 10/800,766, filed on Mar. 16, 2004, now U.S. Pat. No. 7,106,952 which is a divisional of U.S. application Ser. No. 10/076,284 filed on Feb. 19, 2002, now U.S. Pat. No. 6,907,186, which is a divisional of U.S. application Ser. No. 09/630,430 filed on Aug. 1, 2000, now U.S. Pat. No. 6,360,056, which is a divisional of U.S. application Ser. No. 09/348,267 filed on Jul. 7, 1999, now U.S. Pat. No. 6,353,702, and is based upon and claims the benefits of priority from the prior Japanese Patent Application No. 10-192063, filed on Jul. 7, 1998; all of which are hereby incorporated by reference in their entirety.

BACKGROUND OF THE INVENTION

The present invention relates to an information storage medium capable of recording and playing back a plurality of still pictures, a recording method and apparatus therefor, and a playback method and apparatus therefor.

Recently, digital cameras have been prevalently used as media for recording still image information as digital information. In a DVD that records and plays back video information as digital information, menu pictures and the like are displayed as still pictures.

In a digital camera, individual sensed still pictures are stored as different files. When each still picture information is saved as an independent file, the following problems remain unsolved.

a] Since still pictures are not grouped by similarity of contents or closeness of image sensing times, it becomes troublesome to manage and search individual still pictures.

b] As an example of troublesome management of still pictures, different files must be opened to check the contents of each still picture information, resulting in cumbersome contents checking.

c] When a plurality of pieces of still picture information are to be processed in a recording/playback DVD disc, which assures compatibility and continuity with a DVD Video disc to some extent, compatibility and continuity with the DVD Video disc cannot be maintained.

BRIEF SUMMARY OF THE INVENTION

Therefore, the present invention has the following objects:

A) an improvement associated with the recording format upon recording still picture information on an information storage medium;

B) an improvement associated with the data structure of management information for still picture information recorded on an information storage medium;

C) an improvement associated with an information recording/playback apparatus which records still picture information and its management information on an information storage medium; and D) an improvement associated with an information playback apparatus for playing back still picture information and its management information recorded on an information storage medium.

More specifically:

A) It is an object of the present invention to provide a recording format and a data structure of management information, which are used for processing a plurality of pieces of still picture information while assuring data compatibility and continuity of the recording format and management information with a general video scheme of a recording/playback DVD disc that assures compatibility and continuity with a DVD Video disc to some extent, and an information recording/playback apparatus that can implement such recording format and data structure.

B) It is another object of the present invention to provide a recording format and data structure of management information, which allows easy management and search of a plurality of pieces of recorded still picture information, and an information recording/playback apparatus that can implement such recording format and data structure.

C) It is still another object of the present invention to provide an information playback apparatus which allows high-speed access to an information storage medium that records a plurality of pieces of still picture information so as to continuously display a plurality of pieces of still picture information (continuity upon playback).

In order to achieve the above objects, a plurality of pieces of still picture information are grouped and recorded on an information storage medium, thus continuously recording the plurality of pieces of still picture information. In the group of the plurality of pieces of still picture information, at least two still pictures are continuously recorded at neighboring locations on the information storage medium.

Also, management information that pertains to the grouped information contains map information, which records information which pertains to each still picture information (e.g., the recording address of each still picture information on the information storage medium).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view for explaining an example of the sequence (recording location) when a video object VOB of AV file data is recorded on the medium shown in FIG. 1;

FIG. 5 is a view for explaining the data structure in an allocation map table;

FIGS. 10A to 10L are views for explaining the recording format of a picture object/audio object for a still picture;

FIGS. 14A to 14G are views for explaining the relationship between the data structure in a VOB upon continuously recording still pictures, and the designation contents of a corresponding cell;

FIG. 15 is a view showing an example of the correspondence among the data structure cell playback information (cell information S_CI for a still picture) of a picture object, the contents of the cell playback information, and components shown in FIGS. 14A to 14G;

FIG. 16 is a view showing an example of another data structure of cell playback information (cell information CI) of a picture object;

FIG. 18 is a view for explaining the data structure of a VOB map of the picture object shown in FIG. 17;

FIG. 29 is a view for explaining the contents of an additional audio entry (AA_ENT) shown in FIG. 27;

FIG. 30 is a view for explaining the contents of still picture VOB group general information (S_VOG_GI) shown in FIG. 12;

FIG. 31 is a view for explaining the first example (type 1) of the contents of a still picture VOB entry (S_VOB_ENT) shown in FIG. 12;

FIG. 32 is a view for explaining the second example (type 2) of the contents of a still picture VOB entry (S_VOB_ENT) shown in FIG. 12;

FIG. 33 is a view for explaining the third example (type 3) of the contents of a still picture VOB entry (S_VOB_ENT) shown in FIG. 12;

FIG. 34 is a view for explaining the fourth example (type 4) of the contents of a still picture VOB entry (S_VOB_ENT) shown in FIG. 12;

DETAILED DESCRIPTION OF THE PREFERRED EMBODIMENTS

Figure 1:
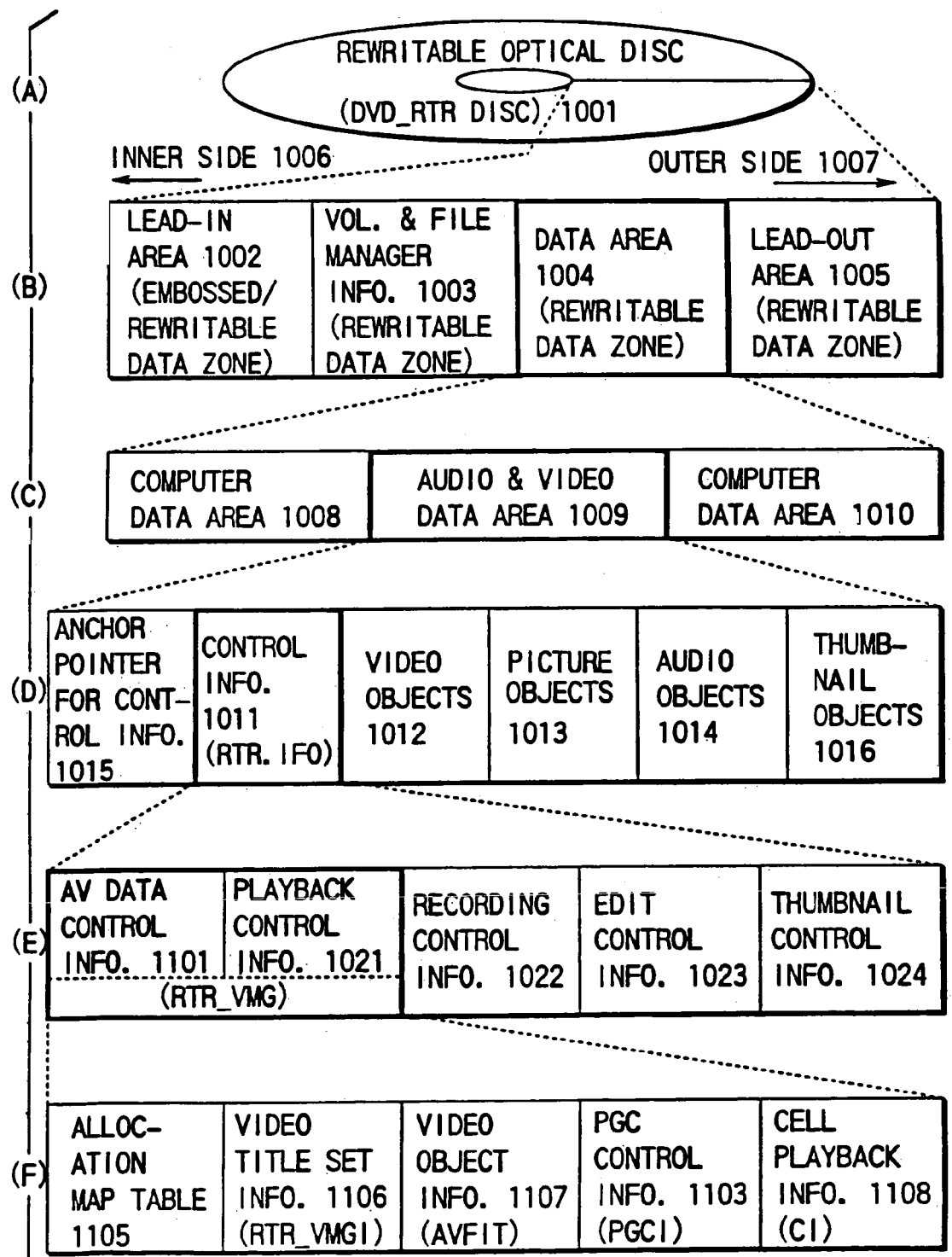
FIGS. 1A to 1F are views for explaining the data structure of an information recording medium according to an embodiment of the present invention.

Preferred embodiments of the present invention will be described hereinafter with reference to the accompanying drawings.

[1] Outline of Data Structure on Information Storage Medium

The recording information contents (data structure) of information recorded on an information storage medium (Optical Disc or DVD_RTR disc 1001) that can record and play back video information and music information shown in FIG. 1A will be explained below.

The data structure of information recorded on the information storage medium (optical disc 1001) is roughly divided, in the order from inner side 1006 in FIG. 1B, into:

lead-in area 1002 having an embossed data zone whose light reflection surface has an embossed pattern, a mirror zone whose surface is flat (mirror surface), and a rewritable data zone capable of information rewriting;

volume & file manager information 1003 that records information which is recorded on a rewritable data zone which can be recorded/rewritten by the user, and pertains to the entire file or volume of audio & video data;

data area 1004 made up of a rewritable data zone that can be recorded/rewritten by the user; and lead-out area 1005 made up of a rewritable data zone capable of information rewriting.

The embossed data zone of lead-in area 1002 records in advance:

information such as the disc type indicating a DVD-ROM, DVD-RAM, DVD-R, or the like, disc size, recording density, physical sector numbers indicating the recording start/end positions, and the like, which pertain to the entire information storage medium;

information such as the recording power and width, erase power, playback power, and linear velocity upon recording and erasure, which pertain to the recording/playback/erasure characteristics; and information such as the manufacturing number and the like, which pertain to the manufacture of each information storage medium.

The rewritable data zone of each of lead-in and lead-out areas 1002 and 1005 has a unique disk name recording field for each information recording medium, a test recording field (for confirming recording/erasure conditions), and a management information recording field that pertains to a defective field in data area 1004, and an information recording/playback apparatus can record information on these fields.

Data area 1004 sandwiched between lead-in and lead-out areas 1002 and 1005 can record both computer data and audio & video data, as shown in FIG. 1C. The recording order, each recording information size, and the like of computer data and audio & video data can be arbitrarily determined. Locations where the computer data are recorded will be referred to as computer data areas 1008 and 1010, and a location where the audio & video data are recorded will be referred to as audio & video data area 1009 hereinafter.

As shown in FIG. 1D, the data structure of information recorded in audio & video data area 1009 contains:

anchor pointer for control information 1015: information indicating the start location (start address) where control information 1011 is recorded in audio & video data area 1009;

control information 1011: control information (corresponding to RTR.IFO shown in FIG. 2) required upon executing respective processes, i.e., video recording (audio recording), playback, editing, and search;

video objects 1012: video recording information of video data contents;

picture objects 1013: still picture information such as still pictures, slide pictures, and the like;

audio objects 1014: audio recording information of audio data contents;

thumbnail objects 1016: information such as thumbnails used upon searching for a location the user wants to watch or upon editing; and so on.

Video objects 1012, picture objects 1013, audio objects 1014, and thumbnail objects 1016 shown in FIG. 1D mean groups of information classified in units of contents (data contents). Hence, all pieces of video information recorded on audio & video data area 1009 are contained in video objects 1012, all pieces of still picture information are contained in picture objects 1013, all pieces of audio information are contained in audio objects 1014, and all pieces of thumbnail information used in video information management and search are contained in thumbnail objects 1016.

VOB (video object) 1403 shown in FIG. 3D (to be described later) indicates a cluster of information recorded in AV file (i.e., audio & video file) 1401, and has a definition different from that of video objects 1012 shown in FIG. 1D. Note that similar terms often have quite different meanings.

Furthermore, as shown in FIG. 1E, the contents of control information 1011 include:

AV data control information 1101: management information which manages the data structure in video object 1012 or manages information that pertains to the recording locations on optical disc 1001 as an information storage medium;

playback control information 1021: control information required upon playback;

recording control information 1022: control information required upon recording (video/audio recording);

edit control information 1023: control information required upon editing;

thumbnail control information 1024: management information that pertains to thumbnails (thumbnail object) used to search for a location the user wants to watch in video data or to edit; and the like.

Figure 2:
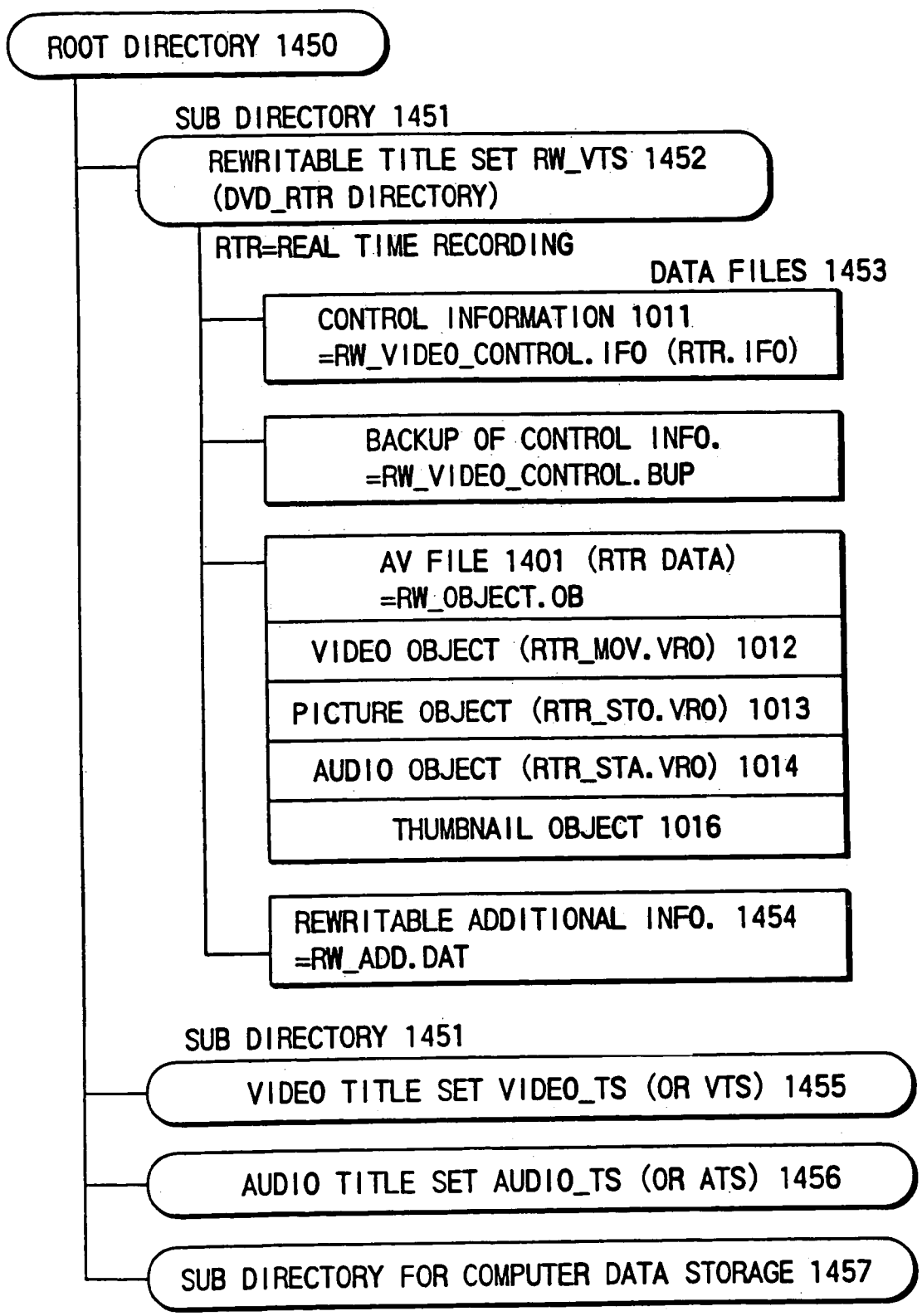
FIG. 2 is a view for explaining the directory structure of data files stored in a data area on the medium shown in FIGS. 1A to 1F.
Figure 23:
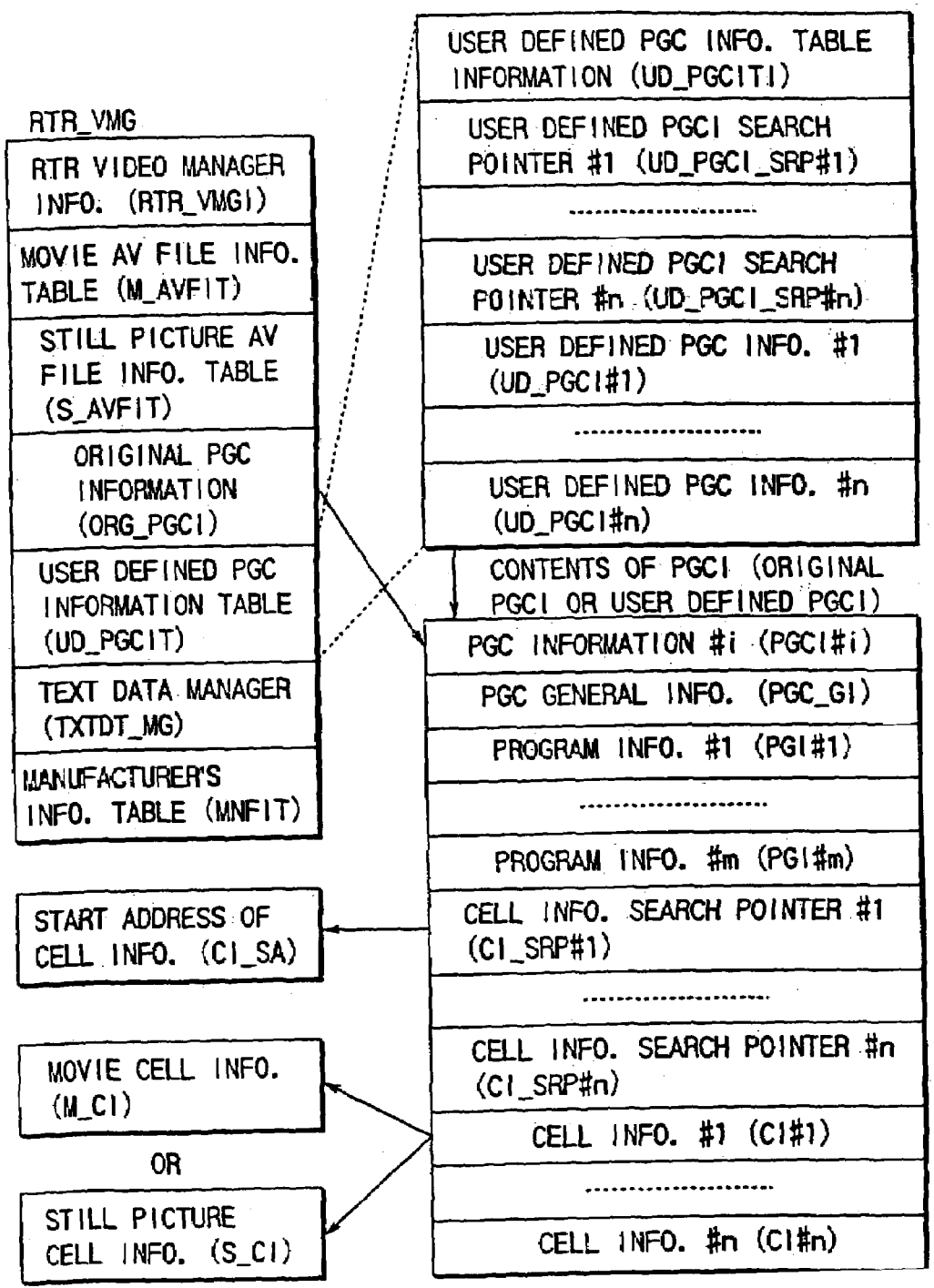
FIG. 23 is a view for explaining the data structure of control information/navigation data (RTR_VMG) shown in FIG. 1E or FIG. 8.

Note that Control information 1101 and playback control information 1021 shown in FIG. 1E correspond to RTR.IFO shown in FIG. 2, and RTR_VMG shown in FIG. 23.

As shown in FIG. 1F, the data structure in AV data control information 1101 shown in FIG. 1E is comprised of:

allocation map table 1105: information which pertains to address setups along the actual layout, identification of recorded/unrecorded areas, and the like on the information storage medium (optical disc 1001);

video title set information 1106: time information (corresponding to RTR_VMGI in FIG. 8) which indicates the overall information contents in AV file 1401 shown in FIG. 3A, and includes link information among VOBs, grouping information of a plurality of VOBs for management and search, a time map table, and the like;

video object information 1107: information (corresponding to M_AVFIT/S_AVFIT in FIG. 8 or S_AVFIT in FIG. 12) which indicates information pertaining to each VOB in AV file 1401, and pertains to attribute (characteristic) information in units of VOBUs, and each VOBU contained in the VOB;

PGC control information 1103: information (corresponding to PGCI in FIG. 23) that pertains to a video information playback program (sequence); and cell playback information 1108: information (corresponding to CI in FIG. 23 or S_CI in FIG. 24) that pertains to the data structure of a basic video information unit upon playback.

The aforementioned contents are a brief explanation of the data structure shown in FIGS. 1A to 1F. Some additional explanations of each information will be given below.

Volume & file manager information 1003 records:
information that pertains to the entire volume;
the number of files of contained PC data, and the number of files associated with AV data;
information associated with recording layer information and the like.

Especially, as the recording layer information, information 1003 records:

the number of layers that form a disc (e.g., a single RAM/ROM two-layered disc has two layers, a single ROM two-layered disc also has two layers, and n single-sided discs are counted as n layers);

a logical sector number range table (capacity in units of layers) assigned in units of layers;

the characteristics (e.g., a DVD-RAM disc, a RAM section of a RAM/ROM two-layered disc, a CD-ROM, a CD-R, and the like) in units of layers;

an assigned logical sector number range table (including rewritable area capacity information of each area) in units of zones on a RAM area of each layer; and unique ID information of each layer (e.g., to find out a disc exchange event in a multi-disc pack). With this information, continuous logical sector numbers can be set even for a multi-disc pack or RAM/ROM two-layered disc to handle such discs or disc as a single, large volume space.

Playback control information 1021 records:

information that pertains to a playback sequence which combines PGCs;

information (a sequence for continuously playing back all recorded cells) indicating a pseudo recording location considering the information storage medium as a single tape like a VTR or DVC in relation to the above information;

information that pertains to simultaneous playback on a plurality of screens having different kinds of video information;

search information: information which records cell IDs corresponding to search categories, and a table of start times in a given cell, and allows the user to select and directly access the video information of interest; and the like.

Recording control information 1022 records:

program reservation recording information and the like.

Furthermore, edit control information 1023 records:

special edit information in units of PGCs (corresponding time setup information and special edit contents are described as EDL information); and file conversion information (which converts a specific field in an AV file into a file such as an AVI file that can undergo special editing on a PC, and designates the storage location of the converted file).

Thumbnail control information 1024 describes:

management information that pertains to thumbnail objects 1016 (designation information of the recording location of each thumbnail picture in audio & video data area 1009 and a VOB or cell associated with each thumbnail picture, location information in a VOB or cell associated with each thumbnail picture, and the like (the VOB and cell will be explained in detail later upon explaining the contents of FIGS. 3A to 3J)).

The directory structure of data files in the data area will be described below.

All pieces of information are recorded in units of files in data area 1004 in FIG. 1B, and the relationship among data files is managed by the directory structure shown in FIG. 2.

Referring to FIG. 2, a plurality of subdirectories 1451 are contained within root directory 1450 to allow easy classification in units of recorded file contents. In the embodiment shown in FIG. 2, data files that pertain to computer data recorded on computer data areas 1008 and 1010 shown in FIG. 1C are recorded under subdirectory 1457 for computer data storage, and audio & video data recorded on audio & video data area 1009 are recorded under rewritable video title set RW_VTS 1452. On the other hand, upon copying video information recorded on a DVD Video disc or (DVD Audio disc) to the disc shown in FIG. 1A, data are copied under video title set VIDEO_TS 1455, and audio title set AUDIO_TS 1456.

Control information 1011 in FIG. 1D is recorded as a single file for recording/playback video management data. In the embodiment in FIG. 2, that information has file name RW_VIDEO_CONTROL.IFO (or real time recording information; abbreviated as RTR.IFO). Furthermore, identical information is also recorded as backup information with file name RW_VIDEO_CONTROL.BUP.

In the embodiment shown in FIG. 2, all of video objects (RTR_MOV.VRO) 1012, picture objects (RTR_STO.VRO) 1013, audio objects (RTR_STA.VRO) 1014, and thumbnail objects 1016 are recorded as single AV file 1401 (the file name in the embodiment in FIG. 2 is RW_OBJECT.OB).

Rewritable additional information 1454 (not shown in FIGS. 1A to 1F) that can be used upon recording/playing back video information can be simultaneously recorded. That information is recorded as a single file, which has file name RW_ADD.DAT (corresponding to S_AA_STI/S_AAFI in FIG. 12 or AA_ENT in FIG. 27) in the embodiment in FIG. 2.

FIGS. 3A to 3J show an example of the data structure in an AF file. As shown in FIG. 3B, entire AV file 1401 forms single VTS (video title set) (or RTR movie object RTR_MOV.VRO) 1402. VTS 1402 contains a group of a plurality of VOBs (video objects) 1403, 1404, and 1405, which are separated into a plurality of part_of_titles (or a plurality of chapters) 1407 and 1408 in accordance with the contents of audio & video data and the order of information recorded in AV file 1401.

VOBs 1403, 1404, and 1405 in FIG. 3D are defined as sets of audio & video data recorded in AV file 1401, and have definition contents different from video objects 1012 shown in FIG. 1D that primarily serve the purposes of classification items of video information/still picture information/audio information/thumbnail information and the like. Hence, VOBs 1403, 1404, and 1405 in FIG. 3D record not only information classified into video objects 1012, but also information classified into picture objects 1013, audio objects 1014, and thumbnail objects 1016, as shown in FIG. 10.

Associated VOBs are grouped into a plurality of PTTs (part_of_titles or chapters) 1407 and 1408 based on information contents recorded in VOBs 1403, 1404, and 1405. That is, PTTs 1407 and 1408 are formed as sets of one or a plurality of VOBs. In the embodiment shown in FIG. 3C, PTT 1408 is formed by two VOBs, i.e., VOBs 1404 and 1405, and PTT 1407 is formed by one VOB 1403 alone.

Minimum basic units of video information are called VOBUs (video object units) 1411 to 1414, and data in VOBs 1403 to 1405 are formed as sets of VOBUs 1411 to 1414, as shown in FIG. 3E.

MPEG1 or MPEG2 is prevalently used as the video information compression technique in VOBs 1403 to 1405. MPEG segments video information into groups called GOPs in 0.5-sec increments, and compresses video information in units of GOPs. Video information compression units of VOBUs 1411 to 1414 are formed to have nearly the same size as that of GOP in synchronism with GOP.

Furthermore, VOBUs 1411 to 1414 are recorded while being segmented into sectors 1431 to 1437 in units of 2,048 bytes. Sectors 1431 to 1437 record raw video information, sub-picture information, audio information, and dummy information in units of packs in the form of pack structures, i.e., V_PCKs (video packs) 1421, 1425, 1426, and 1427, SP_PCK (sub-picture pack) 1422, A_PCK (audio pack) 1423, and DM_PCK (dummy pack) 1424. Each dummy pack size is 2,048 bytes. However, since each pack has a 14-byte pack header at the start of it, the information size recorded in each pack is 2,034 bytes.

Note that DM_PCK (dummy pack) 1424 is inserted for the purposes of:

addition of information to be additionally recorded after video recording (for example, memo information indicating that after-recording information is inserted into an audio pack and replaced by a dummy pack is inserted in sub-picture information (a sub-picture pack) and is replaced by a dummy pack).

The recording area of a DVD-RAM (DVD_RTR) disc as an example of the information storage medium (optical disc 1001) shown in FIG. 1A is segmented into a plurality of sectors. 2,048-byte data can be recorded per sector. In this DVD-RAM disc, recording/playback is done in units of sectors (2,048 bytes). Hence, when a DVD-RAM disc is used as the information storage medium (optical disc 1001), the respective packs are recorded in units of sectors 1431 to 1437, as shown in FIG. 3F.

As shown in FIGS. 3B and 3D, VTS (video title set or RTR_MOV.VRO) 1402 is formed by a sequence of all VOBs 1403 to 1405 in AV file 1401. By contrast, a playback sequence described in playback control information (pack control information) 1021 can designate an arbitrary range in an arbitrary VOB, and can play it back in an arbitrary playback order.

Basic video information units upon playback are called cells 1441, 1442, and 1443. Each of cells 1441, 1442, and 1443 can designate an arbitrary range in an arbitrary VOB, but cannot make designation across a plurality of VOBs (one cell cannot set a range by linking a plurality of VOBs).

In the embodiment shown in FIG. 3G, cell 1441 designates one VOBU 1412 in VOB 1403, cell 1442 designates whole VOB 1404, and cell 1443 designates the range of only a specific pack (V_PCK 1427) in VOBU 1414.

Information indicating a video information playback sequence is set by PGC (program chain) 1446, and is described by designating a single cell or by link information of a plurality of cells. For example, in the embodiment shown in FIG. 3H, PGC (program chain) 1446 forms a playback program as a link of cells 1441, 1442, and 1443 (the relationship between the cell and PGC will be described in detail later).

VOBU 1403 in FIG. 3D can contain not only video information-but also audio information. In this case, VOBU 1411 that forms VOB 1403 contains V_PCK 1421 and SP_PCK 1422 that construct a video part, and A_PCK 1423 and DM_PCK (for after recording) 1424 that construct an audio part.

The video part is formed by a sequence header and GOP header composed of some contents on the start side of V_PCK, MPEG I-picture composed of the contents of a V_PCK group, a sequence end code composed of some contents on the end side of V_PCK, and sub-picture unit SPU composed of the contents of SP_PCK.

The audio part contains audio data to be played back in synchronism with still picture playback using I-picture of the video part, and is comprised of one or more audio frames.

The contents of allocation map table 105 in FIG. 1F will be described below with reference to FIG. 4.

As described above, the recording area of the DVD-RAM disc is segmented into a plurality of sectors, and logical sector numbers (LSNs) are continuously assigned in ascending order from the inner side.

A case will be examined below wherein video information is recorded in data area 1004 of the information storage medium (optical disc 1001) in the following sequence.

1. An area for recording AV file 1401 is assured in a continuous area (a<g) from logical sector numbers (LSN) a+1 to g in data area 1004 on the information storage medium (optical disc 1001).

2. Data of VOB#1 1461 is recorded in a continuous area (b<c) from logical sector numbers (LSN) b+1 to c in the area for recording AV file 1401.

3. Data of VOB#2 1462 is recorded in a continuous area (d<e) from logical sector numbers (LSN) d+1 to e in the area for recording AV file 1401.

As a result of the above processes in 1. to 3., three unrecorded areas "from a+1 to b", "front c+1 to d", and "from e+1 to g" in logical sector numbers (LSN) remain in AV file 1401. When video information of VOB#3 with a large data size is recorded in these unrecorded areas, the following processes are required.

4. Data of VOB#3 is segmented into a plurality of data in correspondence with the unrecorded area sizes in the area for recording AV file 1401.

5. First segmented data 1463 of VOB#3 is recorded in a continuous area (a<b) from logical sector numbers (LSN) a+1 to b.

6. Next segmented data 1464 of VOB#3 is recorded in a continuous area (c<d) from logical sector numbers (LSN) c+1 to d.

7. Last segmented data 1465 of VOB#3 is recorded in a continuous area (f<g) from logical sector numbers (LSN) f+1 to g.

As a result, unrecorded area 1460 "from e+1 to f" in logical sector numbers (LSN) remains in AV file 1401. FIG. 4 shows the distribution of physical recorded positions of VOBs in AV file 1401 as a result of the above processes in 1 to 7.

As can be seen from the above description, when data in AV file 1401 is partially erased or when new data is additionally recorded in an unrecorded area in AV file 1401, single VOB data must be segmented and recorded at a plurality of locations like data 1463, 1464, and 1465 of VOB#3.

Allocation map table 1105 shown in FIG. 1F shows information indicating the distribution of physical positions of identical data distributed and recorded in AV file 1401 in units of VOBs. FIG. 5 shows the information contents of allocation map table 1105 taking the data allocation shown in FIG. 4 as an example. Allocation map table 1105 is comprised of distribution information 1621 of positions of unrecorded areas, and a plurality of pieces of distribution information 1622, 1623, and 1624 of positions of recorded data in units of VOBs.

A cluster of data units having continuous logical sector numbers in each VOB will be defined as an "extent". In the embodiment shown in FIG. 4, data of VOB#3 are recorded as three extents. In the above example, since an area from logical sector numbers a+1 to b has continuous logical sector numbers, this area forms "extent#γ 1473". That is, the recording positions of the data of VOB#3 are distributed to three locations, i.e., extent#γ 1473, extent#δ 1474, and extent#ε 1475.

The position distribution information that pertains to unrecorded areas or each VOB in allocation map table 1105 shown in FIG. 5 records the number 1601, 1602, 1603, or 1604 of extents at its first position. After that, first address 1606, 1607, 1608, 1609, 1610, or 1611 and size 1614, 1615, 1616, 1617, 1618, or 1619 of each extent are recorded. The first address is expressed by a "differential number" (or relative sector number) from the first logical sector number of AV file 1401. When each first address is expressed by a differential number, if the entire contents of AF file 1401 are transplanted to another information recording medium, information in allocation map table 1105 need not be changed, thus improving file portability. In FIG. 5, the extent size is expressed by the number of sectors. The extent size may be expressed by the-last address of each extent in place of the number of sectors in FIG. 5.

In the DVD-RAM disc (DVD_RTR disc) format, information indicating a physical address on the information storage medium (optical disc 1001) is called a physical sector number (PSN), the entire address used by the file system is called a logical sector number (LSN), and an address defined on the file system in data area 1004 in FIG. 1A is called a logical block number (LBN), thus distinguishing PSN, LSN, and LBN from each other. However, if this convention is always observed, the description becomes complicated. For this reason, FIG. 5 uses an expression based on logical sector numbers (LSN) for the sake of easy understanding.

Figure 6:
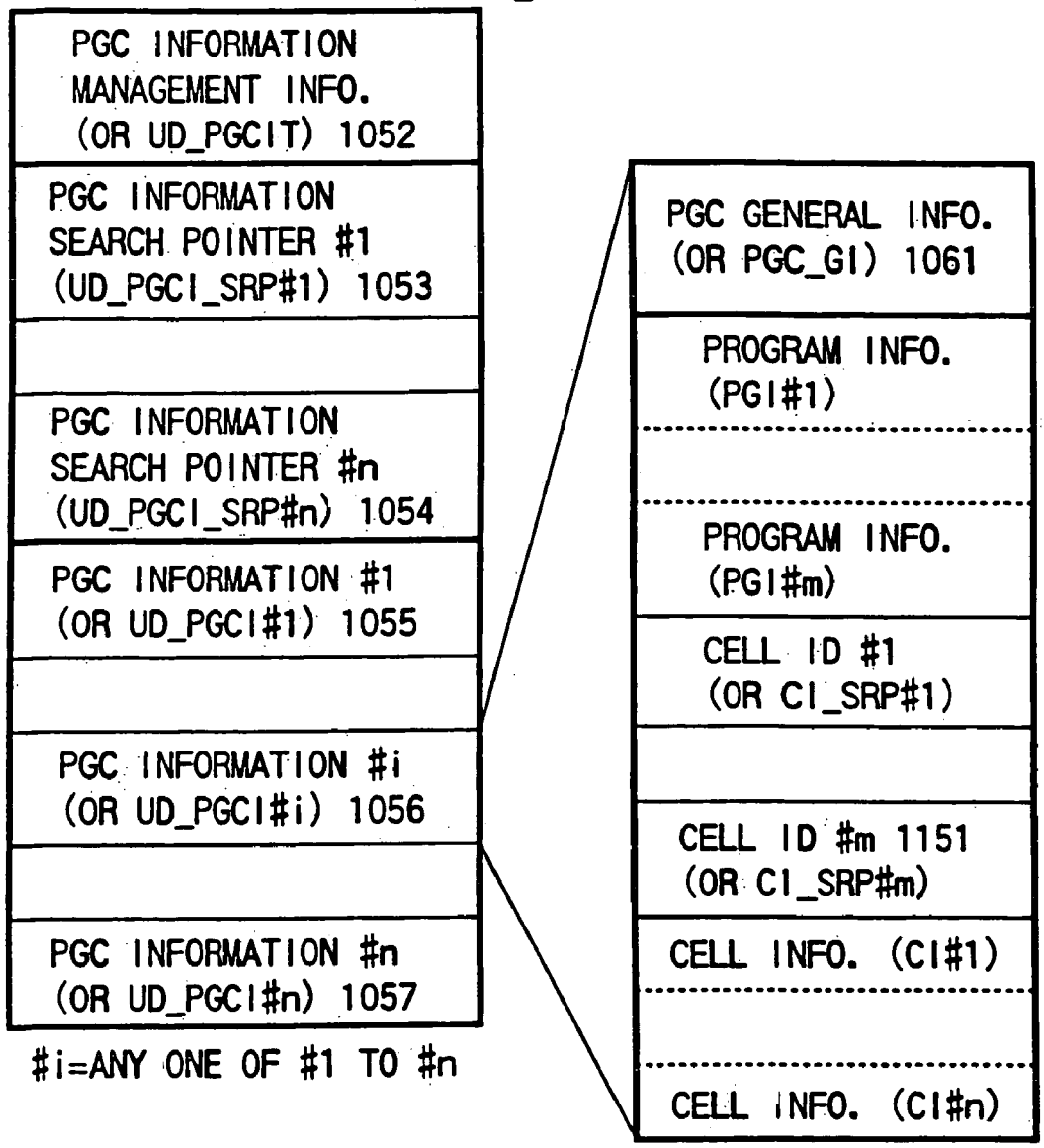
FIG. 6 is a view for explaining the data structure in program chain control information (e.g., user-defined PGC information table UD_PGCIT)

The contents of playback control information 1021 will be described below with reference to FIGS. 6 to 7B. PGC (program chain) control information 1103 in playback control information 1021 has the data structure shown in FIG. 6, and the playback order is determined by PGC and cells. PGC is a unit that designates the playback order of cells and executes a given playback sequence. On the other hand, each cell indicates a playback period that designates playback data in each VOB by the start and end addresses, as shown in FIGS. 3D to 3F.

PGC control information 1103 is composed of PGC information management information 1052, one or more search pointers 1053 and 1054 of PGC information, and a plurality of pieces of PGC Information 1055, 1056, and 1057.

PGC information management information 1052 contains information (number of PGC information) indicating the number of PGCs. Each of search pointers 1053 and 1054 of PGC Information points to the first position of each PGC information, and allows an easy search. Each PGC information 1055, 1056, or 1057 consists of PGC general information 1061, one or more pieces of program information (PGI#m), one or more cell IDs (or CI_SRP#m), and one or more pieces of cell information (CI#m). PGC general information (PGC_GI) 1061 contains information (number of cell playback information) indicating the playback time of PGC and the number of cells. Or PGC_GI 1061 may contain information indicating the number of programs (PGs) and the number of search pointers (CI_SRP) of cell information.

Figures 7A, 7B:
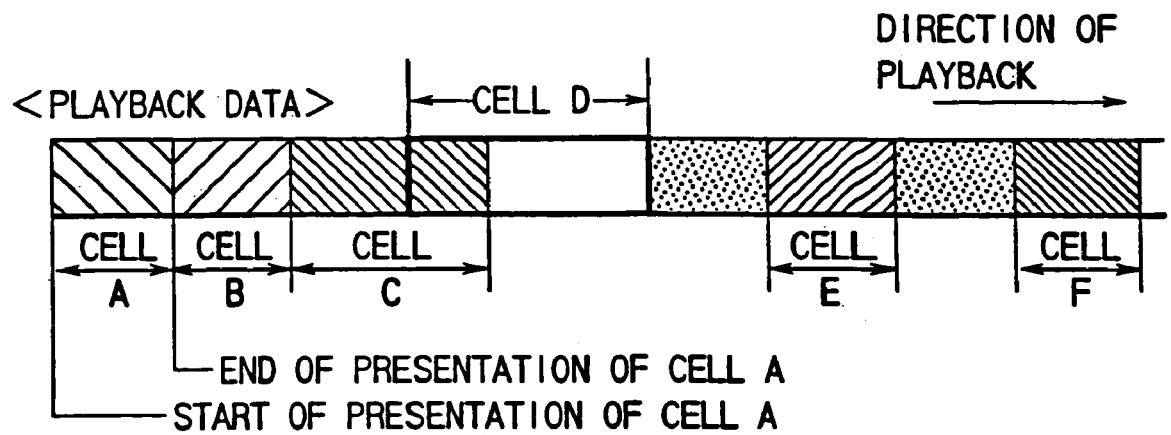
FIGS. 7A and 7B are views for explaining playback examples of video information (cell information) based on program chain PGC.

As shown in FIG. 7A, playback data are designated as a playback period in units of cells from cell-A to cell-F, and PGC information is defined in each PGC.

1. PGC#1 exemplifies a case wherein it is composed of cells that designate a continuous playback period, and its playback order is cell-A→cell-B→cell-C.

2. PGC#2 exemplifies a case wherein it is composed of cells that designate an intermittent playback period, and its playback order is cell-D→cell-E→cell-F.

3. PGC#3 exemplifies a case wherein playback can be done intermittently irrespective of the direction of playback or repetitive playback, and its playback order is cell-E→cell-A→cell-D→cell-B→cell-E.

Control information (RTR.IFO) 1011 shown in FIG. 1D or 2 contains navigation data RTR_VMG (real time recording video manager) corresponding to control information 1101 and control information 1021, as shown in FIG. 1E. This RTR_VMG contains video title set information VTSI (or information RTR_VMGI of RTR_VMG) 1106, as shown in FIG. 1F.

This information (RTR_VMGI) 1106 contains information used upon playing back a sequence of VOBs 1403, 1404, 1405, . . . , shown in FIG. 3D.

The data structure and contents of RTR_VMG in FIG. 1E (or RTR.IFO in FIG. 2) will be explained below with reference to FIG. 8.

Figure 8:
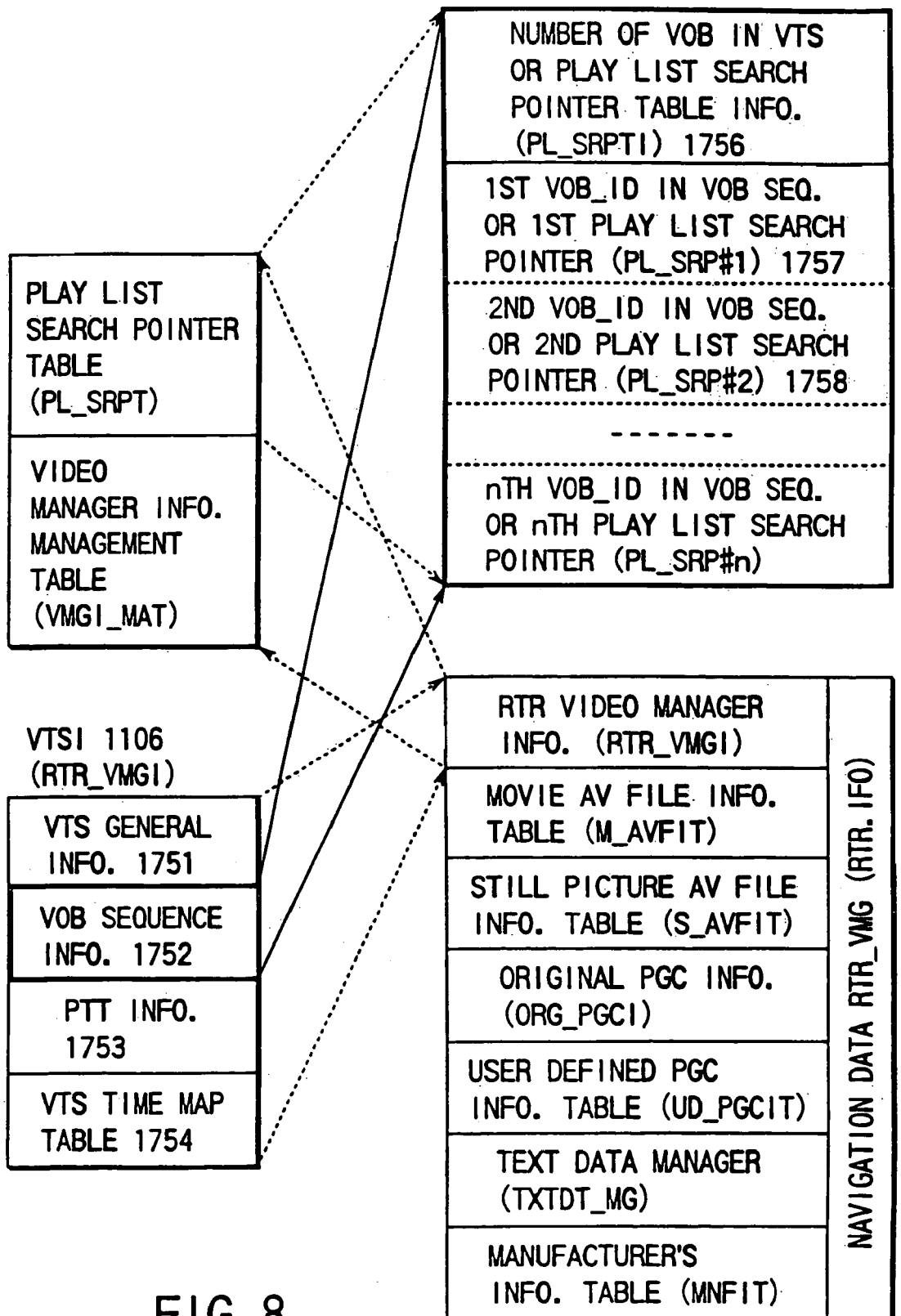
FIG. 8 is a view for explaining the data structure of management information (video title set information VTSI or management information RTR_VMGI for video real-time recording)

As shown in FIG. 8, navigation data RTR_VMG (control information RTR.IFO) is comprised of RTR video manager information (RTR_VMGI), a movie AV file information table (M_AVFIT), a still picture AV file information table (S_AVFIT), original PGC information (ORG_PGCI), a user-defined PGC information table (UD_), a text data manager (TXTDT_MG), and a table (MNFIT) of information that pertains to the manufacturer.

RTR_VMGI contained in this RTR_VMG corresponds to video title set (VTS) information 1106 shown in FIG. 1F.

This information (RTR_VMGI) 1106 contains VTS general information 1751, VOB sequence information 1752, PTT information 1753, and VTS time map table 1754, as shown in FIG. 8.

Put otherwise, this information (RTR_VMGI) 1106 contains a play list search pointer table (PL_SRPT) corresponding to VOB sequence information 1752, and a video manager information management table (VMGI_MAT) corresponding to VTS general information 1751.

Table PL_SRPT contains information 1756 indicating the number of VOBs in VTS (or the number of play list search pointers and the end address of PL_SRPT), information 1757 indicating the ID of the first VOB in a VOB sequence (or first play list search pointer PL_SRP#1), information 1758 indicating the ID of the second VOB in the VOB sequence (or second play list search pointer PL_SRP#2), and the like.

Each play list search pointer (PL_SRP) contains information (PL_TY) indicating the type of a play list, PGC number information (PGCN) corresponding to this play list, information (PL_CREATE_TM) indicating the date of creation of this play list, information (PRM_TXTI) of primary text associated with this play list, number information (IT_TX-TI_SRPN) of a search pointer of item text used in this play list, and thumbnail pointer information (THM_PTRI) indicating a thumbnail picture corresponding to the recording contents of this play list.

The table (PL_SRPT) that contains these pieces of information 1756, 1757, 1758, . . . corresponds to VOB sequence information 1752 contained in VTSI (RTR_VMGI) 1106.

The contents of VTSI (RTR_VMGI) 1106 can be summarized as follows.

That is, as shown in FIG. 8, the data structure in video title set information (or RTR_VMGI) 1106 records:

video title set general information 1751 . . . This information pertains to general contents of a video title set (or RTR data in AV file 1401 in FIG. 2);

video object sequence information 1752 . . . In the data structure shown in FIGS. 3A to 3J, serial numbers are set for all VOBs in video title set 1402 (=AV file 1401). This information describes serial number information of VOBs according to this sequence;

part_of_titles information 1753 . . . . Object data recorded in AV file 1401 are grouped in units of associated data for the purpose of each data management and search, and video title names are set in units of groups. The group (part_of_title) is formed of a set of VOBs. This information describes VOB information contained in each part_of_title; and video title set time map table 1754 . . . This information pertains to VOBU position information at specific time intervals according to the video object sequence in relation to VOBs which are classified into video objets 1012 and audio objects 1014 in video title set 1402.

The detailed data structure in video object sequence information 1752 is shown on the right side in FIG. 8. That is, the total number 1756 of VOBs (or PL_SRPTI) contained in the video title set is recorded at the first position. After that, VOB_IDs (or PL_SRP#1, PL_SRP#2, . . . , PL SRP#n) 1757, 1758, . . . corresponding to serial numbers are recorded in the sequence (video object sequence) order.

The sequence indicated by video object sequence information 1752 can be arbitrarily set by the user or information recording/playback apparatus side in, e.g., "the recording order to AV file 1401 (ascending order of recording time)", "the recording allocation order on the information storage medium (optical disc) shown in FIG. 4", "the VOB size order", and the like. By sequentially determining the order of all VOBs in VTS (video title set) 1402, a user interface similar to a VTR that records video data on a single table can be provided.

For example, the following processes can be done using video object sequence information 1752:

to search for a scene the user wants to watch by fast-forwarding (FF) or rewinding (FR) a tape;

to confirm the entire recording contents by fast-forwarding (FF) the tape; and to search for an unnecessary recorded scene by fast-forwarding (FF) or rewinding (FR) the tape, and to overwrite new video information on that scene.

Figures 9A, 9B, 9C, 9D, 9E, 9F:
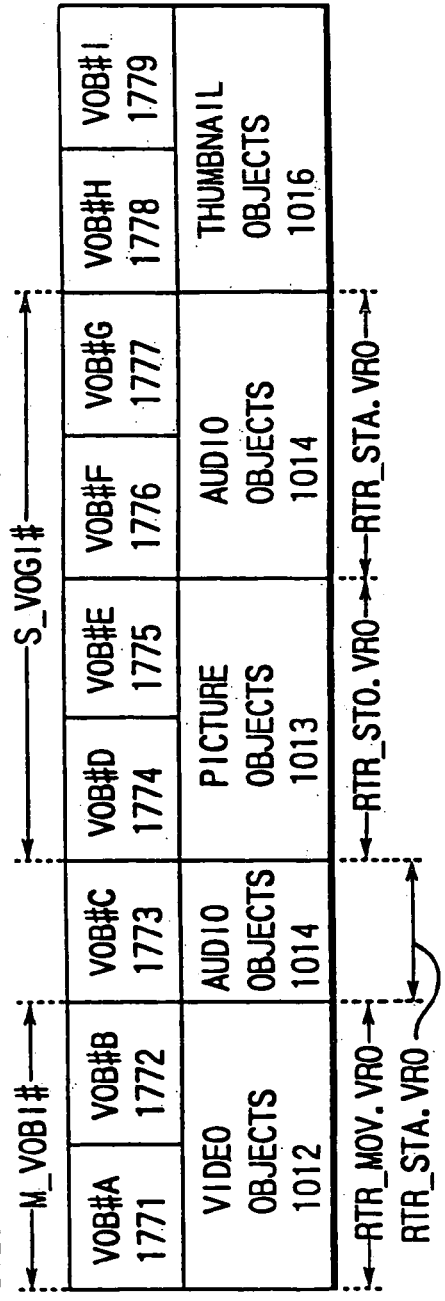
FIGS. 9A to 9F are views for explaining the order of sequence of video object VOBs according to video object information (M_VOBI for a moving picture or S_VOGI for a still picture)

The information contents of video object sequence information 1752 shown on the right side in FIG. 8 will be explained below with reference to FIGS. 9A to 9F. A case will be examined first wherein VOB#1 to VOB#3 are recorded to have the allocation order on the information storage medium (optical disc) shown in FIG. 4, and this recording is done in the order of 1. to 7. described in "description of allocation map table contents". FIG. 9C shows the sequence order which is set for these data in "the recording order to AV file 1401 (ascending order of recording time)". Compared to FIG. 4, the allocation order from extent#α 1471 to extent#ζ 1470 has changed. "First VOB_ID 1757 in the video object sequence" shown in FIG. 8 designates "VOB#1 1461" in FIG. 9C, and "second VOB_ID 1758 in the video object sequence" designates "VOB#2 1462" in FIG. 9C.

FIG. 9F shows another embodiment designated by video object sequence information 1752. VOB#A 1771 and VOB#B 1772 belong to (are classified to) video objects (movie VOB information M_VOBI#) 1012, VOB#C 1773, VOB#F 1776, and VOB#G 1777 to audio objects 1014, and VOB#D 1774 and VOB#E 1775 to picture objects (still picture VOB group information S_VOGI#) 1013. In this way, the sequence order can be designated independently of the VOB types. In FIG. 9F, VOBs (VOB#H 1778 and VOB#I 1779) that belong to thumbnail objects 1016 are set at the end of the sequence.

The recording format upon recording still picture information on the information storage medium (optical disc 1001) shown in FIG. 1A will be explained below.

Still picture information or audio information (information that additionally records audio data of a comment for each still picture information by after recording) to be added later to still picture information are recorded at a location of picture objects 1013 or audio objects 1016 in FIG. 1D. For example, the format is designed to be capable of continuously recording a plurality of still pictures assuming that a plurality of still pictures sensed by a digital camera are recorded on the information storage medium (optical disc 1001) at one time. In order to allow to continuously record a plurality of still pictures, the format is designed to record at least two still pictures at neighboring locations on the information storage medium (optical disc 1001).

A still picture or audio information to be added to the still picture follows the data structure shown in FIGS. 3A to 3J to attain format continuity and matching with video information (video objects 1012). In MPEG1 or MPEG2 as one type of recording format (video information compression format) of video information, compressed information for one corresponding video frame is present at the start position of the aforementioned GOP in the form of "I-picture".

As shown in FIGS. 10C and 10I, input still pictures are converted into I-pictures 1706, 1707, 1708, and 1709 using the MPEG1 or MPEG2 compression technique, and these I-pictures are recorded on the information storage medium (optical disc 1001) while being stored in V_PCKs (video packs) 1661, 1662, 1663, 1668, 1669, 1670, 1671, 1672, 1673, and 1674.

As described above, on the DVD-RAM (DVD_RTR) disc, each V_PCK (video pack) is recorded in units of sectors each having a recording size of 2,034 bytes (see FIG. 3F) [one sector size is 2,048 bytes, but since each pack has a 14-byte pack header, the recording size per pack is 2,034 bytes].

When the I-picture size corresponding to one still picture information is smaller than an integer multiple of 2,034 bytes, dummy information 1704 is recorded in that short field. In this way, each I-picture can just fall within an integral number of sectors.

Figure 13:
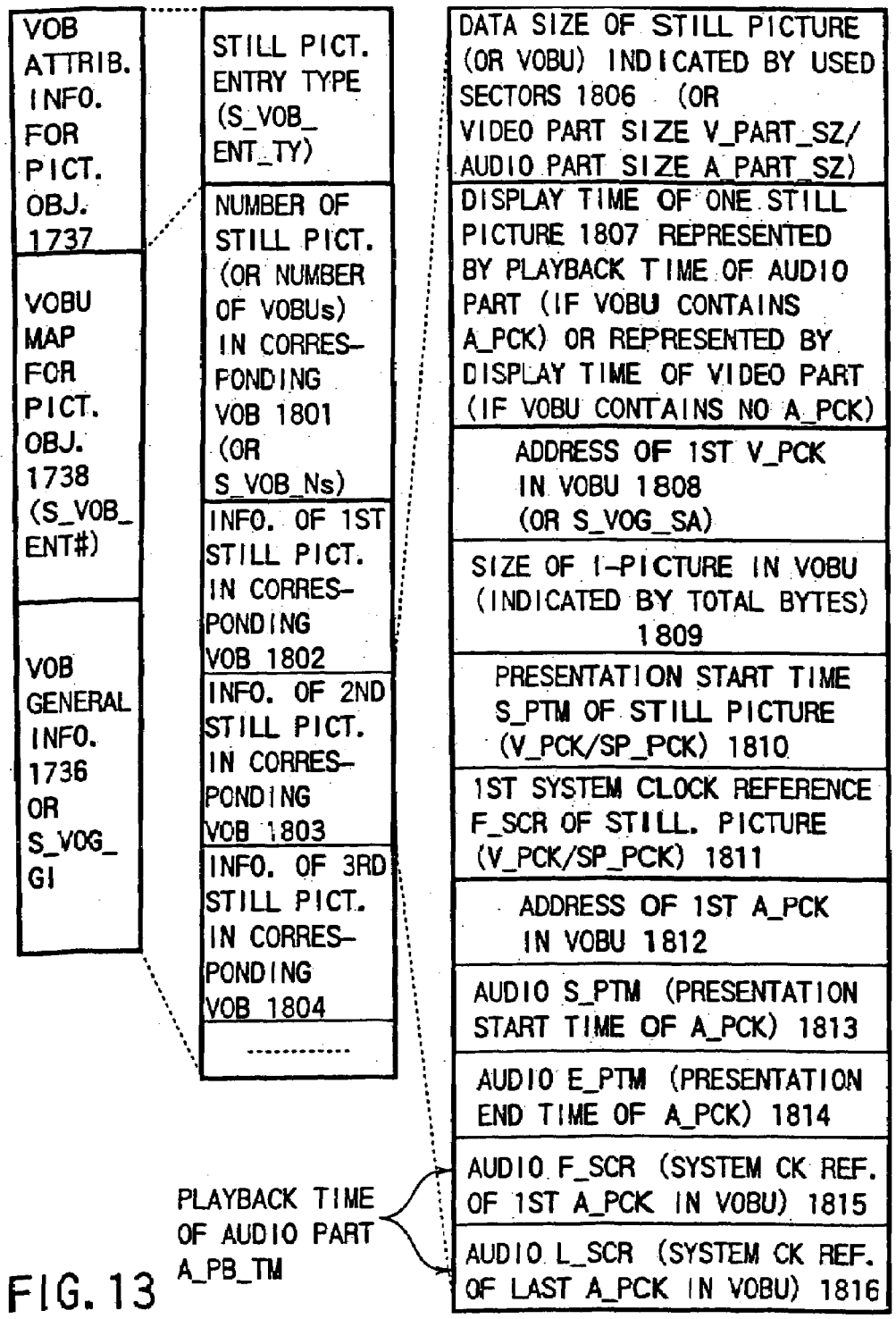
FIG. 13 is a view for explaining the data structure (the data structure that pertains to S_VOGI in FIG. 9) of a video object unit VOBU in a picture object.

Since I-picture size 1808 in each VOBU is recorded in information of a VOBU map for picture objects, as shown in FIG. 13 (to be described in detail later), the start position of dummy information 1704 in V_PCK (video pack) 1670 can be determined. Hence, the contents of dummy information 1704 can be arbitrarily set.

For example, as the contents of dummy information 1704, for example, a sequence end code (or a packet header with stream ID=0xbe) can be recorded as specific information which can be specified as dummy when it is played back, in addition to padding data with all "0" or all "1"s.

Note that allocation of I-pictures is omitted in FIGS. 10F and 10L, but the data has the same structure as in FIGS. 10C and 10I.

For example, when a still picture is sensed using a digital camera, and some comment is to be directly added by handwriting on that sensed picture (still picture), the information of the comment contents can be recorded as a sub-picture stream in SP_PCKs (sub-picture packs) 1681, 1682, and 1683 in addition to the still picture recorded as I-picture in V_PCK. Upon playback, I-picture still picture information in V_PCK and sub-picture information in SP_PCKs are displayed to overlap each other.

Audio information that stores a comment for each still picture as audio data is recorded in A_PCKs (audio packs) 1691 to 1702.

In this manner, V_PCKs 1661 to 1674, SP_PCKs 1681 to 1684, and A_PCKs 1691 to 1702 are gathered in units of associated still pictures, and are grouped in units of VOBUs (video objects for picture objects) 1641 to 1650. Hence, in the format shown in FIGS. 10A to 10L, each still picture forms one VOBU.

In the embodiment shown in FIGS. 10A to 10L, V_PCKs and SP_PCK are recorded before A_PCKs in each VOBU. As a result, the individual packs are separated in each VOBU, and information in each pack can be easily managed.

However, the embodiment of the present invention is not limited to the aforementioned limitation, and allows to allocate A_PCKs, V_PCKs, and SP_PCKs in an arbitrary order as in the recording format in video objects 1012.

Furthermore, V_PCKs 1664 having still picture information recorded in the I-picture format must be allocated in single VOBU 1642, but A_PCK (1694) that records part of audio information associated with VOBU 1642 can be allocated in next VOBU 1643.

As will be described later with reference to FIG. 13, continuous audio information can be separated in correspondence with each still image using information of E_PTM (presentation terminating time) 1814 of audio information recorded in VOBU map 1738 for picture objects.

As the format that can continuously record a plurality of pieces of still picture information, the format structure shown in FIGS. 10A to 10L permits the following two different methods and mixed recording by both the methods.

1) One VOB is formed of a plurality of VOBUs.

2) One VOB has only one VOBU, and VOBs each of which records a single still picture are grouped to construct VTT (video title).

FIGS. 10D to 10L show the former format structure 1), and FIGS. 10A to 10C show the latter format structure 2). In the former format structure 1), FIGS. 10D to 10F show the basic structure. As special examples, FIGS. 10G to 10I show a structure which does not include any audio information (A_PCK), and FIGS. 10J to 10L show a structure which does not include any original still picture (V_PCK). After a plurality of pieces of still picture information which do not contain any audio information and are sensed by a digital camera are recorded on the information storage medium (optical disc 1001) at one time, the user may often input memo data (additionally recorded as SP_PCK) or audio data (additionally recorded as A_PCK) for each still picture while observing the plurality of pieces of recorded still picture information. In such case, efficient editing and recording can be done when only additional data (memo and audio data) are gathered to form and record a VOB different from that which records original still picture information, on the information storage medium (optical disc 1001). When additional data are recorded as another VOB, the contents of a VOB that records original still picture information need not be changed. In this fashion, the recording format in VOB 1634 that gathers only additional data (memo and audio data) for the purpose of easy editing for still picture information has a structure (which contains only A_PCK and SP_PCK without any V_PCK) similar to that shown in FIGS. 10J to 10L.

Note that I-picture data shown in FIGS. 10C and 10I corresponds to that shown in FIG. 3J, and dummy data shown in FIGS. 10C and 10I corresponds to dummy pack DM_PCK shown in FIG. 3F.

Also, video pack V_PCK, sub-picture pack SP_PCK, and audio pack A_PCK shown in FIGS. 10A to 10L respectively correspond to V_PCK, SP_PCK, and A_PCK shown in FIG. 3F.

Dummy pack DM_PCK shown in FIG. 3F or FIGS. 10C and 10I can be appropriately used for the purpose of audio data after recording and the like. For example, when the size of an encoded I-picture data cluster does not match an integer multiple of the block size (16 sectors/32 kbytes) of an error correction code (ECC) that uses a product code, DM_PCK can be added to this data cluster as needed so that the I-picture data cluster size matches an integer multiple of 32 kbytes.

When the cluster sizes of all I-picture data that form still pictures are matched with an ECC block unit (an integer multiple of 32 kbytes) by adding DM_PCK, the following merits are obtained.

For example, when one of a plurality of still pictures that have been continuously recorded on the medium shown in FIG. 1 is replaced by another still picture (or erased), since the still picture (I-picture) to be replaced (or erased) has an ECC block unit even if it has a size different from the original still picture, the ECC block units of I-pictures which are not replaced (not erased) are not disturbed.

For this reason, even when one of still pictures is replaced by another still picture (or erased), ECC coding of I-pictures which are not replaced (not erased) need not be redone. Since ECC coding need not be redone, the operation speed of an RTR recorder can be improved accordingly, and recorded still pictures can be smoothly edited (to replace or erase some still pictures).

However, when the size of a still picture to be replaced is larger than the original still picture size, the still picture data to be replaced is partially recorded at another recording location. That is, the replaced still picture gets fragmented. When the seek speed of a disc drive that reads out data from the medium shown in FIG. 1 is low, playback of the fragmented still picture requires a relatively long period of time. Hence, when an RTR recorder having no high-speed drive is used in playing back still pictures, the recorded data are preferably arranged (to be re-recorded to remove fragmentation) as needed.

When the latter format 1) shown in FIGS. 10A to 10C is adopted as the format that allows to continuously record a plurality of pieces of still picture information, a plurality of VOBs are grouped, as shown in FIG. 3C, to belong to different groups of VTTs (video titles) 1407 and 1408.

The recording format shown in FIGS. 10A to 10L can record at least two still pictures at neighboring locations on the information storage medium (optical disc 1001), and can continuously record a plurality of still pictures in general. For this reason, for example, when a plurality of still pictures sensed by a digital camera are recorded on the information storage medium (optical disc 1001) at one time, a practical effect and feature can be obtained, i.e., quick recording can be attained.

In addition, the recording format that can record a plurality of still pictures in a VOB has the following practical effects.

In the conventional recording format for a plurality of still pictures sensed by a digital camera, still pictures are divisionally recorded one by one in different data files. When still pictures are divisionally recorded in different files, neither image sensing order information among still pictures nor grouping information among still pictures are available. By contrast, a negative film (or a positive film prepared as needed) is available in case of a photographic film. For this reason, when a specific still picture is to be designated upon making an additional print, a still picture to be printed can be found by a search on the negative film in the photographing order.

Figure 11:
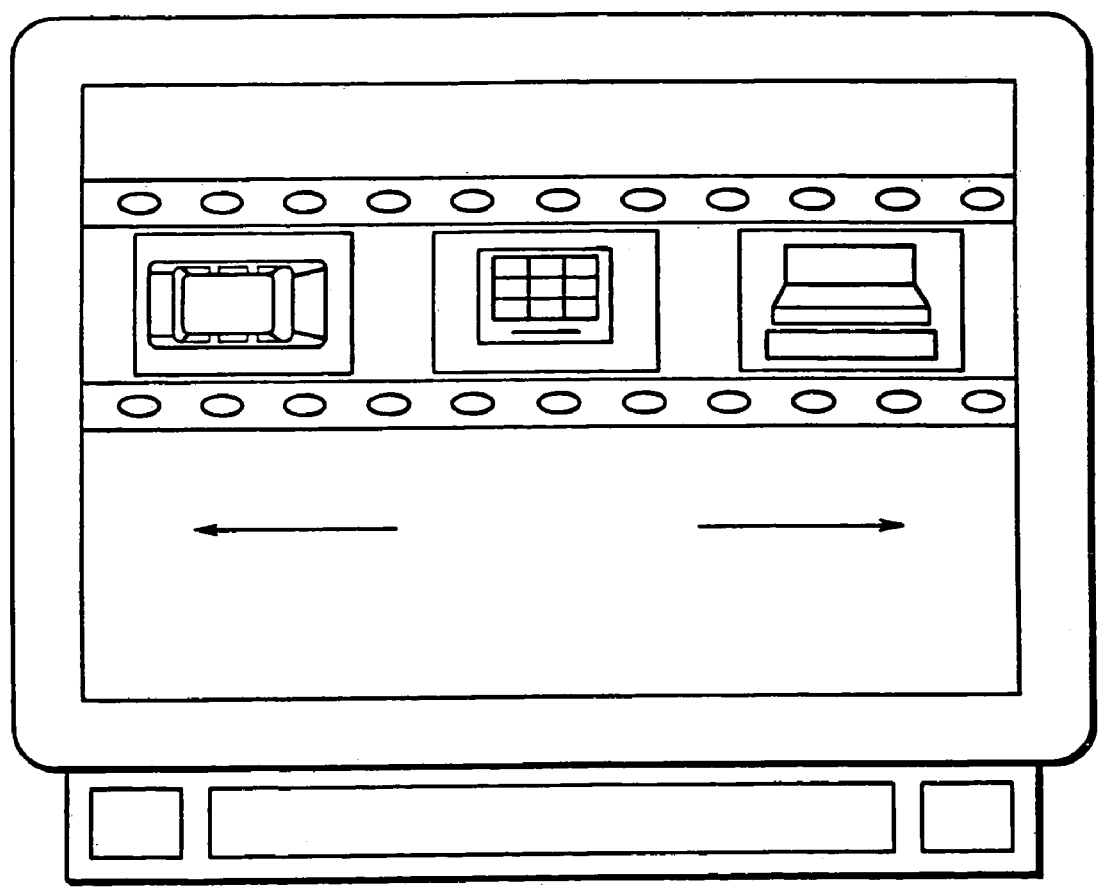
FIG. 11 shows a screen display example of picture object data (still picture) played back from the medium shown in FIG. 1.
Figure 19:
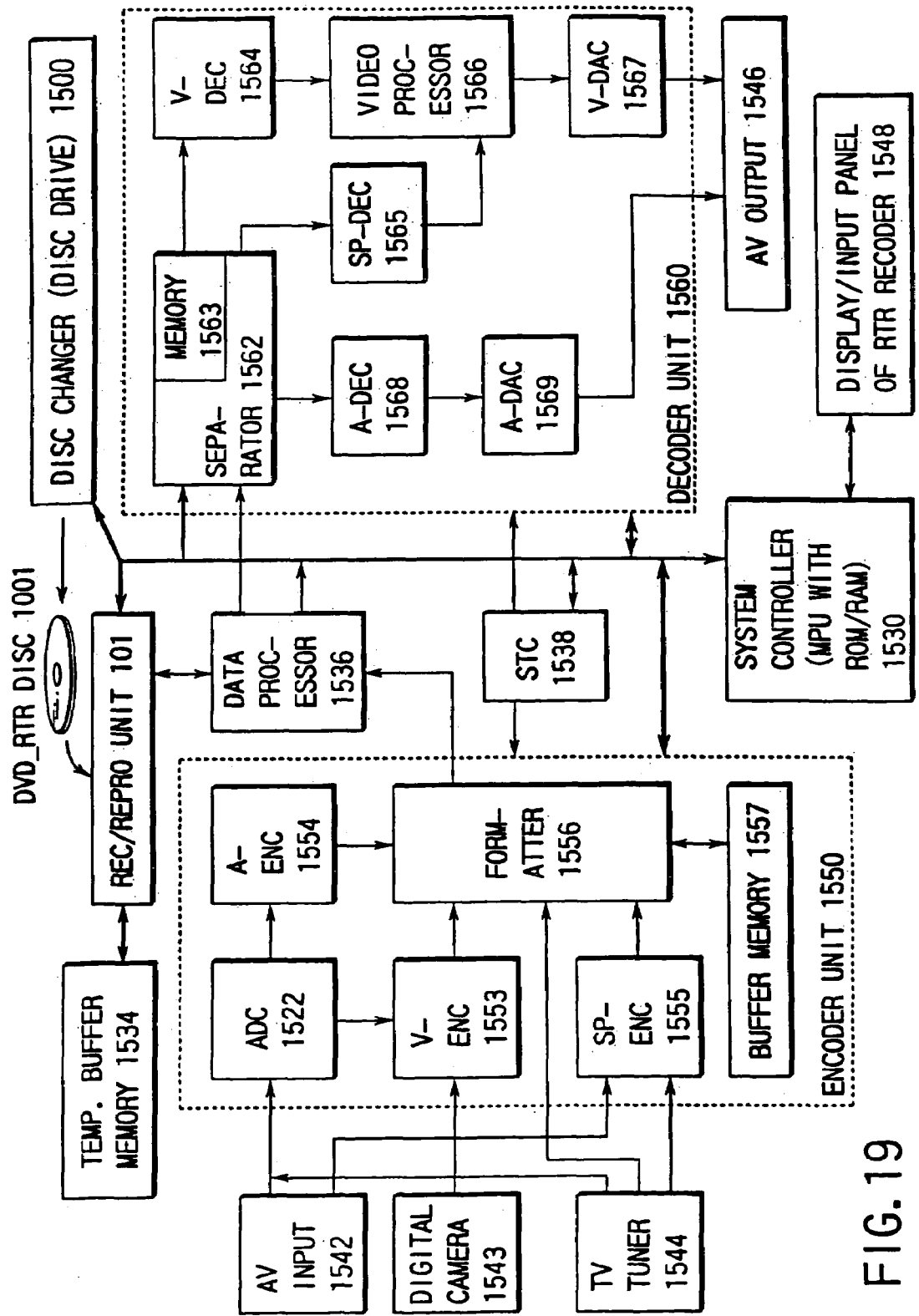
FIG. 19 is a block diagram showing an example of the arrangement of a digital video recording/playback apparatus (RTR video recorder) using the medium (a DVD_RTR disc capable of recording/playing back a video in real time) shown in FIG. 1.

In an information recording/playback apparatus (video recorder) for recording video information shown in FIG. 19, information of video object 1632 for picture objects recorded on the information storage medium (optical disc 1001) is read, and still pictures can be displayed on the screen in the allocation order of VOBUs 1642 to 1644 like a positive film shown in FIG. 11. For example, a still picture at the left end in FIG. 11 expresses information of VOBU 1642, and the central still picture expresses information of VOBU 1643. The still pictures shown in FIG. 11 can be moved to the right or left on the screen, and the user designates a still picture to be edited (or to be hard-copied). Unlike video objects 1012, still picture information designates an individual still picture using the display shown in FIG. 11. (In video objects 1012, the video information range to be edited is designated by the display or presentation time.)

Figure 12:
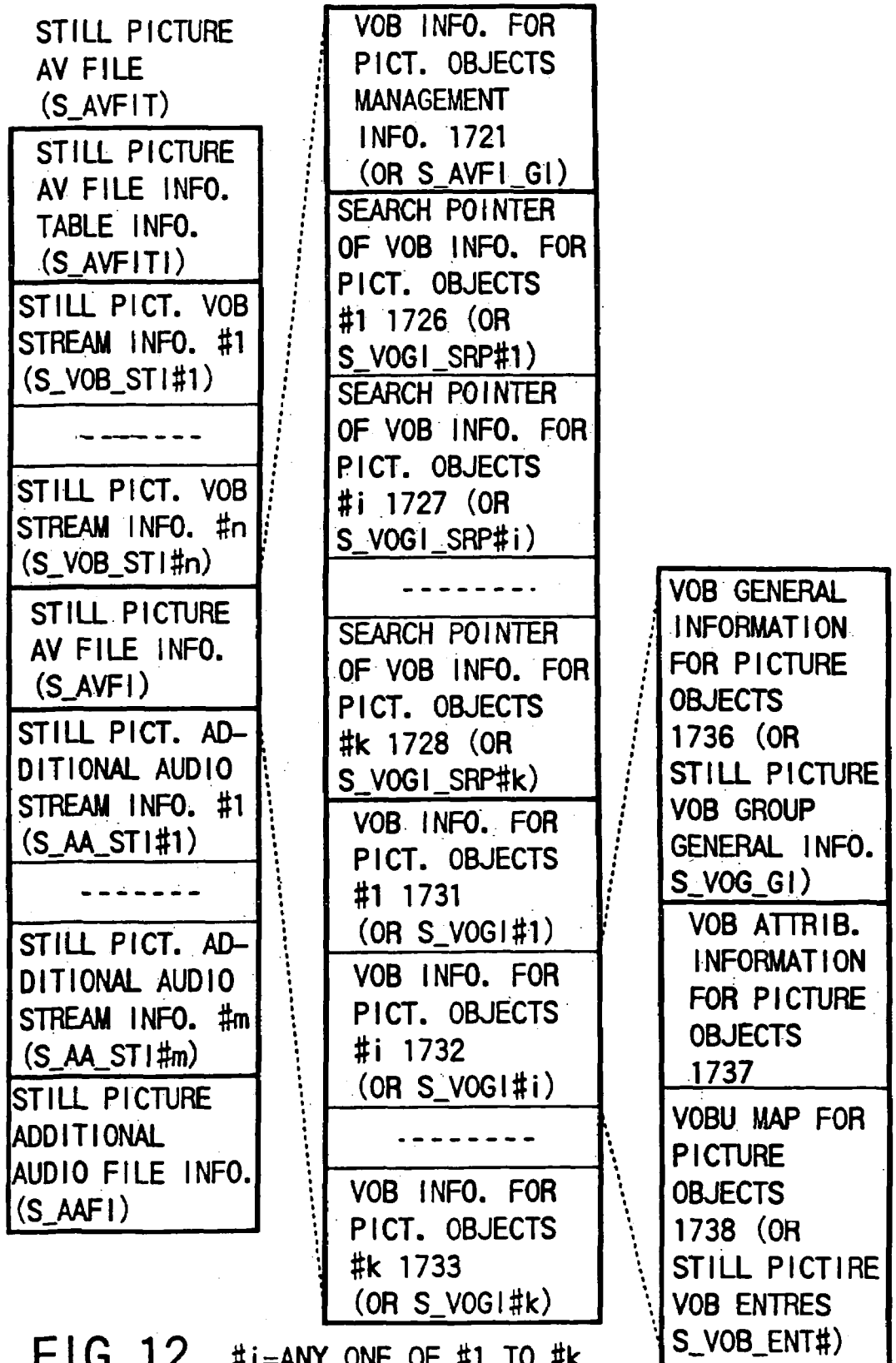
FIG. 12 is a view for explaining the data structure of information that pertains to a video object in a still picture AV file (S_AVFIT) shown in FIG. 8.

The data structure in video object information that pertains to still picture information will be explained below. Video object information (or AVFIT) shown in FIG. 1F is divided into a management information field (M_AVFIT in FIG. 8) that pertains to general video information, and a management information field (S_AVFIT in FIG. 8) that pertains to still picture information. FIG. 12 shows the data structure in the latter management information field (S_AVFIT) that pertains to still picture information.

The still picture AV file information table (S_AVFIT) contained in navigation data RTR_VMG shown in FIG. 8 contains still picture AV file information table information (S_AVFITI), still picture VOB stream information (S_VOB_ STI#1 to S_VOB_STI#n), still picture AV file information (S_AVFI), still picture additional audio stream information (S_AA_STI#1 to S_AA_STI#m), and still picture additional audio file information (S_AAFI), as shown in the left column in FIG. 12.

The still picture AV file information (S_AVFI) contains VOB information (or S_AVFI general information S_AVFI_GI) 1721 for picture objects management information, search pointer #1 (or still VOB group information search pointer S_VOGI_SRP#1) 1726 of VOB information for picture objects, . . . , #i (S_VOGI_SRP#i) 1727, . . . , #k (S_VOGI_SRP#k) 1728, and VOB information #1 (or still picture VOB group information S_VOGI#1) for picture objects, . . . , #i (S_VOGI#i) 1732, . . . , #k (S_VOGI#k) 1733, as shown in the central column in FIG. 12.

VOB information #i for picture objects (or still picture VOB group information S_VOGI#i) has the contents shown in the right column in FIG. 12 (the same applies to VOB information #1 and information #k for picture objects).

That is, VOB information #i for picture objects is comprised of VOB general information 1736 for picture objects (or still picture VOB group general information S_VOG_GI), VOB attribute information 1737 for picture objects, and VOBU map 1738 for picture objects (or one or more still picture VOB entries S_VOB_ENT#).

Note that S_VOG_GI contains the number (S_VOB_Ns) of VOBs, a still picture VOB stream information number (S_VOB_STIN), time information (FIRST_VOB_REC_TM) indicating the recording time of the first VOB in that VOB group, time information (LAST_VOB_REC_TM) indicating the recording time of the last VOB in that VOB group, and the start address (S_VOG_SA) of the VOB group in a still picture AV file. S_VOG_SA expresses a relative address from the first address of S_AVFI in units of sectors.

On the other hand, S_VOB_ENT# includes four types (types 1 to 4), which respectively have the following contents:

(1) S_VOB_ENT of type 1 contains information (S_VOB_ENT_TY) indicating the type of VOB entry of a still picture, and information (V_PART_SZ) indicating the video part size in a still picture VOB in units of sectors.

(2) S_VOB_ENT of type 2 contains information (A_PART_SZ) that expresses the original audio part size in a still picture VOB in units of sectors, and information (A_PB_TM) that expresses the playback time of this audio part in units of video fields, in addition to S_VOB_ENT_TY and V_PART_SZ of type 1. When the playback time of an actual audio part does not match a boundary of video fields, data after the video field of end data of the audio part is discarded.

(3) S_VOB_ENT of type 3 contains number information (S_AAGN) of an additional audio group contained in an audio stream added to a still picture VOB, and information (AA_ENTN) of an entry number corresponding to this sill picture VOB additional audio stream, in addition to S_VOB_ENT_TY and V_PART_SZ of type 1.

(4) S_VOB_ENT of type 4 contains S_AAGN and AA_ENTN of type 3 in addition to S_VOB_ENT_TY, V_PART_SZ, A_PART_SZ, and A_PB_TM of type 2.

S_VOB_ENT of each of types 1 to 4 commonly contains S_VOB_ENT_TY and V_PART_SZ of type 1.

Note that each S_AA_STI (#1 to #m) in the left column in FIG. 12 contains audio attribute information of an additional audio stream. From this viewpoint, S_AA_STI corresponds to VOB attribute information 1737 in the right column of FIG. 12.

A plurality of pieces of still picture information grouped to different video objects for picture objects (VOBs for picture objects) are recorded in video object information 1731 for picture objects to video object information 1733 for picture objects (or S_VOGI#1 to S_VOGI#k) in FIG. 12.

The information contents shown in the right column in FIG. 12 will be briefly explained below.

Information 1732 contains the following information:

*VOB General Information 1736 for Picture Objects (or S_VOG_GI) . . .

ID information uniquely set in units of VOBs so as to designate a specific VOB in, e.g., cell playback information (CI in FIG. 1F or S_CI in FIG. 23) 1108;

VOB type information . . . information indicating information shown in FIGS. 10A to 10L to which the VOB belongs, information indicating video information (video objects 1012)/still picture information (picture objects 1013)/audio information (audio objects 1014) to which the VOB pertains, and the date of recording of the VOB on the information storage medium (optical disc 1001);

*VOB Attribute Information 1737 for Picture Objects . . .
attribute information such as resolution or the like of still picture and/or attribute information of audio information,
the number of pieces of sub-picture information, recording format, and the like;

*VOB Map 1738 for Picture Objects
. . . information that pertains to all still pictures included in a VOB.

Video object information 1721 for picture objects management information contains the following information:
the number of VOBs for picture objects contained in this AV file;
general information that pertains to VOBs contained in this AV file; and the like.

Also, address data indicating the recording locations of a plurality of pieces of video object information 1731 to 1733 for picture objects in video object information 1107 shown in FIG. 1F are recorded in search pointers 1726 to 1728 of video object information for picture objects.

The data structure in VOBU map 1738 for picture objects will be explained below with reference to FIG. 13.

As shown in the central column of FIG. 13, the number of still pictures contained in the corresponding VOB (i.e., the number of VOBUs; or number of such VOBs S_VOB_Ns) 1801 is stored at the beginning of VOBU map 1738 for picture objects (S_VOB_ENT#). Information (1802, 1803, 1804, . . . ) that pertains to each still picture (contents of a VOBU) follows in the allocation order in a VOB.

As the information (e.g., 1803) that pertains to each still picture (contents of a VOBU), information shown in the right column in FIG. 13 is recorded.

Referring to FIG. 13, information 1807 of VOBU 1411 (FIG. 3E) having one still picture information which also contains audio information is divisionally recorded on a plurality of sectors 1431 to 1434, as shown in, e.g., FIG. 3F. Data size (V_PART_SZ and/or A_PART_SZ) 1806 for one still picture information (VOBU) is indicated by the number of sectors used in divisional recording.

In case of a VOBU which includes A_PCK (audio pack), as shown in FIGS. 10A to 10C or FIGS. 10D to 10F, display time 1807 of one still picture means the playback time of audio information in a VOBU. On the other hand, in case of a VOBU which includes no A_PCK (audio pack), as shown in FIGS. 10G to 10I, display time 1807 means the still display period of a still image.

As information that pertains to still image information itself in a VOBU that records one still picture information, the following information (the right column in FIG. 13) is recorded.

*start V_PCK Address (or S_VOG_SA) 1808 in the Corresponding VOBU

. . . Taking FIGS. 10A to 10L as an example, address data of V_PCKs 1661, 1664, 1665, 1666, 1667, 1668, 1671, 1674, and the like located at the start positions of VOBUs are recorded. When the ID of a VOB that contains a still image the user wants to watch, and the still picture number (VOBU number) in that VOB are designated, an optical head (not shown) directly accesses the start V_PCK address of the corresponding VOBU using this address data.

In general, as address information, the LAN (logical sector number) directly indicating the position on the information storage medium (optical disc 1001) is used, as shown in FIG. 4. However, the present invention is not limited to such specific address indication method, and other application examples are available. For example, as shown in FIG. 9C, the address on the medium may be indicated by the number of sectors (relative address) by counting sectors in the sequence order from the first address of a given VOB in accordance with the sequence order of data.

*I-Picture Size 1809 in Corresponding VOBU

. . . As has been described above with reference to FIG. 10C or FIG. 10I, dummy information 1704 is recorded in a field which is short from an integer multiple of 2,034 bytes as the pack size in the data sizes of I-pictures 1706 and 1707. Hence, when the I-picture size is known in advance, the recording location of dummy information 1704 can be detected, and the next location can be accessed without playing back that location, thereby realizing high-speed playback.

*S_PTM (Presentation Starting Time) 1810 of Still Picture (V_PCK & SP_PCK)

. . . This information indicates the display timing of a still picture and a sub-picture added thereto upon playback. In this embodiment, a still picture recorded in V_PCK and a sub-picture to be added to that picture are simultaneously displayed upon playback. S_PTM is used to set the display timing in relation to audio information in one VOBU.

*First_SCR (First System Clock) 1811 of Still Picture (V_PCK)

. . . This information means the system clock value upon creating first V_PCK in a VOBU upon recording on the information storage medium (optical disc 1001), and is used upon executing seamless (continuous) playback.

As information that pertains to audio information in a VOBU which records one still picture information, the following information is recorded.

*first A_PCK Address 1812 in VOBU

. . . Taking FIGS. 10A to 10L as an example, address data of, e.g., A_PCKs 1691, 1693, 1694, 1695, 1696, 1699, 1702, and the like located at the start positions of VOBUs are recorded. When the ID of a VOB that contains a still image the user wants to watch, and the still picture number (VOBU number) in that VOB are designated, an optical head (not shown) directly accesses the start V_PCK address of the corresponding VOBU using this address data.

As shown in FIG. 14C, in the present invention, audio information (A_PCK information) in one VOB can be displayed in combination with still picture information that belongs to another VOB. Hence, this information is used when audio information alone in a VOB is selectively played back.

*S_PTM (Presentation Starting Time) 1813 of Audio Information (A_PCK)

. . . This information indicates the output timing of audio information upon playback. In most cases, this value matches S_PTM 1810 of a still picture (V_PCK & SP_PCK). A different value may be intentionally set when an audio is to be output a specific time (e.g., 0.5 sec) after a still picture is displayed on the screen. In this manner, this information is used in timing control between the still picture display and audio information output.

*E_PTM (Presentation Terminating Time) 1814 of Audio Information (A_PCK)

. . . This information indicates the output termination timing of audio information upon playback, and is used in timing control between the still picture display and audio information output. In most cases, this value matches S_PTM 1810 (to be described below) of a still picture (V_PCK & SP_PCK). A different value may be intentionally set when the next still picture information begins to be displayed a specific time (e.g., 0.5 sec) after termination of the audio output.

*First_SCR (First System Clock Reference) 1815 of Audio Information (A_PCK)

. . . This information indicates the system clock value upon creating first A_PCK in a VOB upon recording on the information storage medium (optical disc 1001), and is used upon executing seamless (continuous) playback.

*Last_SCR (Last System Clock Reference) 1816 of Audio Information (A_PCK)

. . . This information indicates the system clock value upon creating last A_PCK in a VOB upon recording on the information storage medium (optical disc 1001), and is used upon executing seamless (continuous) playback.

The contents corresponding to A_PB_TM mentioned in the description of S_VOB_ENT in FIG. 12 can be expressed by a pair of First_SCR and Last_SCR above.

In this manner, by recording presentation time PTM information and system clock reference SCR information that respectively pertain to still picture information and audio information, video information that belongs to video objects 1012 shown in FIG. 1D can be used as a part of still picture information.

More specifically, new video object information for picture objects (S_VOB) for a still picture is defined as follows without modifying video information itself that belongs to video objects 1012.

A case will be explained below wherein still pictures that change every 2 sec are defined with respect to the conventional video method (video objects 1012). In general, since the time required for one GOP in video information is 0.5 sec, one VOBU shown in FIG. 3E normally has a duration around 0.5 sec. Since 2 sec÷0.5 sec=4, the first I-pictures of every four VOBUs are considered as still pictures, thus setting information of first V_PCK address 1808 and I-picture size 1809 in a VOB, and setting the numerical values of data in the right column of FIG. 18.

As a result, by combining and displaying still picture information and audio information that belong to different VOBs (VOB#A and VOB#B), as shown in FIGS. 14A to 14G, only an audio part in video information that belongs to video objects 1012 can be output upon displaying a still picture, or only a scene the user likes in video information that belongs to video objects 1012 can be converted into a still picture and the still picture can be displayed.

A method of displaying a plurality of still pictures will be explained below.

As a method of displaying a plurality of pieces of still picture information recorded on the information storage medium (optical disc 1001), a method of simultaneously displaying a plurality of pictures in a given layout (still pictures to be displayed in the given layout are often moved or replaced), as shown in FIG. 11, and a method of displaying one still picture, and changing the still picture to be displayed at specific time intervals are available. In either method, a cell and PGC information are used in the data structure, as shown in FIGS. 6 and 7, and the user can choose the display method by an information recording/playback apparatus (RTR video recorder) for recording video information shown in FIG. 19.

As in video object information 1107, cell playback information (or CI) 1108 shown in FIG. 1F is divided into cell playback information (M_CI) that pertains to video information, and cell playback information (S_CI) that pertains to still picture information. The cell playback information (S_CI) that pertains to still picture information has a structure that can play back a still picture and audio information from different locations, and can present them together, as shown in FIGS. 14A to 14G.

More specifically, as shown in FIGS. 14C to 14E, in this structure, V_PCKs 1852 and 1854, and SP_PCK 1848 used in display in a given cell can designate still pictures (STL PCT) 1832 and 1834 in VOB#A 1821, and audio information output from that cell can designate audio information 1845 and audio information 1846 in VOB#B 1822 different from VOB#A 1821.

This structure is suitable for after recording setups for a still picture. For example, when still picture information sensed by a digital camera having no audio input function is directly recorded on the information storage medium (optical disc 1001), its recording result has a structure that does not contain any A_PCK (audio pack), as shown in FIG. 10I. A case will be examined below wherein the recorded information is played back, and comments are added to still pictures one by one by "audio input via a microphone", "overwriting marks by handwriting", "addition of text information by key-in", and the like, while displaying them on the screen, as shown in FIG. 11.

In this case, when the recording format is to be changed from the structure that does not contain any A_PCK shown in FIG. 10I to a structure that contains A_PCK shown in FIG. 10F, re-recording must be done on the information storage medium (optical disc 1001), resulting in cumbersome processes and a long processing time.

By contrast, when additional information alone is recorded as another VOB 1634 on the information storage medium (optical disc 1001), as shown in FIGS. 10J to 10L, without modifying the data that does not contain any A_PCK (audio pack) shown in FIG. 10I, information can be added to a still image very easily and quickly later. Upon display, VOBs 1633 and 1634 in FIGS. 10G and 10J are displayed and output together like VOBs 1403 to 1405 in FIG. 3D.

FIG. 15 shows the data structure in cell playback information for picture objects (S_CI) that allows the presentation shown in FIGS. 14A to 14G. ID information (or CI_SRP) 1873 as an identifier unique to a cell is described first. Type information (or C_TY) 1880 of a cell described next represents:

1) identification information for identifying cell information that pertains to video information (video objects 1012), cell information that pertains to a still picture (picture objects 1013), or cell information that pertains to only audio information (audio objects 1014); and 2) identification information for identifying cell information (corresponding to the structure shown in FIG. 15) for a VOB that records a plurality of still pictures (the format shown in FIGS. 10D to 10L), or cell information (corresponding to the structure shown in FIG. 16) for a VOB that records only one still picture (the format shown in FIGS. 10A to 10C).

In this way, by absorbing any differences of the recording formats that record still pictures at the level of cell playback information for picture objects (S_CI), both still and moving pictures can be played back and displayed in a single sequence at the level of PGC shown in FIG. 7 beyond the recording format difference of VOBs, irrespective of the still picture information and moving picture information.

In the embodiment shown in FIG. 14A, VOB#A 1821 is designated as ID information 1874 of a VOB shown in FIG. 15 that records a video pack. When the user wants to display still pictures from the second one in VOB#A 1821, still picture number 2 in VOB#A 1821 is designated as still picture number 1875 to be displayed first in a cell. Also, in correspondence with the embodiment shown in FIG. 14B, still picture number h in VOB#A 1821 is designated as still picture number 1876 to be displayed last in the cell.

In this manner, the cell playback information for picture objects (S_CI) directly designates a "still picture" itself.

In the embodiment show in FIG. 15, "still picture number" is designated as a method of designating a still picture. However, the present invention is not limited to such specific method. For example, a still picture may be designated by "designating a unit (e.g., a VOBU) itself where a still picture is recorded", "designating the start address of a location where a still picture is recorded", "designating the sequence order in a VOB", and the like. In FIG. 15, the first and last still pictures in the cell are designated. However, in place of the above display method, the first still picture to be displayed in a cell, and the total number of still pictures to be displayed in that cell may be designated.

Similarly, in FIG. 15, ID information 1877 (which designates VOB#B 1822 in the embodiment shown in FIG. 14G) of a VOB that records an audio pack, and still picture number 1878 (which designates still picture number j in the embodiment shown in FIG. 14F) indicating the recording destination of the first audio information (A_PCK) to be output in a cell are described.

In FIG. 15, no still picture number information indicating the recording destination of the last audio information (A_PCK) to be output in the cell is described. However, since the total number of still pictures to be displayed in one cell can be detected based on still picture number 1875 that indicates the first still picture to be displayed in a cell, and still picture number 1876 indicating the last still picture to be displayed in the cell, that still picture number information need not be described.

When audio information is designated for all still pictures in FIG. 14C, the presentation time per still picture can be determined by S_PTM 1813 and E_PTM 1814 of audio information shown in FIG. 13. On the other hand, when no audio information is designated for a specific VOBU, the still picture presentation time is set using information of presentation time 1879 per still picture.

Referring to FIG. 15, 1873 to 1876 correspond to the still picture file (RTR_STO.VRO) in FIG. 2, and 1877 to 1879 correspond to the after recording audio file (RTR_STA.VRO) shown in FIG. 2.

A grouping and displaying method when one VOB records only one still picture will be explained below.

As shown in FIGS. 10A to 10C, when one VOB (video object for picture objects) 1631 records only one still picture, a plurality of VOBs having still pictures are grouped and that group is handled as part_of_title. This grouping information is recorded in part of_titles information 1753 (FIG. 8) in video title set information (RTR_VMGI) 1106 shown in FIG. 1F.

Figure 17:
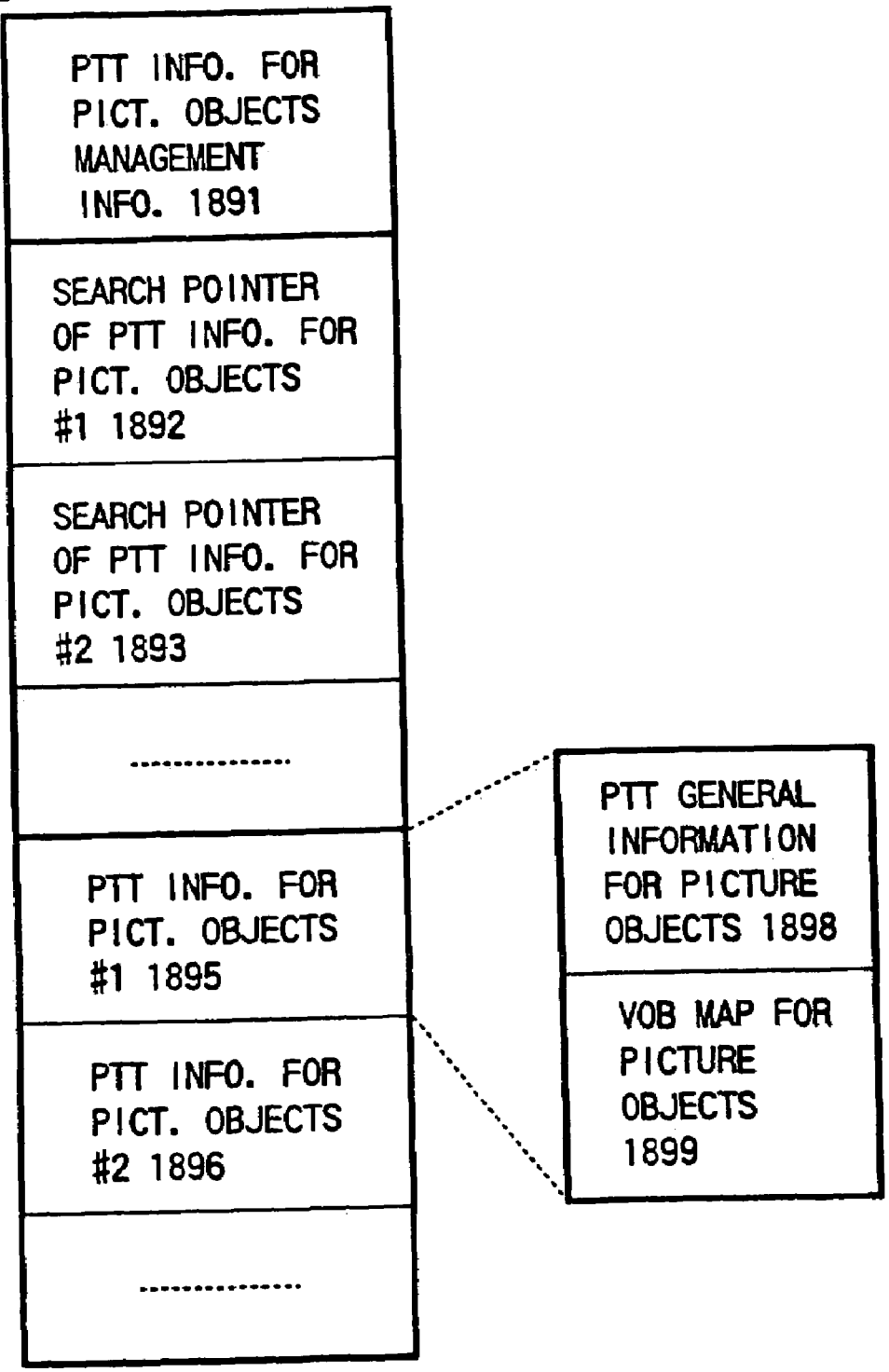
FIG. 17 is a view for explaining the data structure of part_of_title (chapter) information that pertains to a still picture in AV file information (S_AVFI) for a still picture.

The data structures in part of_titles information 1753 that pertains to still pictures shown in FIG. 17, and VOB map 1899 for picture objects are similar to those in video object information (S_VOGI#) shown in FIG. 12, and the VOBU map for picture objects' (S_VOB_ENT#) shown in FIG. 13.

Also, the structure of the corresponding cell playback information for picture objects (CI) shown in FIG. 16 is similar to that of S_CI shown in FIG. 15.

One embodiment of an information recording/playback apparatus (RTR video recorder) for recording video information will be explained below.

FIG. 19 is a block diagram for explaining the arrangement in the RTR video recorder. In this specification, reference numerals are indicated within blocks to save space.

The apparatus main body of the video recorder shown in FIG. 19 is roughly comprised of disc changer (disc drive unit) 1500 for rotating one to be used of one or a plurality of information storage media (optical discs) 1001, and executing recording and playback of video information with respect to optical disc 1001, encoder unit 1550 that constructs the video recording side, decoder unit 1560 that constructs the playback side, and system controller (MPU) 1530 which incorporates a ROM and RAM (semiconductor memory), and controls the operations of the apparatus main body.

Encoder unit 1550 comprises ADC. (analog-to-digital converter) 1552, video encoder (V encoder) 1553, audio encoder (A encoder 1554), sub-picture encoder (SP encoder) 1555, formatter 1556, and buffer memory 1557.

ADC 1552 receives an external analog video signal+ external analog audio signal from AV input 1542, or analog TV signal+analog audio signal from TV tuner 1544. This ADC 1552 converts the input analog video signal into digital data at, e.g., a sampling frequency=13.5 MHz and the number of quantization bits=8. (More specifically, luminance component Y, color difference component Cr (or Y–R), and color difference component Cb (or Y–B) are respectively quantized by 8 bits.) Likewise, ADC 1552 converts the input analog audio signal into digital data at, e.g., a sampling frequency=0.48 kHz and the number of quantization bits=16.

When an analog video signal and digital audio signal are input to ADC 1552, the digital audio signal passes through ADC 1552. (A process for reducing jitter superposed on a digital signal, a process for changing the sampling rate and the number of quantization bits, or the like without changing the contents of a digital audio signal may be done.)

When a digital video signal and digital audio signal are input to ADC 1552, these signals pass through ADC 1552 (for these digital signals, a jitter reduction process, sampling rate change process, or the like that do not change their contents may be done).

When still picture information sensed by digital camera 1543 is input in addition to the input video signals, it is directly input to V encoder 1553 without the intervention of ADC 1552.

A digital video signal component output from ADC 1552 is sent to formatter 1556 via video encoder (V encoder) 1553. A digital audio signal component output from ADC 1552 is sent to formatter 1556 via audio encoder (A encoder) 1554. Or a still picture signal directly input to V encoder 1553 is sent from V encoder 1553 to formatter 1556.

V encoder 1553 has a function of converting the input digital video signal into a digital signal compressed at variable bit rate on the basis of the MPEG2 or MPEG1 specifications.

In digital camera 1543, still picture information is recorded in the bitmap or JPEG format. By contrast, in the present invention, a still picture is recorded on optical disc 1001 in the I-picture format of MPEG2. For this purpose, in the present invention, V encoder 1553 has format conversion functions of "bitmap→MPEG2", "JPEG→MPEG2", and the like.

A encoder 1554 has a function of converting the input digital audio signal into a digital signal (or linear PCM digital signal) compressed at fixed bit rate on the basis of the MPEG or AC-3 specifications.

When a digital video signal (for example, a signal from a DVD video player with an independent output terminal of a sub-picture signal) is input from AV input 1542, or when a DVD video signal with such data structure is broadcasted and is received by TV tuner 1544, the sub-picture signal component (sub-picture pack) in the video signal is input to sub-picture encoder (SP encoder) 1555. Sub-picture data input to SP encoder 1555 is arranged into a predetermined signal format, and is then sent to formatter 1556.

Formatter 1556 executes predetermined signal processing of the input video signal, audio signal, sub-picture signal, and the like using buffer memory 1557 as a work area, and outputs recording data that matches a predetermined format (file structure) to data processor 1536.

In case of digital broadcast, a video signal is transmitted in the TS (transport stream) format of MPEG2. In general, when a video signal is recorded on information storage medium (optical disc) 1001 in the MPEG2 format, the PS (program stream) format is used. Hence, upon receiving digital broadcast, the received signal is directly sent from TV tuner 1544 to formatter 1556, which executes "TS→PS conversion".

Standard encode process contents for creating the recording data will be briefly explained below. More specifically, when encoder unit 1550 shown in FIG. 19 starts an encode process, parameters required for encoding video (main picture) data and audio data are set. Main picture data is pre-encoded using the set parameters, and optimal code amount distribution for the selected average transfer rate (recording rate) is calculated. Then, the main picture data is encoded based on the code amount distribution obtained by pre-encoding. At this time, audio data is encoded simultaneously.

As a result of pre-encoding, if it is determined that the data compression amount is insufficient (a desired video program cannot fall within information storage medium (optical disc) 1001 to be used), and pre-encoding can be re-done (if the source to be recorded is a source that can be repetitively played back such as a video tape, video disc, or the like), main picture data is partially re-encoded, and the previously pre-encoded main picture data portion is replaced by the re-encoded main picture data portion. With a series of processes described above, the main picture and audio data are encoded, and the average bit rate value required for recording can be greatly reduced.

Likewise, parameters required for encoding sub-picture data are set, and encoded sub-picture data is generated.

The encoded main picture, audio, and sub-picture data are combined, and are converted into the data structure of desired video objects.

More specifically, a cell as a minimum unit of main picture data (video data) is set, the configuration of cells that form a program chain, attributes of the main picture, sub-picture, and audio data, and the like are set (some of such attribute data use information obtained upon encoding the respective data), and management information that contains various kinds of information which pertain to cells is recorded in the management information recording area (control information 1011 in FIG. 1D or RTR.IFO in FIG. 2).

The encoded main picture, audio, and sub-picture data are segmented into packs each having a predetermined size (2,048 bytes). Dummy packs that can be used in, e.g., after recording, are inserted into these packs as needed. Note that time stamps such as PTS (presentation time stamp), DTS (decode time stamp), and the like are described in packs other than dummy packs, as needed. As for PTS of sub-picture data, a time arbitrarily delayed from PTS of main picture data or audio data in the identical playback time band can be described.

Data cells are arranged in units of VOBUs to allow playback in the time code order of data, thus forming a VOB consisting of a plurality of cells.

Upon digitally copying video information from the digital output of the RTR video recorder shown in FIG. 19, since the contents of the cells, program chains, management tables, time stamps, and the like are determined in advance, they need not be created again.

The arrangement for reading/writing (recording and/or playing back) information from/to optical disc 1001 comprises disc drive unit (disc changer) 1500, information recording/reproducing unit 101, temporary buffer memory 1534, data processor 1536, and system time counter (or system time clock; STC) 1538.

Temporary buffer memory 1534 is used to buffer a given amount of data to be written on optical disc 1001 (data output from encoder unit 1550) via information recording/reproducing unit 101, and to buffer a given amount of data played back from optical disc 1001 (data input to decoder unit 1560) via information recording/reproducing unit 101.

For example, when temporary buffer memory 1534 comprises a 4-Mbyte semiconductor memory (DRAM), it can buffer recording or playback data for approximately a seconds at an average recording rate of 4 Mbps. When temporary buffer memory 1534 comprises a 16-Mbyte EEPROM (flash memory), it can buffer recording or playback data for approximately 30 seconds at an average recording rate of 4 Mbps. Furthermore, when temporary buffer memory 1534 comprises a 100-Mbyte, very small HDD (hard disc drive), it can buffer recording or playback data for 3 minutes or more at an average recording rate of 4 Mbps.

Also, temporary buffer memory 1534 can also be used to temporarily store recording information when optical disc 1001 is used up during video recording, until optical disc 1001 is exchanged by a new disc.

When information recording/reproducing unit 101 uses a high-speed recording/reproducing unit having a speed equal to or higher than double speeds, temporary buffer memory 1534 can also be used to store readout data exceeding a normal amount read out from the drive per unit time. When temporary buffer memory 1534 buffers readout data upon playback, even when an optical head (not shown) has caused read errors due to vibration shock or the like, playback data buffered by temporary buffer memory 1534 can be used instead, thus preventing a playback image from being discontinued.

If an external card slot (not shown in FIG. 19) is provided to the RTR video recorder, the EEPROM can be offered as an option IC card. On the other hand, if an external drive slot or SCSI interface is provided to the RTR video recorder, the HDD can be offered as an option extension drive.

When a personal computer is used as a DVD video recorder by software, the free area of a hard disc drive or main memory of the personal computer itself can be used as temporary buffer memory 1534 shown in FIG. 19.

Under the control of system controller (MPU) [incorporating the ROM and RAM] 1530, data processor 1536 shown in FIG. 19 performs:

supply of a video information signal to be recorded from encoder unit 1550 to information recording/reproducing unit 101;

transfer of a video information signal played back by information recording/reproducing unit 101 to another unit;

rewrite of management information (control information 1011) recorded on information storage medium (optical disc) 1001;

partial deletion of video information and management information (control information 1011 or RTR.IFO or RTR_VMG) as data recorded on information storage medium (optical disc) 1001; and the like.

System controller 1530 includes an MPU (or CPU), a ROM as an IC memory written with control programs and the like, and a RAM as an IC memory that provides a work area required for executing programs.

Of the execution results of system controller 1530, the contents the user of the RTR video recorder should know are displayed on display/input panel 1548 of the RTR video recorder.

Note that the control timings of disc changer 1500, information recording/reproducing unit 101, data processor 1536, and encoder unit 1550 and/or decoder unit 1560 by system controller (MPU) 1530 can be determined based on time data supplied from STC 1538 (video recording/playback are normally executed in synchronism with time clocks from STC 1538, but other processes may be executed at timings independently of STC 1538).

Decoder unit 1560 comprises separator 1562 for separating the respective packs from video information with the pack structure recorded on optical disc. 1001, memory 1563 used upon executing pack separation and other signal processes, video decoder (V decoder) 1564 for decoding main picture data (the contents of video packs) separated by separator 1562, sub-picture decoder (SP decoder) 1565 for decoding sub-picture data (the contents of sub-picture packs) separated by separator 1562, audio decoder (A decoder) 1568 for decoding audio data (the contents of audio packs) separated by separator 1562, video processor 1566 for appropriately mixing sub-picture data from SP decoder 1565 with video data output from V decoder 1564, i.e., superposing sub-picture data such as menus, highlight buttons, superimposed dialogs, and the like on main picture data, and outputting them, video digital-to-analog converter (V•DAC) 1567 for converting the digital video output from video processor 1565 into an analog video signal, and audio digital-to-analog converter: (A•DAC) 1569 for converting the digital audio output from A decoder 1568 into an analog audio signal.

The analog video signal (analog video information signal) output from V•DAC 1567, and the analog audio signal output from A•DAC 1569 are supplied to an external component (not shown; a multi-channel stereo system having two to six channels+monitor TV or projector) via AV output 1546.

OSD (On Screen Display) data output from system controller (MPU) 1530 is input to separator 1562 in decoder unit 1560, and is then input to video processor 1566 via V decoder 1564 (not decoded). The OSD data is superimposed on main picture data, and they are supplied to an external monitor TV connected to AV output 1546. Thus, a warning message is displayed together with main picture data.

The operations of the information recording/playback apparatus (RTR video recorder) for recording video information shown in FIG. 19 will be described below with reference to the flow charts.

The sequence for recording a plurality of still pictures on information storage medium (optical disc) 1001 will be described below with reference to FIG. 20.

Still picture files are continuously input from digital camera 1543 as data (ST1).

Since each still picture file received from digital camera 1543 is normally recorded in the JPEG or bitmap format, the input still picture information is converted into I-picture data of MPEG2 at V encoder 1553 (ST2).

Figure 3:
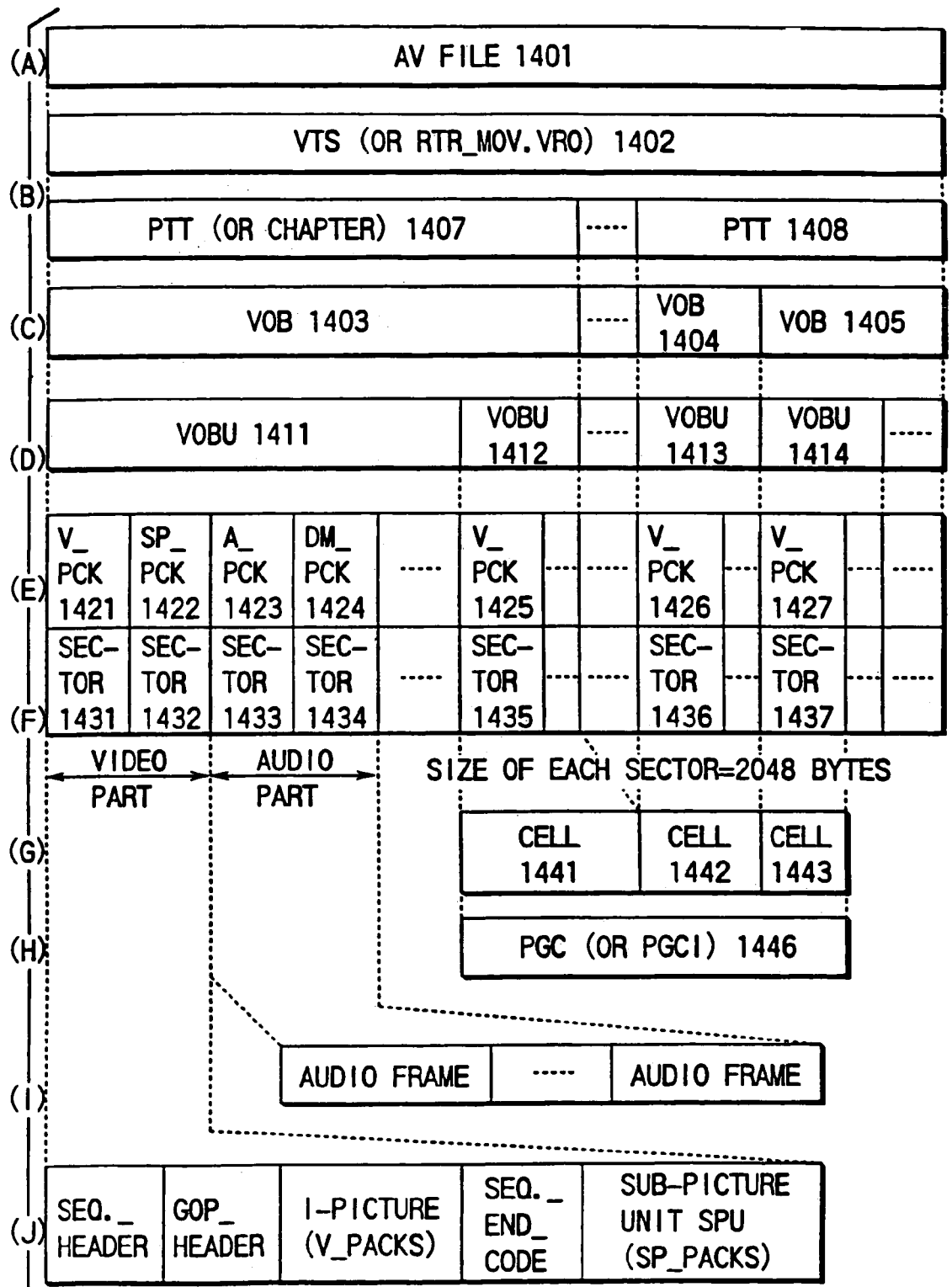
FIGS. 3A to 3J are views for explaining the data structure in an AV file shown in FIG. 2.

Formatter 1556 prepares the VOBU structure with the data structure shown in FIG. 3 with respect to single still picture information, and groups a plurality of still pictures to construct a VOB (ST3).

Parallel to the aforementioned processes, information recording/reproducing unit 101 reproduces all pieces of control information 1011 (RTR.IFO/RTR_VMG) recorded on optical disc 1001, and saves the reproduced contents in the internal RAM of system controller 1530 (ST4).

System controller 1530 obtains information of allocation map table 1105 from the contents of control information 1011 saved in its internal RAM, and searches for the location of unrecorded area 1460 (FIG. 4) (ST5).

After that, system controller 1530 sends control information to formatter 1556, data processor 1536, and information recording/reproducing unit 101, and controls information recording/reproducing unit 101 to record a VOB having a plurality of pieces of still picture information on unrecorded area 1460 (ST6).

During recording, system controller 1530 monitors the recording state, and checks if the VOB is successfully recorded on optical disc 1001 (ST7). If trouble has occurred during recording, the processes in steps ST4 to ST6 are repeated.

If the VOB is successfully recorded on optical disc 1001, system controller 1530 prepares VOBU map 1738 in FIG. 12 (or VOB map 1899 in FIG. 17) on the basis of address information recorded on optical disc 1001 (ST9). Finally, VOBU map 1738 (or VOB map 1899) prepared in system controller 1530 is additionally recorded in control information 1011 (RTR.IFO/RTR_VMG) on optical disc 1001 using information recording/reproducing unit 101 (ST10).

The playback sequence of still picture information containing audio information will be described below with the aid of FIG. 22.

Figure 20:
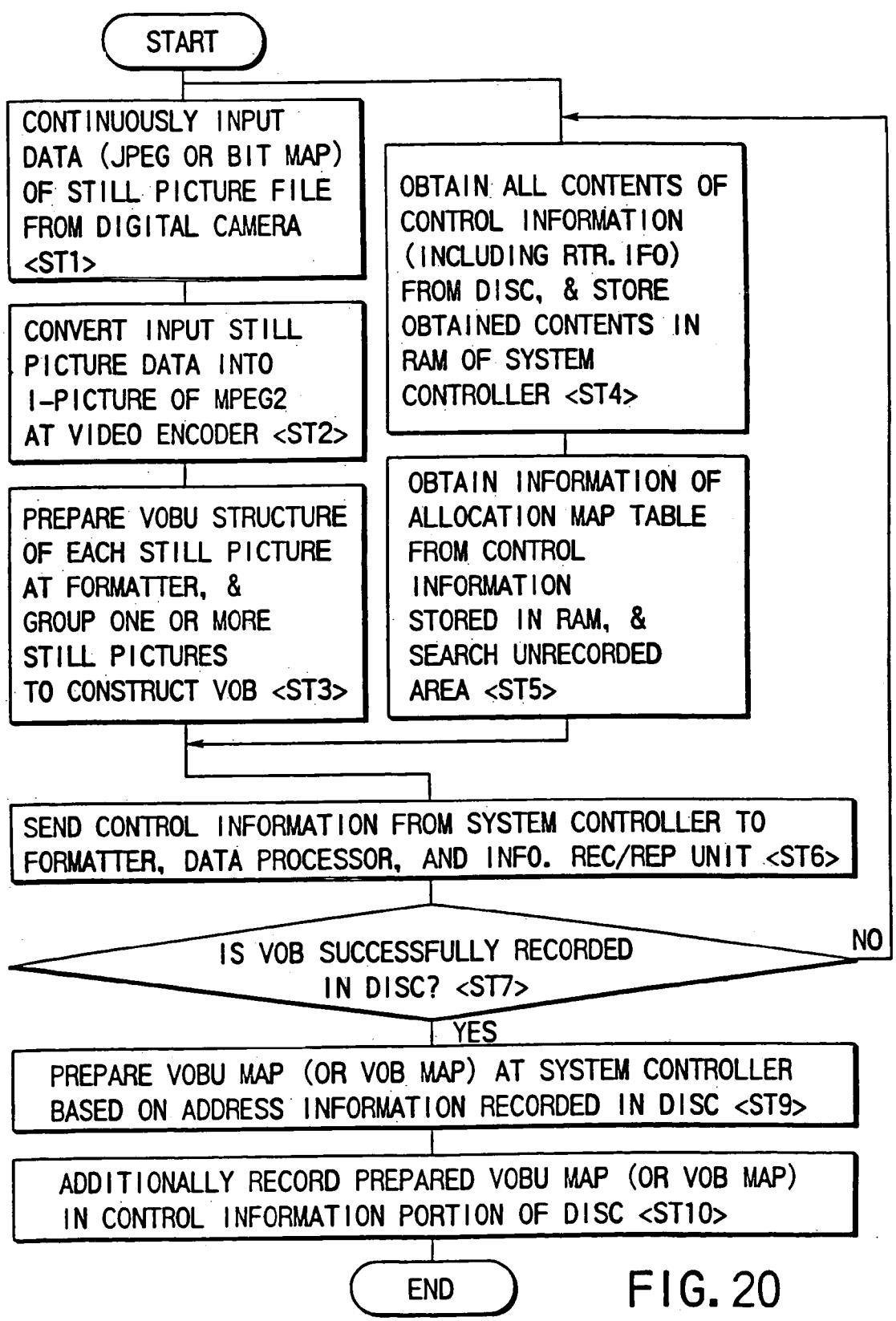
FIG. 20 is a flow chart for explaining the sequence for recording one or more still pictures on the medium shown in FIG. 1.

As in steps ST4 and ST5 in FIG. 20, information recording/reproducing unit 101 reproduces all pieces of control information 1011 (RTR.IFO/RTR_VMG) recorded on optical disc 1001, and saves the reproduced contents in the internal RAM of system controller 1530 (ST11).

System controller 1530 obtains information of playback control information 1021 (CI) from the contents of control information 1011 saved in its internal RAM, and interprets the obtained information as to the manner of reproduction (ST12).

After that, system controller 1530 searches for a program of information to be reproduced from PGC control information 1103 (PGCI) saved in its internal RAM, and extracts a cell or cells contained in that PGC information (ST13).

Furthermore, system controller 1530 extracts the recording address of the VOB to be reproduced on optical disc 1001 from video object information 1107 (AVFIT) or part_of_titles information 1753 (FIG. 8) in video title set information 1106 (RTR_VMGI) saved in its internal RAM (ST14).

The playback sequence for playing back still picture information from VOB#A and presenting audio information recorded in VOB#B simultaneously with the still picture upon playback, as shown in FIGS. 14A to 14G, will be explained.

An optical head (not shown) in information recording/reproducing unit 101 accesses VOB#B recorded on optical disc 1001 on the basis of a control signal from system controller 1530 to reproduce its information, and temporarily saves audio information for a plurality of still pictures in that reproduced information in memory 1563 (FIG. 19) (ST18).

The optical head in information recording/reproducing unit 101 then accesses the information recording position of VOB#A recorded on optical disc 1001 to reproduce still picture information in VOB#A (ST16). Finally, AV output 1546 simultaneously outputs (displays) audio information in VOB#B and still picture information in VOB#A (ST17).

As described above, the method of simultaneously reproducing only audio information for a plurality of still pictures or only still picture information, saving the reproduction result in memory 1562, simultaneously reproducing the remaining information, and outputting (displaying) the reproduction results at the same time is used. With this method, compared to a method of reproducing still picture information and audio information in units of still pictures, the frequency of access of the optical head can be greatly reduced, thus allowing a seamless, continuous output (free from any wait time upon changing the still picture to be displayed, or free from any interrupt of audio information). This is a great feature of this invention.

Figure 22:
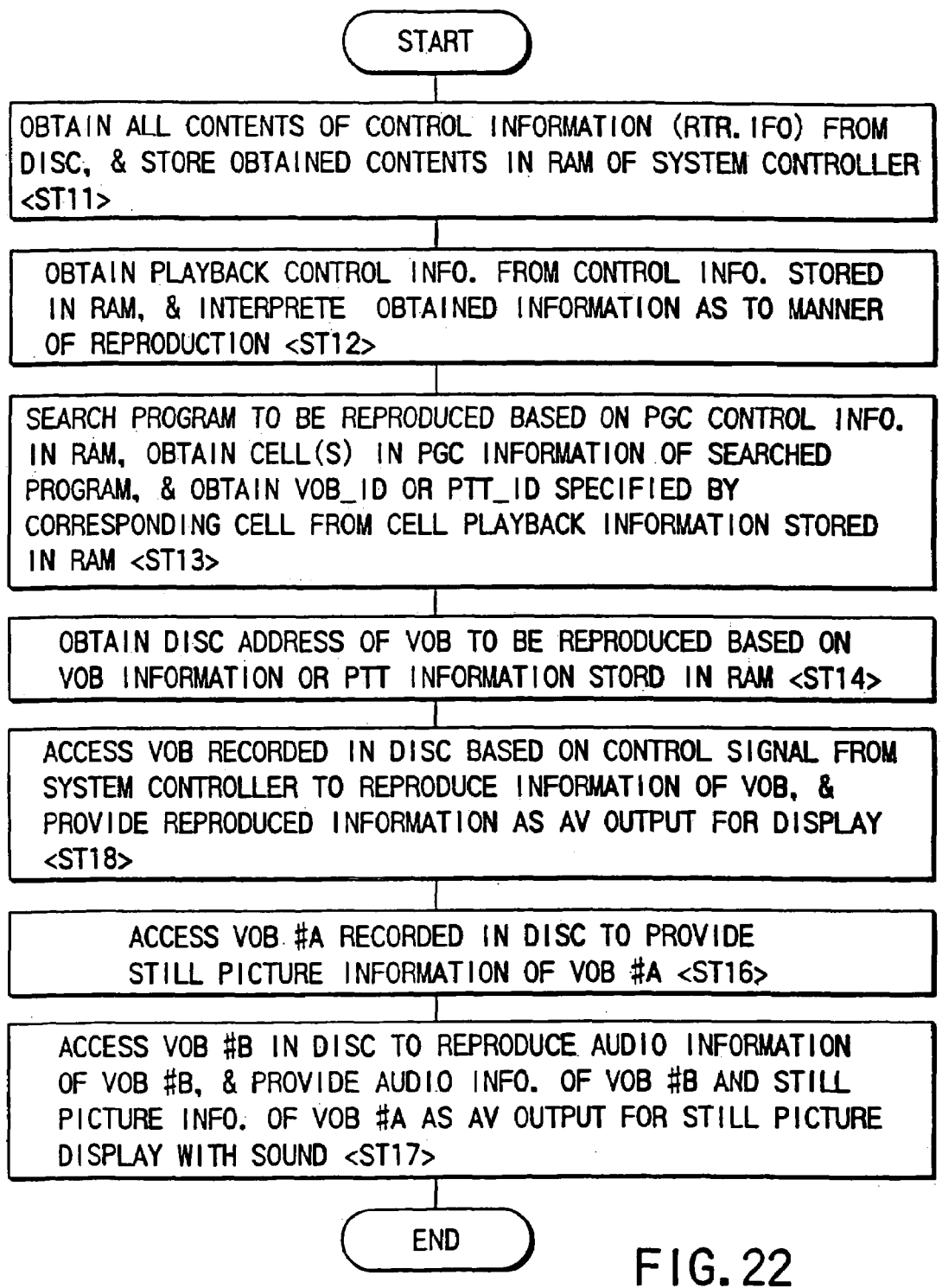
FIG. 22 is a flow chart showing the sequence when one or more still pictures are played back from the medium shown in FIG. 1.

In FIG. 22 described above, after audio information in VOB#B is reproduced, still picture information in VOB#A is reproduced. However, a modification may be made without departing from the scope of the present invention (e.g., the reproduction order may be replaced).

In the recording format shown in FIGS. 10A to 10L, a pair of still picture information and audio information are saved in a VOBU. However, the present invention is not limited to such specific format. The contents of the present invention can be applied as long as the scope of the invention is implemented.

For example, in case of a recording format in which V_PCKs for a plurality of still pictures may be allocated in one VOB or in the first half of one PTT, and A_PCKs for a plurality of still pictures are allocated in the second half, the positions of V_PCK and A_PCK of a still image of a given number are separated from each other on information storage medium (optical disc) 1001. Hence, even when still picture information (V_PCK information) and audio information (A_PCK information) with an identical still picture number in one VOB are reproduced in turn, optical head access is required.

Therefore, when a plurality of pieces of still picture information are reproduced from picture objects 1013 with the recording format in which V_PCKs for a plurality of still pictures may be allocated in one VOB or in the first half of one PTT, and A_PCKs for a plurality of still pictures are allocated in the second half, either V_PCK or A_PCK information for a plurality of still pictures is read in advance and saved in memory 1563, the remaining information is then reproduced, and the reproduction results can be simultaneously output (displayed), according to the sequence of the present invention.

As another embodiment of the present invention, a method of additionally recording additional information for a still picture by after recording will be explained below with reference to FIG. 21. Information to be added by after recording forms a group (another VOB or PTT) different from that of original still picture information, and the additional information and still picture information are synthesized and output (displayed) by the method shown in FIGS. 14A to 14G.

Figure 21:
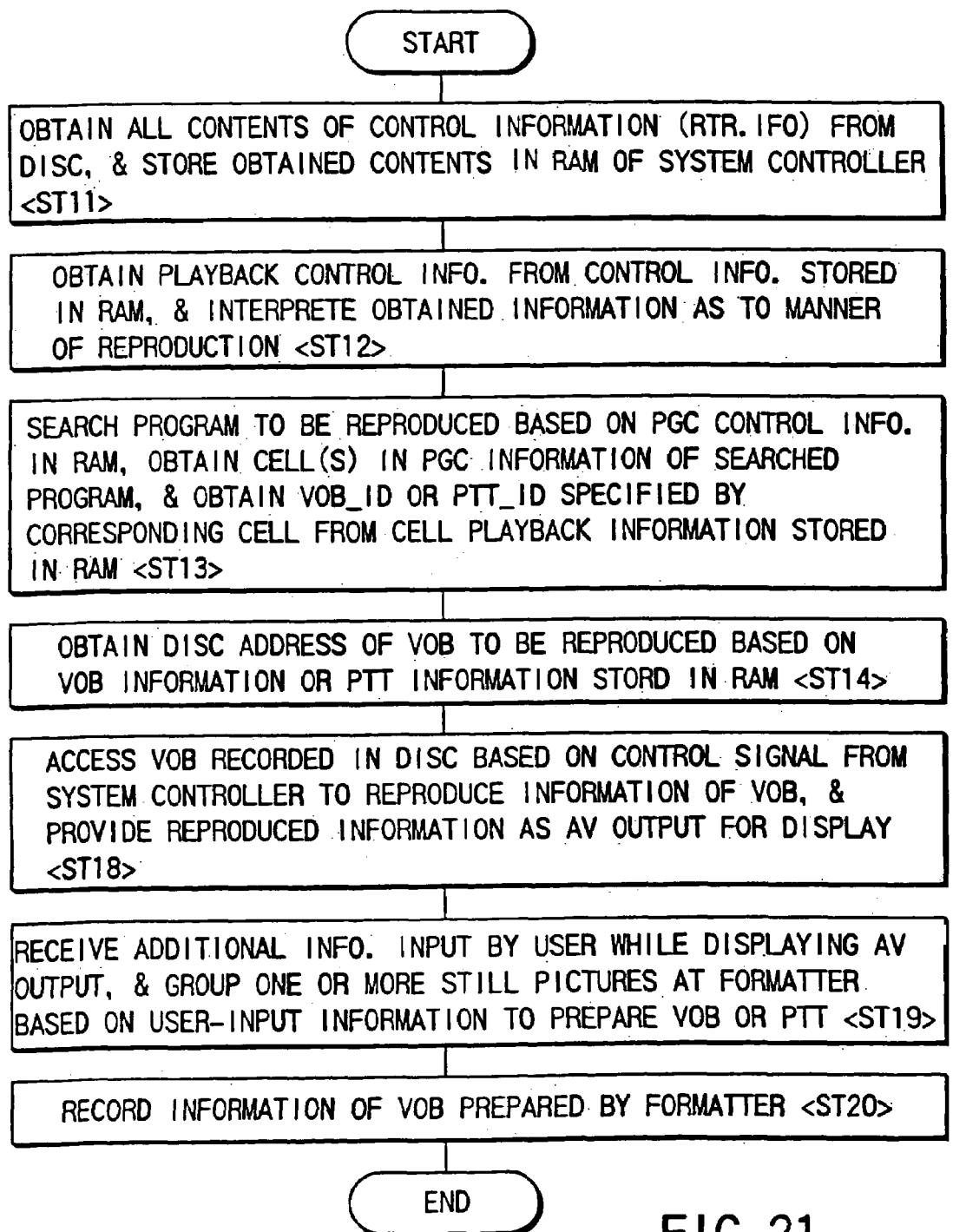
FIG. 21 is a flow chart showing the sequence when audio information is after-recorded on the medium shown in FIG. 1.

Referring to FIG. 21, steps ST 11 to ST14 are the same as those in FIG. 22. The optical head in information recording/reproducing unit 101 accesses a VOB recorded on optical disc 1001 to reproduce its information, and the display contents shown in FIG. 11 are supplied to AV output 1546 (ST18). Additional information input by the user while observing the display screen is received, and a plurality of still pictures are grouped by for matter 1556 on the basis of the input information to construct a VOB or PTT (ST19).

Finally, VOB information constructed by formatter 1556 is recorded on optical disc 1001 (ST20).

FIG. 23 is a view for explaining the data structure of navigation data (RTR_VMG) shown in FIG. 8. This RTR_VMG corresponds to control information 1101 and information 1021 in FIG. 1E, and corresponds to control information (RTR.IFO) 1011 in the file structure shown in FIG. 2.

Of this navigation data RTR_VMG, user defined PGC information table UD_PGCIT is comprised of user defined PGC information table information (UD_PGCITI), one or more user defined PGC information search pointers #1 to #n (UD_PGCI_SRP#1 to UD_PGCI_SRP#n), and one or more pieces of user defined PGC information #1 to #n (UD_PGCI#1 to UD_PGCI#n) corresponding in number to these search pointers.

Each user defined PGC information (one of UD_PGCI#1 to UD_PGCI#n) or PGC information #i (PGCI#i) having contents corresponding to original PGC information (ORG_PGCI) is composed of PGC general information (PGC_GI), one or more pieces of program information #1 to #m (PGI#1 to PGI#m), one or more cell information search pointers #1 to #n (CI_SRP#1 to CI_SRP#n), and one or more pieces of cell information #1 to #n (CI#1 to CI#n) corresponding in number to these search pointers.

Each cell information search pointer (one of CI_SRP#1 to CI_SRP#n) contains the start address (CI_SA) of corresponding cell information, and each cell information (one of CI#1 to CI#n) contains movie cell information (M_CI) or still picture cell information (S_CI).

Note that RTR_VMGI in FIG. 23 corresponds to video title set information 1106 in FIG. 1F, M_AVFIT and S_AVFIT in FIG. 23 correspond to video object information 1107 in FIG. 1F, and ORG_PGCI and UD_PGCIT in FIG. 23 correspond to PGC control information 1103 in FIG. 1F.

On the other hand, PGCI#i in FIG. 23 corresponds to PGC control information 1103 in FIG. 1F, and. CI# in FIG. 23 corresponds to cell playback information 1108 in FIG. 1F.

Figures 24, 25, 26:
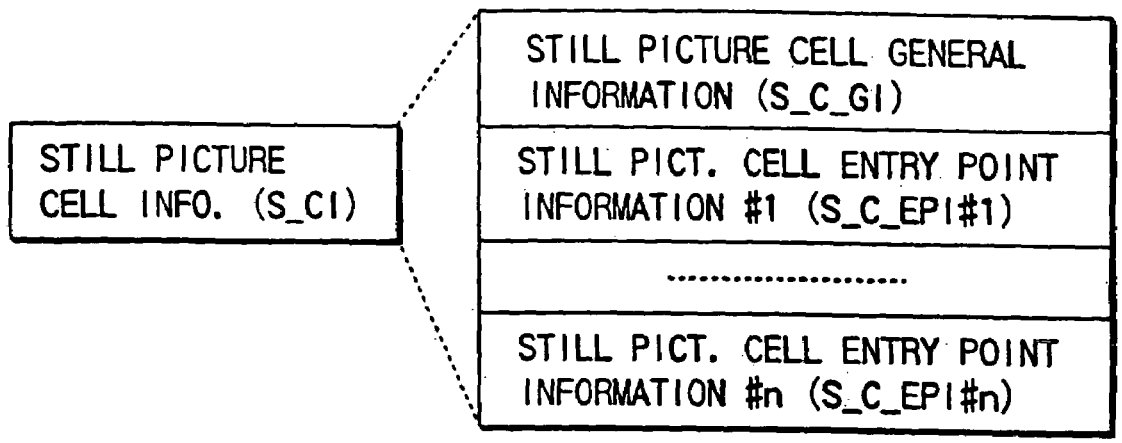
FIG. 24 is a view for explaining the contents of still picture cell information (S_CI) shown in FIG. 23.
FIG. 25 is a view for explaining the contents of still picture cell general information (S_C_GI) shown in FIG. 24.
FIG. 26 is a view for explaining the contents of each still picture cell entry point (S_C_EPI) shown in FIG. 24.

FIG. 24 is a view for explaining the contents of still picture cell information (S_CI) in FIG. 23. S_CI contains still picture cell general information (S_C_GI), and one or more pieces of still picture cell entry point information #1 to #n (S_C_EPI#1 to S_C_EPI#n). Note that S_CI in FIG. 24 corresponds to cell playback information 1108 in FIG. 1F.

FIG. 25 is a view for explaining the contents of still picture cell general information (S_C_GI) in FIG. 24.

This S_C_GI contains a cell type (C_TY) which describes the type of cell, the still picture VOB group information search pointer number (S_VOGI_SRPN) of the VOB group used by this cell, the number (C_EPI_Ns) of pieces of cell entry point information in this cell, the start address (S_S_VOB_ENTN) of the still picture VOB entry number of this cell, and the end address (E_S_VOB_ENTN) of the still picture VOB entry number of this cell.

Note that S_S_VOB_ENTN in FIG. 25 corresponds to still picture number 1875 in VOB in FIG. 15, and E_S_VOB_ENTN in FIG. 25 corresponds to still picture number 1876 in a VOB in FIG. 15.

FIG. 26 is a view for explaining the contents of each still picture cell entry point information (S_C_EPI) in FIG. 24. This S_C_EPI has two different types (type 1 and type 2).

S_C_EPI of type 1 contains an entry point type (EP_TY) that describes the type of entry point, and still picture VOB entry number (S_VOB_ENTN).

S_C_EPI of type 2 further contains primary text information (PRM_TXTI) in addition to EP_TY and S_VOB_ENTN. This PRM_TXTI can record a comment and other information associated with the corresponding still picture.

Note that S_VOB_ENTN in FIG. 26 is number information which specifies each of one or more still picture VOB entries S_VOB_ENT# (corresponding to VOBU map 1738 for picture objects in FIGS. 12 and 13, or VOB map 1899 for picture objects in FIG. 17).

Figures 27, 28:
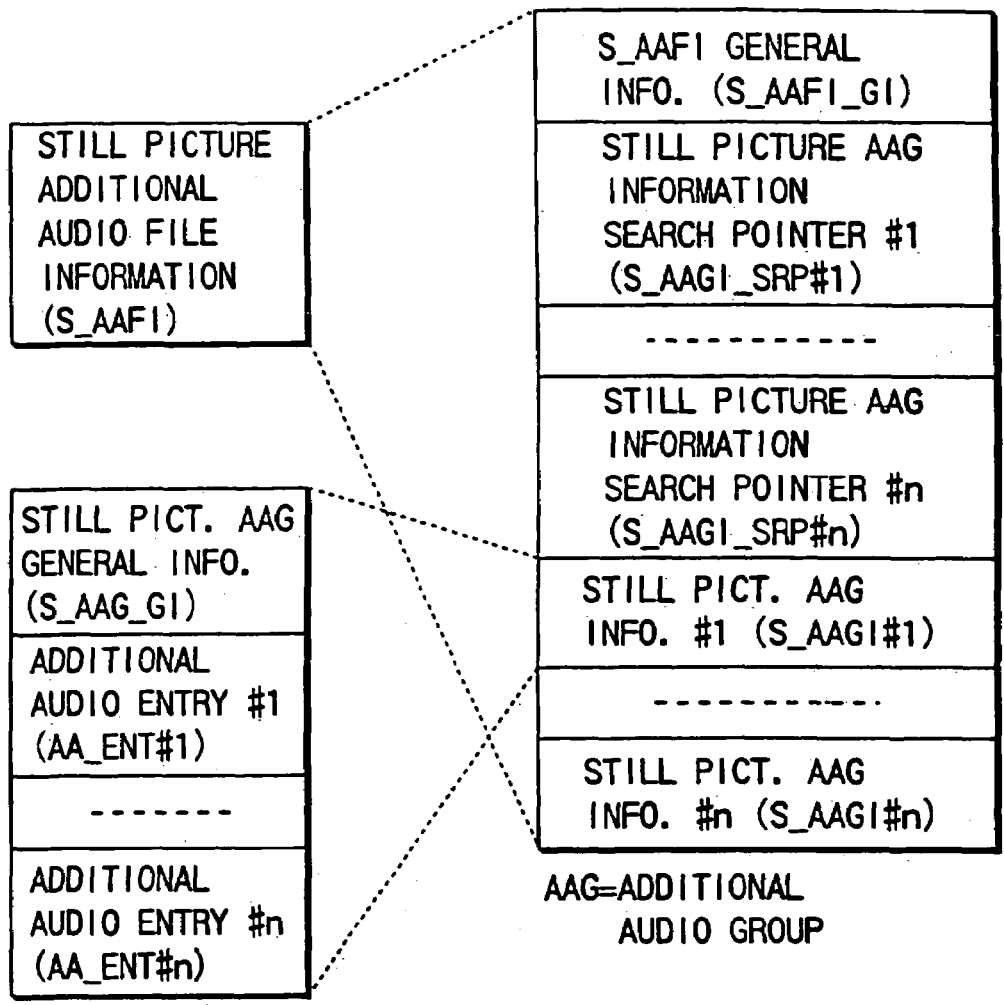
FIG. 27 is a view for explaining the contents of still picture additional audio file information (S_AAFI) shown in FIG. 12.
FIG. 28 is a view for explaining the contents of S_AAG general information (S_AAG_GI) shown in FIG. 27.

FIG. 27 is a view for explaining the contents of still picture additional audio file information (S_AAFI) in FIG. 12.

This S_AAFI contains still picture additional audio file information general information (S_AAFI_GI), one or more still picture additional audio group information search pointers #1 to #n (S_AAGI_SRP#1 to S_AAGI_SRP#n), and a plurality of pieces of still picture additional audio group information #1 to #n (S_AAGI#1 to S_AAGI#n) corresponding in number to these search pointers.

Each still picture additional audio group information (one of S_AAGI#1 to S_AAGI#n) contains still picture additional audio group general information (S_AAG_GI), and one or more additional audio entries #1 to #n (AA_ENT#1 to AA_ENT#n).

FIG. 28 is a view for explaining the contents of S_AA_GI general information (S_AAG_GI) in FIG. 27.

This S_AAG_GI contains the number (AA_ENT_Ns) of additional audio entries, the still picture additional audio stream information number (S_AA_STIN), and the start address (S_AAG_SA) of AAG in a still picture additional audio file.

Note that AA_ENT_Ns in FIG. 28 assumes a value corresponding to number 1801 of still pictures in a VOB in FIG. 13 or number 1901 of still pictures in. PTT in FIG. 18.

S_AAG_SA in FIG. 28 corresponds to the first still picture address (first still picture information 1802 in a VOB or first V_PCK address 1808 in a VOBU in FIG. 13; or first still picture information 1902 in a PTT or first V_PCK address 1908 in a VOB in FIG. 18).

FIG. 29 is a view for explaining the contents of the additional audio entry (AA_ENT) shown in FIG. 27.

This AA_ENT contains an additional audio type (AA_TY) that describes the type of additional audio (e.g., normal one or tentatively created one), the size (AA_SZ) of an additional audio stream, and the playback time (AA_PB_TM) of the additional audio stream.

Note that AA_SZ in FIG. 29 assumes a value corresponding to the difference between the A_PCK address of the current additional audio (first A_PCK address 1812 in a VOBU in FIG. 13 or first A_PCK address 1912 in a VOB in FIG. 18), and the A_PCK address of the next additional audio (1812 in FIG. 13 or 1912 in FIG. 18).

On the other hand, AA_PB_TM in FIG. 29 corresponds to the difference obtained by subtracting audio S_PTM 1813 from audio E_PTM 1814 in FIG. 13 (or the difference obtained by subtracting audio S_PTM 1913 from audio E_PTM 1914 in FIG. 18).

FIG. 30 is a view for explaining the contents of still picture VOB group general information (S_VOG_GI) shown in FIG. 12.

This S_VOG_GI contains the number (S_VOB_Ns) of still pictures that describes the number of video parts in the corresponding VOB group, the number (S_VOB_STIN) of pieces of still picture VOB stream information, the time (FIRST_VOB_REC_TM) when the first VOB in that VOB group was recorded, the time (LAST_VOB_REC_TM) when the last VOB in that VOB group was recorded, and the start address (S_VOG_SA) of that VOB group in a still picture AV file.

Note that S_VOB_Ns in FIG. 30 has a value corresponding to number 1901 of still pictures in a VOB in FIG. 13 or number 1901 of still pictures in a PTT shown in FIG. 18.

Also, S_VOG_SA in FIG. 30 corresponds to the first still picture address (first still picture information 1802 in a VOB or first V_PCK address 1808 in a VOBU in FIG. 13; or first still picture information 1902 in a PTT or first V_PCK address 1908 in a VOB in FIG. 18).

FIG. 31 is a view for explaining the first example (type 1) of the contents of still picture VOB entry (S_VOB_ENT) in FIG. 12.

This S_VOB_ENT of type 1 contains a still picture VOB entry type (S_VOB_ENT_TY) that describes the type of still picture VOB entry, and the size (V_PART_SZ) of the corresponding still picture video part.

Note that S_VOB_ENT_TY contains information MAP_TY that describes the type of S_VOB_ENT, information TE that describes whether the corresponding VOB is normal or tentatively erased (temporarily erased), and information SPST_Ns that describes the number of sub-picture streams contained (if it is zero, no streams are contained).

On the other hand, V_PART_SZ describes the size of the video part in that VOB in units of sectors.

This V_PART_SZ corresponds to the difference between the address (1808 in FIG. 13) of the first V_PCK in the current still picture VOBU, and the address (1812 in FIG. 13) of the first A_PCK in the current still picture VOBU.

Or this V_PART_SZ corresponds to the difference between the address (1908 in FIG. 18) of the first V_PCK in the current still picture VOB, and the address (1912 in FIG. 18) of the first A_PCK in the current still picture VOB.

FIG. 32 is a view for explaining the second example (type 2) of the contents of still picture VOB entry (S_VOB_ENT) in FIG. 12.

This S_VOB_ENT of type 2 contains A_PART_SZ that indicates the size of the audio part which is originally attached to the still picture VOB in units of sectors, and A_PB_TM that indicates the playback time of the audio part in units of video fields, in addition to S_VOB_ENT_TY and V_PART_SZ of type 1 shown in FIG. 31.

When the playback time of an actual audio part does not match a boundary of video fields, data after the video field of end data of the audio part is discarded.

Note that A_PART_SZ corresponds to the difference between the first A_PCK address (1812 in FIG. 13) in the current VOBU, and the first V_PCK address (1808 in FIG. 13) in the next VOBU.

Or A_PART_SZ corresponds to the difference between the first A_PCK address (1912 in FIG. 18) in the current VOB, and the first V_PCK address (1908 in FIG. 18) in the next VOB.

On the other hand, A_PB_TM corresponds to the difference between current S_PTM 1810; FIG. 13 (or current S_PTM 1910; FIG. 18), and next S_PTM 1810; FIG. 13 (or next S_PTM 1910; FIG. 18).

Or A_PB_TM corresponds to the difference between S_PTM 1813 and E_PTM 1814 in FIG. 13 (or the difference between S_PTM 1913 and E_PTM 1914 in FIG. 18).

FIG. 33 is a view for explaining the third example (type 3) of the contents of still picture VOB entry (S_VOB_ENT) in FIG. 12.

This S_VOB_ENT of type 3 contains the still picture additional audio group number (S_AAGN) and additional audio entry number (AA_ENTN) in addition to S_VOB_ENT_TY and V_PART_SZ of type 1 shown in FIG. 31.

Note that S_AAGN indicates the number of additional audio group that contains the additional audio stream of the corresponding VOB. This S_AAGN corresponds to ID information 1877 of a VOB having A_PCK in FIG. 15.

On the other hand, AA_ENTN indicates the number of additional audio entry corresponding to the additional audio stream of the corresponding VOB. This AA_ENTN corresponds to still picture number 1878 in a VOB that contains A_PCK of the first still picture in a cell in FIG. 15.

FIG. 34 is a view for explaining the fourth example (type 4) of the contents of still picture VOB entry (S_VOB_ENT) in FIG. 12.

This S_VOB_ENT of type 4 has contents that combine S_VOB_ENT_TY and V_PART_SZ of type 1 shown in FIG. 31, A_PART_SZ and A_PB_TM of type 2 shown in FIG. 32, and S_AAGN and AA_ENTN of type 3 shown in FIG. 33.

In entries S_VOB_ENT of types 1 to 4 shown in FIGS. 31 to 34, the same field names (S_VOB_ENT_TY and the like) have the same contents.

Figure 35:
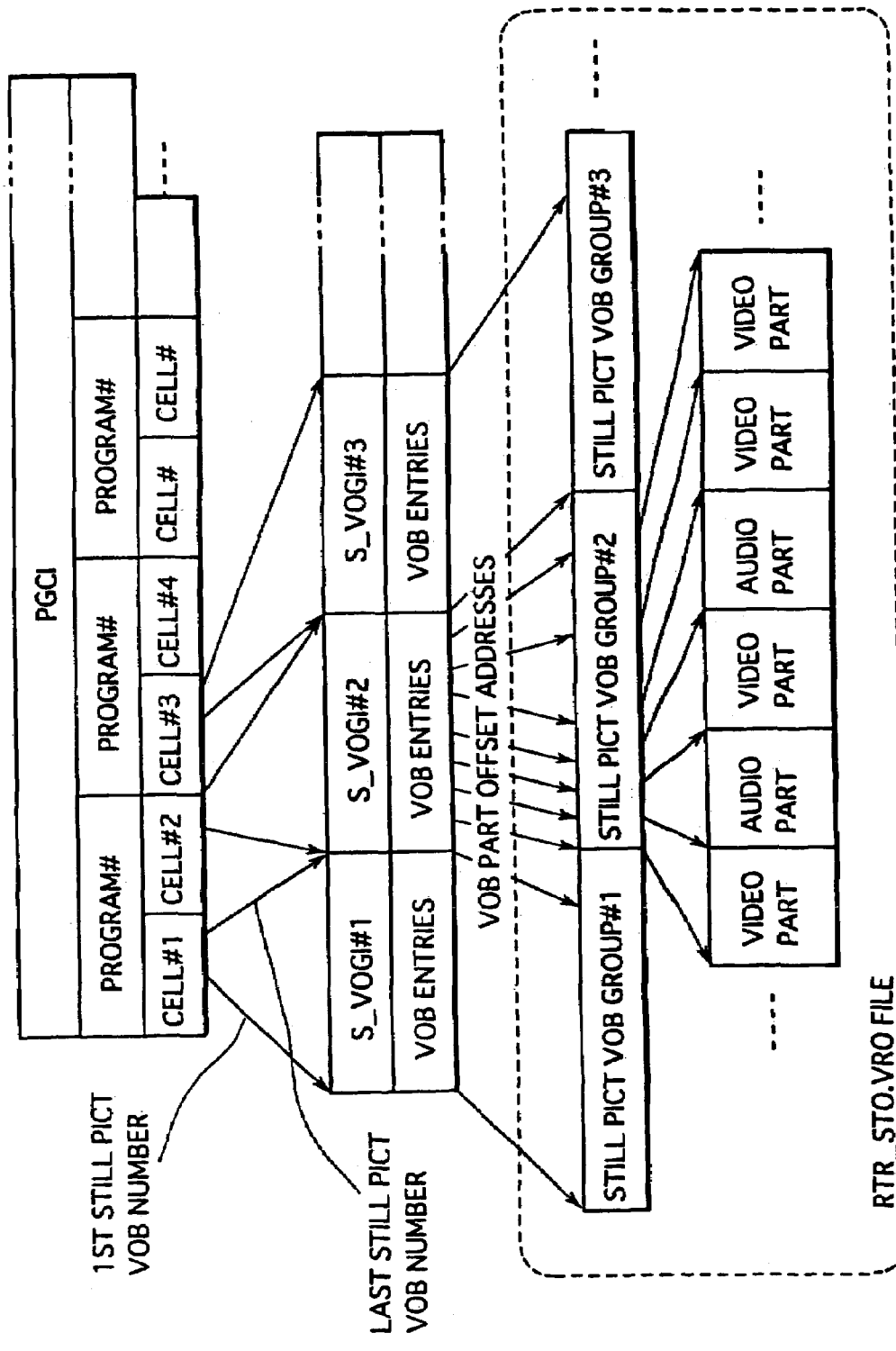
FIG. 35 is a view for explaining the relationship between original PGC information (ORG_PGCI shown in FIG. 8 or 23) and a still picture video file (RTR_STO.VRO shown in FIG. 2) when a still picture VOB alone is recorded.

FIG. 35 is a view for explaining the relationship between the original PGC information (ORG_PGCI in FIG. 8 or 23) and still picture video file (RTR_STO.VRO in FIG. 2) when only still picture VOBs are recorded.

In an original PGC where only still picture VOBs are recorded, the PGCI consists of a sequence of cells, and each cell corresponds to a still picture VOB group. Still picture VOB group is introduced to reduce the navigation data size associated with each still picture. VOB, considering when a huge number of still picture VOBs are recorded. However, a cell is unable to refer to both movie VOB and still picture VOB at the same time. Therefore, if a movie VOB and a still picture VOB is recorded alternatively, a still picture VOB group may contain only one still picture VOB.

Assume that still picture VOB group information S_VOGI#2 in FIG. 35 corresponds to VOBs 1631 to 1633 in FIGS. 10A to 10L.

Under this assumption, for example, VOBU 1641 in FIG. 10B, VOBU 1644 in FIG. 10E, and VOBU 1646 in FIG. 10H are contained in S_VOGI#2. The video part in still picture VOB group #2 in FIG. 35 corresponds to packs 1661 to 1663 and 1681 in FIG. 10C, pack 1665 in FIG. 10F, or packs 1668 to 1670 and 1683 in FIG. 10I.

Also, assume that S_VOGI#2 in FIG. 35 corresponds to VOB#A in FIG. 14A.

Under this assumption, for example, still picture number 2 of VOBU 1862 in FIG. 14B corresponds to VOB entry number 2 of S_VOGI#2, packs 1852, 1848, and 1862 of still picture 1832 in FIG. 14C correspond to central video and audio parts of the RTR_STO.VRO file in FIG. 35, and pack 1853 of still picture 1833 in FIG. 14C corresponds to a trailing video part of the RTR_STO.VRO file.

Figure 36:
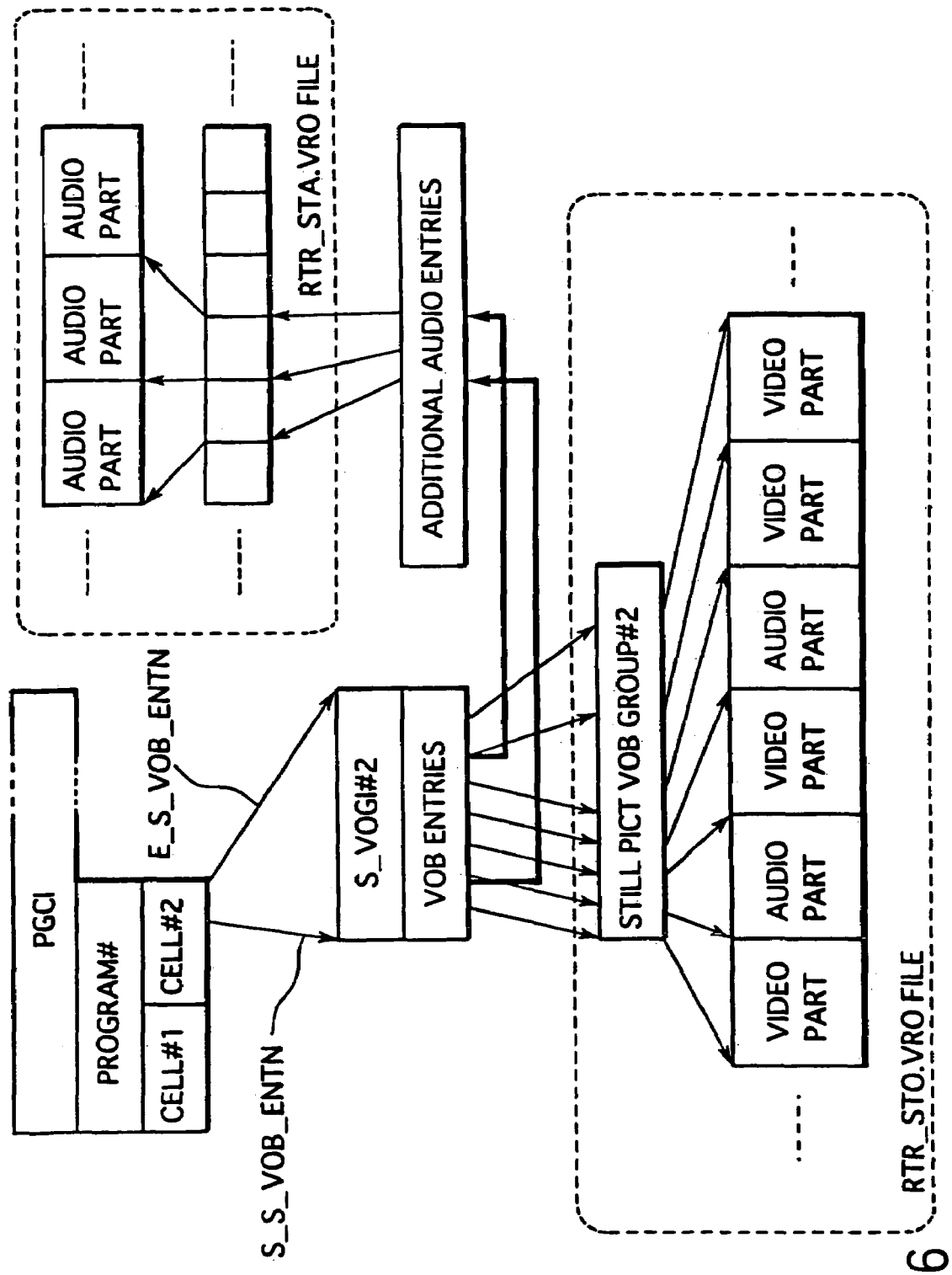
FIG. 36 is a view for explaining the relationship between original PGC information (ORG_PGCI) and a still picture additional audio part (RTR_STA.VRO shown in FIG. 2)

FIG. 36 is a view for explaining the relationship between the original PGC information (ORG_PGCI) and still picture additional audio part (RTR_STA.VRO in FIG. 2).

VOB entry contains access information to the associated video part and the audio part both of which are recorded in the RTR_STO.VRO file. The audio part is recorded immediately after the associated video part. When an additional audio part associated with a video part is recorded in RTR_STA.VRO file, an additional audio entry is described in data fields other than the VOGI, and a link from the VOB entry to the additional audio entry is described in the VOB entry.

Assume that additional audio file RTR_STA.VRO in FIG. 36 corresponds to VOB#B in FIG. 14G.

Under this assumption, for example, the arrow from A_PCKs 1865 and 1866 in FIG. 14D to A_PCKs 1865 and 1866 in FIG. 14E corresponds to that from a VOB entry in S_VOGI#2 in FIG. 36 to its right neighboring additional audio entry.

In this case, paying attention to the arrow of A_PCK 1866, A_PCK 1866 in FIG. 14E corresponds to the central audio part of RTR_STA.VRO in FIG. 36, and still picture number h+j−2 in FIG. 14F constructs a part corresponding to A_PCK 1866 of the additional audio entry in FIG. 36.

The information parts (the VOB entry and additional audio entry in FIG. 36) connected by the arrow can be linked using cell playback information 1108 in FIG. 1F or S_CI in FIG. 24.

When the central audio part in the RTR_STA.VRO file in FIG. 36 is audio information of after recording, A_PCK 1866 in FIG. 14E corresponding to this audio part can be constructed using dummy pack DM_PCK shown in FIG. 3F.

Figure 37:
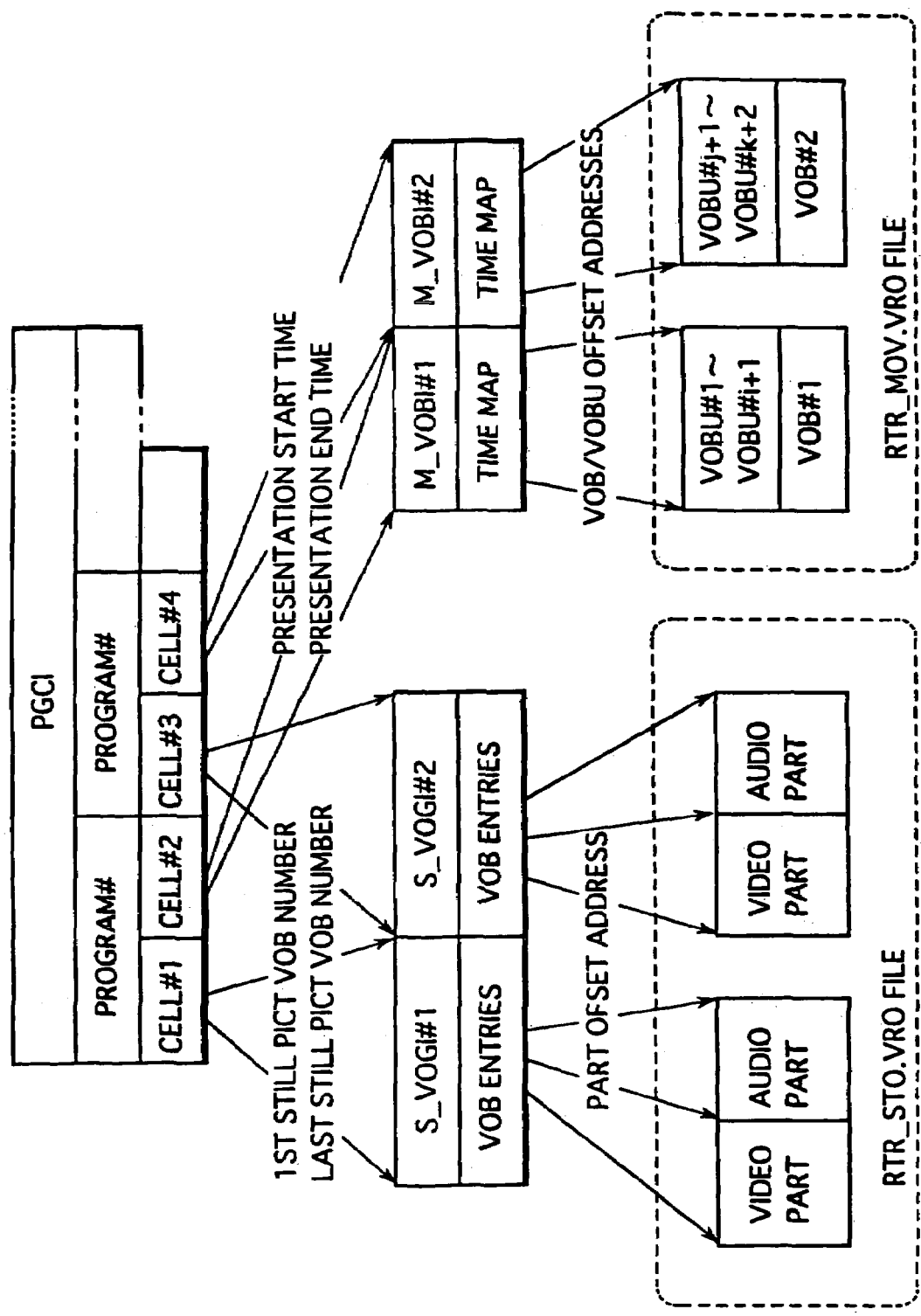
FIG. 37 is a view for explaining the relationship among a still picture VOB, movie VOB, and original PGC information.

FIG. 37 is a view for explaining an example of the structure of original PGC information (ORG_PGCI in FIG. 8 or 23) that contains still picture VOBs (RTR_STO.VRO file) and movie VOBs (RTR_MOV.VRO file).

Assume that program #1 of PGCI#l in FIG. 37 corresponds to VTS 1762 in FIG. 9E, S_VOGI#1 and S_VOGI#2 correspond to VOB#D 1774 and VOB#E 1775 in FIG. 9F, and M_VOBI#1 and M VOBI#2 correspond to VOB#A 1771 and VOB#B 1772 in FIG. 9F.

Under this assumption, picture object 1013 in FIG. 9F constructs the contents (video and audio parts) of the RTR_STO.VRO file in FIG. 37, and video object 1012 in FIG. 9F constructs the contents (VOB#1, VOB#2, . . . ) of the RTR_MOV.VRO file in FIG. 37.

Referring to FIG. 37, cell# in PGCI and VOB entries in S_VOGI# can be linked using, e.g., S_S_VOB_ENTN and E_S_VOB_ENTN in FIG. 25.

On the other hand, the logical addresses of the video or audio part in the RTR_STO.VRO file, and VOB numbers designated by VOB entries in S_VOGI# can be linked using the relationships shown in, e.g., FIGS. 4 and 5.

Time map TMAP in M_VOBI# in FIG. 37 will be explained below.

Movie AV file information table M_AVFIT in FIG. 8 or 23 contains movie AV file information general information (M_AVFI_GI), one or more movie VOB information search pointers (M_VOBI_SRP#1 to M_VOBI_SRP#n), and one or more pieces of movie VOB information (M_VOBI#L to M_VOBI#n) corresponding in number to these search pointers (not shown).

Each M_VOBI# contains movie VOB general information (M_VOBI_GI), seamless information (SMLI), audio gap information (AGAPI), and time map information (TMAPI) (not shown).

This TMAPI is used upon executing special playback (e.g., cell playback in the order unique to the user using user defined PGC) and time search.

TMAPI contains time map general information (TMAP_GI), one or more time entries (TMENT#1 to TM_ENT#r), and one or more VOBU entries (VOBU_ENT#1 to VOBU_ENT#q) (not shown).

Each VOBU entry contains information that pertains to the size and playback time of each VOBU. The VOBU size is indicated in units of sectors (2 kbytes or 2,048 bytes), and the playback time is indicated in units of video fields (1/60 sec per field in NTSC; 1/50 sec per field in PAL).

Since the VOBU size is indicated in units of sectors, as described above, each VOBU can be accessed using an address in units of sectors.

Each VOBU entry contains reference picture size information 1STREF_SZ, VOBU playback time information VOBU_PB_TM, and VOBU size information VOBU_SZ (not shown).

Note that VOBU_PB_TM expresses the playback time of the VOBU of interest in units of video fields. On the other hand, reference picture size information 1STREF_SZ expresses the size of the first reference picture (corresponding to I-picture of MPEG) of that VOBU in units of sectors.

On the other hand, each time entry contains address information (VOBU_ADR) of the corresponding VOBU, and time difference information (TM_DIFF) (not shown). This time difference information indicates the difference between the playback time designated by a time entry, and the playback start time of the VOBU.

Assuming that the time interval (time unit TMU) between two successive time entries is 10 sec, this time entry interval corresponds to, e.g., 600 fields in NTSC video.

Normally, the "time interval between neighboring VOBUs" is expressed by the number of fields in the VOBU entry. As another method, "count value from a given VOBU to the next VOBU by a clock counter" may be used to express the "time interval between neighboring VOBUs".

For example, the "time interval between neighboring VOBUs" can be expressed by the "difference value between the value of presentation time stamp PTS at the start position of one VOBU and the value of PTS at the start position of the immediately succeeding VOBU"

In other words, "the time interval in a specific unit can be expressed by the difference value of the clock counter in that unit".

Time map generation information TMAP_GI includes TM_ENT_Ns indicating the number of time entries in that time map information, VOBU_ENT_Ns indicating the number of VOBU entries in that time map information, time offset TM_OSF for that time map information, and address offset ADR_OFS of that time map information (not shown).

When a value (10 seconds or equivalent) corresponding to 600 fields in NTSC video (or 500 fields in PAL video) is used as time unit TMU, time offset TM_OSF is used to represent the time offset within TMU.

When the VOBU size is expressed by the number of sectors, address offset ADR_OFS is used to indicate a file pointer from the beginning of an AV file.

Time entry TM_ENT includes VOBU_ENTN indicating the number of the corresponding VOBU entry, TM_DIFF indicating the time difference between the playback start time of VOBU designated by the time entry, and the calculated playback time, and VOBU_ADR indicating the target VOBU address (not shown).

When time unit TMU is expressed by 600 fields in NTSC (or when time unit TMU is expressed by 500 fields in PAL), the "calculated playback time" with respect to time entry #j is given by TMU×(j−1)+TM_OSF.

On the other hand, VOBU_ADR indicates the target VOBU address by the total size of VOBUs preceding the VOBU of interest when the VOBU size is expressed in units of sectors.

In the aforementioned data structure, in order to start playback from the middle of a certain VOBU, that access point must be determined. This access point is assumed to be a time entry point.

This time entry point is located at a position separated from the position indicated by movie address information of the VOBU by the time difference indicated by time difference information TM_DIFF in time entry TM_ENT. This time entry point serves as a special presentation start point (or time search point) indicated by time map information TMAPI.

Cell# in PGCI in FIG. 37 and time map TMAP in M_VOBI# can be linked in the same manner as S_VOGI#.

FIG. 37 illustrates a case that a video field corresponding to the presentation start time is in the middle of VOBU#k. In order to display a sequence of video fields from a video field specified by the presentation start time, the VOBU data from the beginning need to be input to the decoder. This is because the decoder need to decode all of the reference video fields which have presentation time earlier than the presentation start time, although the decoded fields should not be displayed. When the decoding reaches to the video field corresponding to the presentation start time, the decoder should start display of the video pictures. This capability to start display exactly at the video field corresponding to the presentation start time is recommended.

Figure 38:
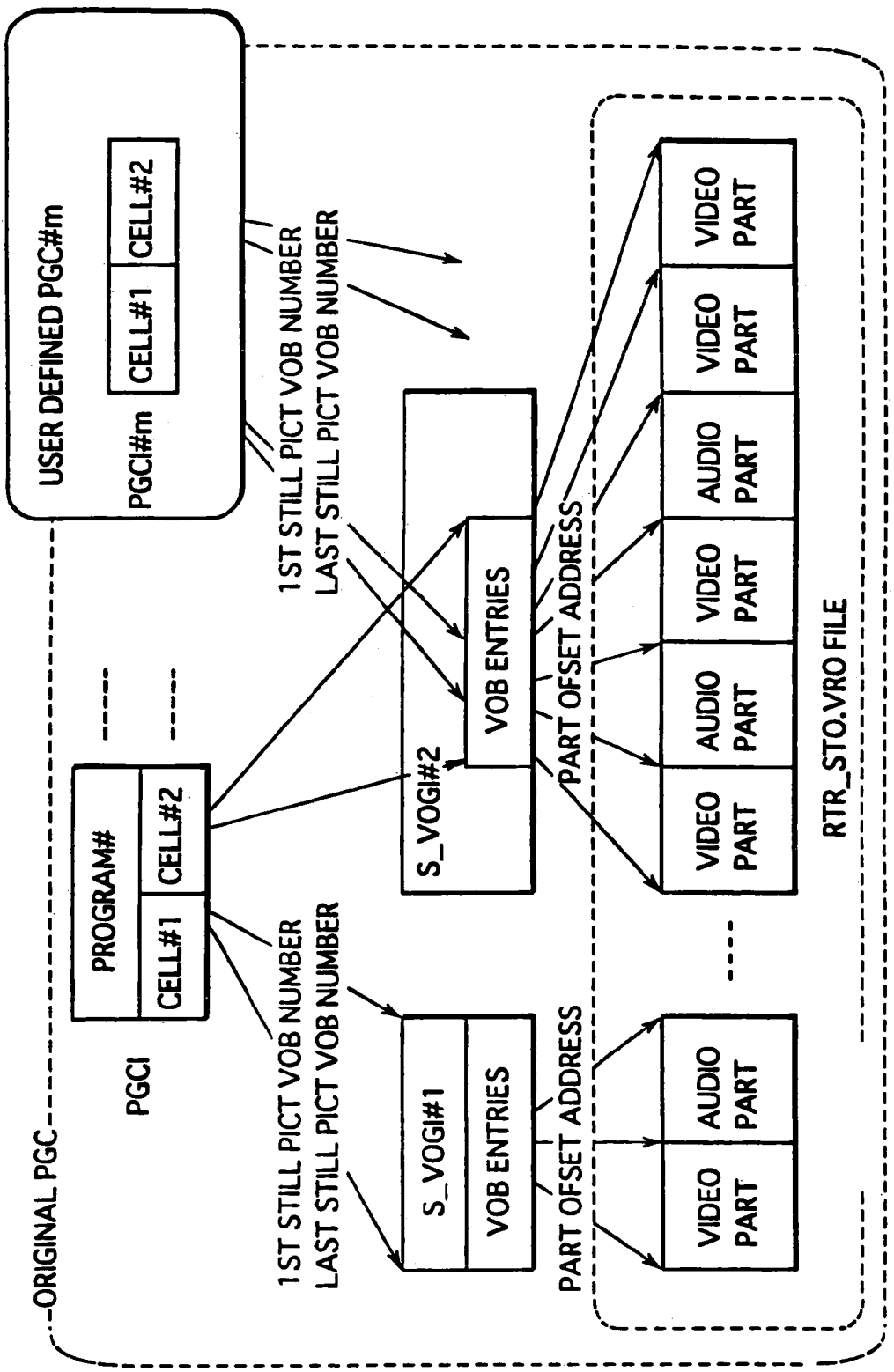
FIG. 38 is a view for explaining a case wherein user-defined PGC Information (FIG. 6) looks up a still picture VOB group.

FIG. 38 is a view for explaining a case wherein user defined PGC Information (FIG. 6) refers to a still picture VOB group.

A user defined PGC may include two types of cells, each of which refers to a movie VOB or a still picture VOB group, respectively. FIG. 38 shows an example of user defined PGC which refers to still picture VOB. In the figure, cell#1 in the user defined PGC refers to still picture VOB group #2. Although the cell#2 in the original PGC refers to the whole still picture VOB group #2 by specifying the first still picture VOB number and the last still picture VOB number in the still picture VOB group, the cell#1 in the user defined PGC refers to only a still picture VOB in the VOB group by specifying the second still picture VOB as the first still picture VOB number and the last still picture VOB number.

Assume that PGCI in FIG. 38 corresponds to PGC (or PGCI) 1446 in FIG. 3H. In this case, cell#1 and cell#2 in PGCI in FIG. 38 correspond to cells 1441 and 1442 in FIG. 3G. On the other hand, the first video part in the RTR_STO.VRO file in FIG. 38 corresponds to a cluster of V_PCK 1421 and SP_PCK 1422 in FIG. 3F. Furthermore, a video part that follows the first video part corresponds to a cluster of A_PCK 1423 and DM_PCK 1424 in FIG. 3F.

The characteristic features of the respective embodiments of the present invention will be summarized below.

*] One VOB or PTT can contain a plurality of pieces of still picture information.

*] Upon recording a plurality of still pictures, one VOB can continuously record at least two pieces of still picture information in an unrecorded area.

*] Cell information (S_CI) can designate a plurality of pieces of continuous still picture information.

The effects of these three "*"s are common to the respective embodiments.

More specifically, a high-performance digital camera can record several thousand or several ten thousand still pictures. Upon transferring data to an optical disc, the data are preferably grouped and recorded on the optical disc in units of a plurality of still pictures, thus allowing easy processing and attaining short transfer time.

A high-performance digital camera can record several thousand or several ten thousand still pictures. When VOB information is prepared by constructing a VOB for each still image, management information has a huge size. The method of the present invention can greatly reduce the management information size.

Furthermore, since each still picture information forms a different file in the digital camera, management and search processes are cumbersome. In the present invention, since still pictures are grouped in units of a plurality of pictures, management and search processes are easy.

Since each still picture information forms a different file in the digital camera, the contents of a still picture cannot be confirmed unless each file is opened. In the present invention, the user can confirm contents as if he or she checked a positive film (or negative film) of photographs, as shown in FIG. 11, by grouping still pictures in units of a plurality of pictures.

Furthermore, video information that stretches across a plurality of video frames is recorded in units of VOBs. When a plurality of still picture information are recorded in units of VOBs, video information and still picture information can be processed in a single layer (in a single directory level in FIG. 2). For example, cells of both video information and still picture information can be allocated in a single PGC, thus allowing mixed display of video information and still picture information, and broadening the expression range.

*] In the embodiment of the present invention, the VOBU map (S_VOB_ENT#) or VOB map is prepared.

*] The RTR recorder has an arrangement capable of recording the VOBU map or VOB map.

The effects of these two "*"s are common to the respective embodiments.

The user can directly access a still picture he or she wants to watch using the VOBU map or VOB map that records information such as recording addresses in units of still pictures, and the access speed for displaying a plurality of still pictures can be greatly improved.

When a plurality of still pictures are to be continuously displayed, seamless display (with continuous joints among still pictures) can be achieved using presentation time information PTM and/or system clock reference information.

Furthermore, since the start addresses of V_PCK that records a still picture itself and A_PCK that records audio information are described at different locations, high-speed access can be made if only still picture information or audio information is to be played back. As a result, when audio information in a specific VOB is used to display still picture in another VOB (since audio information alone can be accessed at high speed), seamless display can be made.

In the present invention, cell information (S_CI) designates each still picture in a VOB.

For this reason, since each still picture itself can be designated upon playback (using the VOBU map or VOB map), high-speed access can be performed, and seamless display can be made when a plurality of still pictures are to be displayed in turn.

Since each still picture itself can be designated upon playback, management upon playback becomes very easy. For example, upon displaying a plurality of still pictures on the screen at one time, as shown in FIG. 11, the processing to be executed becomes simple.

In the present invention, cell information (S_CI) can designate a plurality of pieces of still picture information in different VOBs.

For this reason, since continuous audio information in one VOB can be used upon displaying another VOB, the expression range can be broadened.

Furthermore, since continuous audio information in one VOB can be used upon displaying another VOB, common data can be used and, hence, the data size to be recorded on the information storage medium (optical disc 1001) can be reduced. As a result, the actual data size that can be recorded per information storage medium (optical disc 1001) can be greatly increased.

By only preparing new video object information for picture objects (S_AVFIT) corresponding to the already recorded video information, the existing video information can be used in combination with still picture information without modifying video objects 1012 themselves.

*] In the present invention, cell information is reproduced, and a still picture is played back using VOBI.

As a consequence, since cell playback information for picture objects (S_CI) can be set independently of video object information for picture objects as management information of the contents of picture objects 1013, the playback order can be designated irrespective of the recording order of still pictures on the information storage medium (optical disc 1001), thus remarkably improving the degree of freedom in expression.

*] The present invention provides an apparatus which reads out still picture information or audio information from a memory, and can simultaneously play back the still picture information and audio information.

When a plurality of pieces of still picture information in different VOBs are to be designated, or when audio information alone for a plurality of still pictures is recorded on another area, if V_PCK, SP_PCK, and A_PCK are played back in turn in units of still pictures, the frequency of access becomes very high, and it is hard to continuously display a plurality of still pictures in turn (due to the influence of the access wait time of the optical head).

By contrast, when information contents for at least two still pictures of V_PCK, SP_PCK, and A_PCK are played back at the same time, and are temporarily saved in memory 1563, and the stored contents are displayed simultaneously with the playback timing of the remaining information, the frequency of access of the optical head can be greatly reduced, thus allowing easy continuous display.

*] The present invention provides an after recording apparatus for recording additional information to already recorded still pictures.

For example, when still picture information sensed by a digital camera having no audio input function is directly recorded on the information storage medium (optical disc 1001), the recording result has a structure which does not contain any A_PCK (audio pack), as shown in FIG. 10I. A case will be examined below wherein the recorded information is played back, and comments are added to still pictures one by one by "audio input via a microphone", "overwriting marks by handwriting", "addition of text information by key-in", and the like, while displaying them on the screen, as shown in FIG. 11. In this case, when the recording format is to be changed from the structure that does not contain any A_PCK shown in FIG. 10I to a structure that contains A_PCK shown in FIG. 10F, re-recording must be done on the information storage medium (optical disc 1001), resulting in cumbersome processes and a long processing time. By contrast, when additional information alone is recorded as another VOB 1634 on the information storage medium (optical disc 1001), as shown in FIG. 10J, without modifying the data that does not contain any A_PCK (audio pack) shown in FIG. 10, information can be added to a still image very easily and quickly later.

The characteristic features included in the system of the present invention will be described in more detail below.

According to the present invention, an information storage medium which is capable of recording and playing back at least still picture information, and continuously records a plurality of still pictures, is characterized by having a first information unit [VOBUs 1641 to 1649] having one still picture information, and a first group unit [VOBs 1632 to 1634 or PTTs 1407 and 1408] which is comprised of a set of first information units, and has a plurality of pieces of still picture information having different contents, and recording information in the first group unit.

Note that the still picture information includes at least one of video information [V_PCK 1664 and the like], sub-picture information [SP_PCK 1682 and the like], and audio information [A_PCK 1693 and the like].

The first information unit is constructed by at least one of a VOBU (video object unit) and VOB (video object), and the first group unit is constructed by at least one of a VOB. (video object) and PTT (part_of_title).

An information recording/playback apparatus according to the present invention, which is capable of recording and playing back still picture information on/from an information storage medium, comprises an unrecorded area detection unit [system controller 1530] for searching for an unrecorded area [unrecorded area 1460] on the information storage medium, a still picture grouping unit [formatter 1556] for grouping a plurality of pieces of input still picture information, and an information recording/reproducing unit [information recording/reproducing unit 101] for recording the plurality of pieces of grouped still picture information on the unrecorded area of the information storage medium detected by the unrecorded area detection unit. At least two pieces of still picture information [e.g., VOBUs 1642 and 1643] of the plurality of pieces of grouped still picture information are continuously recorded in nearby areas [e.g., continuously recorded in extent#δ 1474) on the information storage medium.

An information recording/playback apparatus according to the present invention, which is capable of recording and playing back still picture information on/from an information storage medium, has a first recording area [picture objects 1013] for recording still picture information itself, and a second recording area [control information 1011] for recording management information that pertains to a still picture. This information storage medium [optical disc 1001] has a first information unit [VOBUs 1641 to 1649] having one still picture information, and a first group unit [VOBs 1632 to 1634 or PTTs 1407 and 1408] which is comprised of a set of first information units, and has a plurality of pieces of still picture information having different contents. Still picture information is recorded on the first recording area in the first group unit, and a plurality of still pictures having map information [VOBU map 1738 for picture objects or VOB map 1899 for picture objects], which records management information that pertains to each still picture information associated with the first information unit, are continuously recorded.

An apparatus according to the present invention, which plays back an information storage medium capable of recording and playing back at least still picture information, records still picture information and management information that pertains to a still picture on an information storage medium, which has a first recording area [picture objects 1013] for recording still picture information itself, and a second recording area [control information 1011] for recording management information that pertains to a still picture. This information recording/playback apparatus comprises a recording area detection unit [system controller 1530] for detecting a location [unrecorded area 1460] where a plurality of pieces of still picture information are recorded on the information storage medium, a grouping unit [formatter 1556] for forming a first group unit [VOBs 1632 to 1634 or PTTs 1407 and 1408] by collecting a plurality of first information units [VOBUs 1641 to 1649] each having one still picture information, an information recording/reproducing unit [information recording/reproducing unit 101] for recording the grouped first group unit on an area of the information storage medium detected by the recording area detection unit, a management information preparation unit [system controller 1530] for preparing management information [VOBU map 1738 for picture objects or VOB map 1899 for picture objects] that pertains to still picture image information in the first group unit, and a management information recording unit [information recording/reproducing unit 101] for recording the management information that pertains to still picture information, and is prepared by the management information preparation unit in the second recording area [control information 1011].

An information storage medium according to the present invention, which is capable of recording and playing back at least still picture information, has a first recording area [picture objects 1013] for recording still picture information itself, and a second recording area [control information 1011] for recording management information, and the second recording area has a first control information recording field [video object information 1107] that records information which pertains to a recording state of still picture information recorded in the first recording area on the information storage medium, and a second control information recording field [playback control information 1021] that records information which pertains to a playback method upon playing back still picture information recorded in the first recording area. In this information storage medium, minimum unit information [cell playback information 1108] for playback of the still picture information is recorded in the second control information recording field, and the minimum unit information designates a still picture itself to be played back [still picture number 1875 in a VOB that records a video pack of the first still picture in a cell, and still picture number 1876 in a VOB that records a video pack of the last still picture in a cell, or still picture number 1885 in a PTT that records the first still picture in a cell, and still picture number 1886 in a PTT that records a video pack of the last still picture in a cell].

Note that the information storage medium has a structure in which the minimum unit information [cell playback information 1108] recorded in the second control information recording field [playback control information 1021] designates a plurality of pieces of continuously recorded still picture information [by designating the first and last still picture numbers in a cell, a plurality of pieces of still picture information therebetween can be designated].

On an information storage medium according to the present invention, which is capable of recording and playing back at least still picture information, a plurality of pieces of still picture information are recorded in the first recording area [video objects 1012] using a first information unit [VOBUs 1641 to 1649] having one still picture information, and a first group unit [VOBs 1632 to 1634 or PTTs 1407 and 1408] which is comprised of a set of first information units, and has a plurality of pieces of still picture information having different contents. In addition, information [video object information 1107] that pertains to a recording state of still pictures recorded in the first group unit is recorded in the first control information recording field [control information 1011].

The minimum unit information [cell layback information 1108] for playback of the still picture information and is recorded in the second control information recording field [playback control information 1021] designates a still picture [still picture numbers 1875, 1876, 1885, and 1886] in a first group [VOBs 1632 to 1634 or PTTs 1407 and 1408] recorded in the first control information recording field [video object information 1107] so as to play back still picture information. Also, a still picture position [still picture number j: VOBU 1828, still picture number h+j−2: VOBU 1829] in a second group [VOB#B 1822] different from the first group [VOB#A 1821] recorded in the first control information field is designated to simultaneously play back audio information or sub-picture information.

A playback apparatus according to the present invention has an information reproduction means [information recording/reproducing unit 101], and an information display means [display/input panel 1548 of RTR recorder]. The information reproduction means [information recording/reproducing unit 101] reproduces information that pertains to a playback method recorded in a second control information recording field [playback control information 1021], and then reproduces information that pertains to the recording state on the information storage medium, which is recorded in a first control information recording field [video object information 1107], on the basis of the reproduction result. After that, the information reproduction means reproduces still picture information recorded in a first recording area [picture objects 1013] on the basis of the reproduction result, and the information display means [AV output 1546] displays the reproduced information.

A playback apparatus according to the present invention, comprises a reproducing unit [information recording/reproducing unit 101] for simultaneously reproducing, from an information storage medium which records a plurality of pieces of still picture information in units of groups {VOB#A 1821, VOB#B 1822], and in which the still picture information contains at least one of video information [V_PCKs 1852 and 1854], sub-picture information [SP_PCK 1848], and audio information [A_PCKs 1865 and 1866], information for at least two still pictures [still picture number 2 and still picture number 3 (not shown), or still picture number j and still picture number j+1 (not shown)] of the video information, sub-picture information, and audio information, a storage unit [memory 1563] for temporarily storing the information reproduced by the reproducing unit, and a display unit [AV output 1546] for simultaneously displaying information, which is obtained by reproducing the remaining information of the video information [V_PCKs 1852 and 1854], sub-picture information [SP_PCK 1848], and audio information [A_PCKs 1865 and 1866], which is not stored in the storage unit, by the reproducing unit [information recording/reproducing unit 101], and the information stored in the storage unit.

An after recording apparatus according to the present invention uses an information storage medium, which has a first information unit [VOBUs 1641 to 1649] having one still picture information, and a first group unit [VOBs 1632 to 1634 or PTTs 1407 and 1408] which is comprised of a set of first information units, and has a plurality of pieces of still picture information having different contents, and continuously records a plurality of still pictures in the first group unit. The apparatus using this medium comprises an additional information input means [AV input 1542→ADC 1552/A encoder 1554 or SP encoder 1555] for adding information to each still picture information [VOBUs 1825 to 1827], a temporary storage unit [temporary buffer memory 1534] for temporarily storing additional information added to each still picture information, an additional information synthesizing means [formatter 1556 and data processor 1536] for grouping the additional information added to each still picture information into the first group unit [VOBs 1632 to 1634 or PTTs 1407 and 1408], and an information recording means [information recording/reproducing unit 101] for recording synthesis information prepared by the additional information synthesizing means on the information recording medium.

As described above, according to the present invention:

A) A new recording format and data structure of management information, which can process a plurality of pieces of still picture information while assuring data consistency and continuity of a general video recording format and management information in a rewritable DVD_RTR disc which assures compatibility and continuity with DVD video disc, can be obtained.

B) A new recording format and data structure of management information, which can easily manage and search a plurality of pieces of recorded still picture information, can be obtained.

C) An information playback apparatus, which can seamlessly and continuously display a plurality of pieces of still picture information (continuity upon playback) by allowing high-speed access to an information storage medium that records a plurality of pieces of still picture information, can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A recording method using an information recording medium which comprises,
   a first area storing a still picture video file, said still picture video file including a still picture VOB group;
   a second area storing an additional audio file, said additional audio file including additional audio streams; and
   a third area storing a video recording manager information file, said video recording manager information file including navigation data,
   wherein said navigation data includes a still picture AV file information table, original PGC information, and a user defined PGC information table,
   said still picture AV file information table includes still picture AV file information, one or more pieces of still picture additional audio stream information, and still picture additional audio file information,
   one of said pieces of still picture additional audio stream information includes audio attribute information of one of said additional audio streams,
   said still picture additional audio file information includes one or more still picture additional audio group information search pointers and one or more pieces of still picture additional audio group information,
   one of said still picture additional audio group information includes still picture additional audio group general information containing first numeral information of said one of still picture additional audio stream information,
   said still picture AV file information includes still picture VOB group information for said still picture VOB group,
   said still picture VOB group information includes one or more still picture VOB entries,
   one of said still picture VOB entries includes second numeral information corresponding to said one of still picture additional audio group information,
   said user defined PGC information table includes user defined PGC information,
   said original PGC information or said user defined PGC information includes still picture cell information,
   said still picture cell information includes still picture cell general information, and
   said still picture cell general information includes third numeral information of start still picture VOB entry of said still picture VOB entries and fourth numeral information of end still picture VOB entry of said still picture VOB entries,
   said method comprising:
   generating information of the still picture video file;
   recording the generated information of the still picture video file in the first area;
   generating information of the video recording manager information file; and
   recording the generated information of the video recording manager information file in the third area.

2. A reproducing method using an information recording medium which comprises,
   a first area storing a still picture video file, said still picture video file including a still picture VOB group;
   a second area storing an additional audio file, said additional audio file including additional audio streams; and a third area storing a video recording manager information file, said video recording manager information file including navigation data,
wherein said navigation data includes a still picture AV file information table, original PGC information, and a user defined PGC information table,
said still picture AV file information table includes still picture AV file information, one or more pieces of still picture additional audio stream information, and still picture additional audio file information,
one of said pieces of still picture additional audio stream information includes audio attribute information of one of said additional audio streams,
said still picture additional audio file information includes one or more still picture additional audio group information search pointers and one or more pieces of still picture additional audio group information,
one of said still picture additional audio group information includes still picture additional audio group general information containing first numeral information of said one of still picture additional audio stream information,
said still picture AV file information includes still picture VOB group information for said still picture VOB group,
said still picture VOB group information includes one or more still picture VOB entries,
one of said still picture VOB entries includes second numeral information corresponding to said one of still picture additional audio group information,
said user defined PGC information table includes user defined PGC information,
said original PGC information or said user defined PGC information includes still picture cell information,
said still picture cell information includes still picture cell general information, and
said still picture cell general information includes third numeral information of start still picture VOB entry of said still picture VOB entries and fourth numeral information of end still picture VOB entry of said still picture VOB entries,
said method comprising:
reproducing information of the video recording manager information file from the third area; and
reproducing information of the still picture video file from the first area based on the reproduced information of the video recording manager information file.

* * * * *